(12) United States Patent
Takahashi et al.

(10) Patent No.: US 11,947,287 B2
(45) Date of Patent: Apr. 2, 2024

(54) SHEET SEPARATION DEVICE, LAMINATOR, IMAGE FORMING APPARATUS, AND IMAGE FORMING SYSTEM

(71) Applicants: Wataru Takahashi, Tokyo (JP); Tomohiro Furuhashi, Kanagawa (JP); Shinya Monma, Kanagawa (JP); Yoshito Suzuki, Chiba (JP); Joji Akiyama, Kanagawa (JP); Yohsuke Haraguchi, Kanagawa (JP); Sho Asano, Kanagawa (JP); Wataru Nozaki, Kanagawa (JP)

(72) Inventors: Wataru Takahashi, Tokyo (JP); Tomohiro Furuhashi, Kanagawa (JP); Shinya Monma, Kanagawa (JP); Yoshito Suzuki, Chiba (JP); Joji Akiyama, Kanagawa (JP); Yohsuke Haraguchi, Kanagawa (JP); Sho Asano, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/964,114

(22) Filed: Oct. 12, 2022

(65) Prior Publication Data
US 2023/0032840 A1    Feb. 2, 2023

Related U.S. Application Data

(63) Continuation of application No. 17/205,235, filed on Mar. 18, 2021, now Pat. No. 11,507,000.

(30) Foreign Application Priority Data

Mar. 22, 2020  (JP) .................................. 2020-050392
Mar. 22, 2020  (JP) .................................. 2020-050393

(51) Int. Cl.
*G03G 15/20* (2006.01)
*B32B 38/10* (2006.01)

(52) U.S. Cl.
CPC ......... *G03G 15/2028* (2013.01); *B32B 38/10* (2013.01)

(58) Field of Classification Search
CPC ........................... G03G 15/2028; B23B 38/10
See application file for complete search history.

(56) References Cited

U.S. PATENT DOCUMENTS 10,857,776 B2    12/2020   Morinaga et al.
2004/0033095 A1   2/2004   Saffari et al.
(Continued)

FOREIGN PATENT DOCUMENTS

JP    H9164593 A      6/1997
JP    2006-160429 A   6/2006
JP    2017-132559 A   8/2017

OTHER PUBLICATIONS

Extended European Search Report dated Aug. 30, 2021.

*Primary Examiner* — Victor Verbitsky
(74) *Attorney, Agent, or Firm* — Harness, Dickey & Pierce, P.L.C.

(57) ABSTRACT

A sheet separation device separates a non-bonding portion of a two-ply sheet in which two sheets are overlapped and bonded together at one end of the two-ply sheet. The sheet separation device includes a separator that includes a first separator and a second separator. The first separator is inserted into a gap between the two sheets of the two-ply sheet. The second separator is inserted between the two sheets at said another end of the two-ply sheet that is opposite to the one end of the two-ply sheet and moves in a
(Continued)

width direction of the two-ply sheet after the first separator is inserted into the gap and relatively moves from the one end to said another end.

22 Claims, 32 Drawing Sheets

(56) References Cited

U.S. PATENT DOCUMENTS

| | | |
|---|---|---|
| 2017/0178545 A1* | 6/2017 | Sato .................... B65H 37/04 |
| 2017/0305706 A1 | 10/2017 | Takahashi et al. |
| 2018/0201466 A1 | 7/2018 | Saito et al. |
| 2018/0236744 A1 | 8/2018 | Suzuki et al. |
| 2018/0257900 A1 | 9/2018 | Suzuki et al. |
| 2018/0259895 A1 | 9/2018 | Shibasaki et al. |
| 2018/0265313 A1 | 9/2018 | Heishi et al. |
| 2019/0010011 A1 | 1/2019 | Watanabe et al. |
| 2019/0276263 A1 | 9/2019 | Hidaka et al. |
| 2019/0284008 A1 | 9/2019 | Sakano et al. |
| 2019/0284009 A1 | 9/2019 | Suzuki et al. |
| 2019/0284010 A1 | 9/2019 | Asami et al. |
| 2019/0284011 A1 | 9/2019 | Furuhashi et al. |
| 2019/0284012 A1 | 9/2019 | Yoneyama et al. |
| 2019/0367317 A1 | 12/2019 | Haraguchi et al. |
| 2020/0140222 A1 | 5/2020 | Takahashi et al. |
| 2020/0239265 A1 | 7/2020 | Suzuki et al. |
| 2020/0247107 A1 | 8/2020 | Morinaga et al. |
| 2020/0247636 A1 | 8/2020 | Furuhashi et al. |
| 2020/0338877 A1 | 10/2020 | Takahashi et al. |
| 2020/0341414 A1 | 10/2020 | Watanabe et al. |

\* cited by examiner

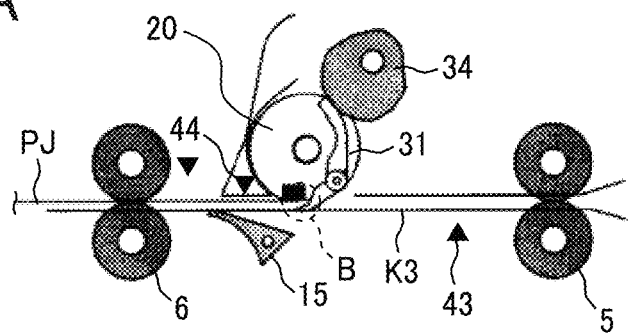
FIG. 5A
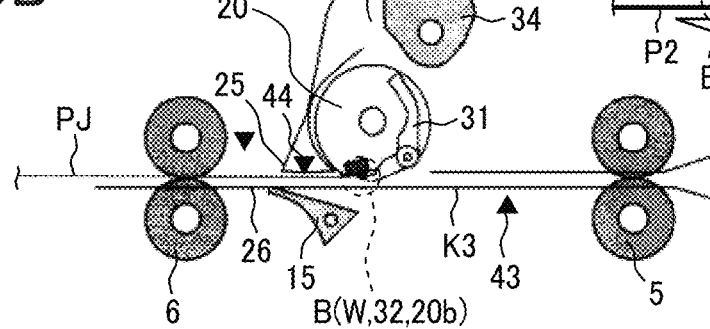
FIG. 5B
FIG. 5B'
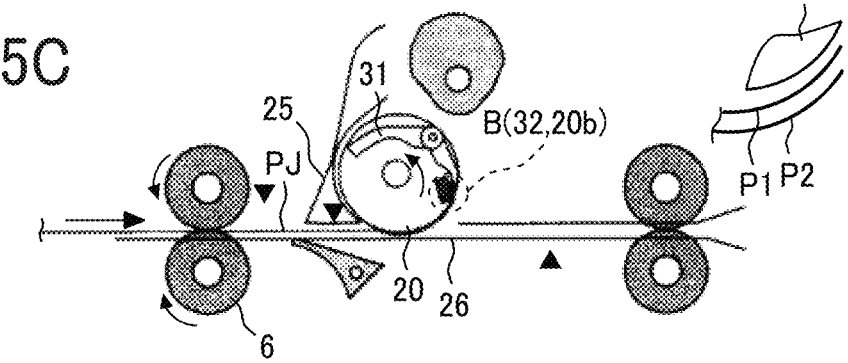
FIG. 5C
FIG. 5C'
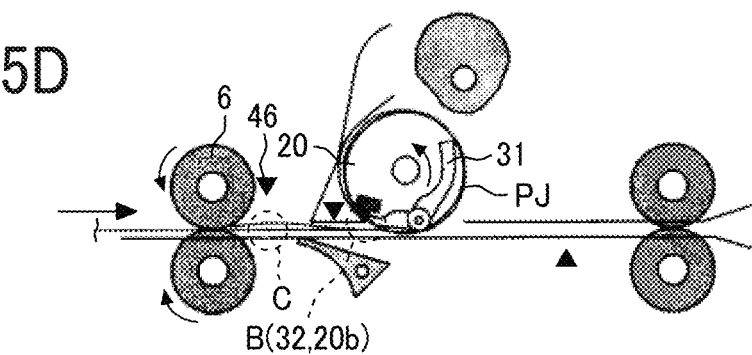
FIG. 5D

| FIG. 31A |
| FIG. 31B |

# SHEET SEPARATION DEVICE, LAMINATOR, IMAGE FORMING APPARATUS, AND IMAGE FORMING SYSTEM

CROSS-REFERENCE TO RELATED APPLICATIONS

This patent application is a continuation of and claims the benefit of priority under 35 U.S.C. §§ 120/121 to U.S. patent application Ser. No. 17/205,235, filed on Mar. 18, 2021, which is based on and claims priority pursuant to 35 U.S.C. § 119(a) to Japanese Patent Applications No. 2020-050392, filed on Mar. 22, 2020, and No. 2020-050393, filed on Mar. 22, 2020 in the Japan Patent Office, the entire disclosures of each of which are incorporated by reference herein.

BACKGROUND

Technical Field

This disclosure relates to a sheet separation device configured to separate a non-bonding portion of a two-ply sheet in which two sheets are overlapped and bonded together at a bonding portion of the two-ply sheet, a laminator including the sheet separation device, an image forming apparatus including the sheet separation device, such as a copier, a printer, a facsimile machine, and a multi-functional apparatus including at least two functions of the copier, the printer, and the facsimile machine, and an image forming system including the sheet separation device.

Related Art

A sheet separation device (i.e. a laminator) separates a two-ply sheet in which two sheets are overlapped and bonded together at a bonding portion of the two-ply.

SUMMARY

This specification describes an improved sheet separation device that separates a non-bonding portion of a two-ply sheet in which two sheets are overlapped and bonded together at one end as a bonding portion of the two-ply sheet. The sheet separation device includes a separator. The separator includes a first separator and a second separator. The first separator is configured to be inserted into a gap formed between the two sheets of the two-ply sheet. The second separator is configured to be inserted between the two sheets at another end of the two-ply sheet opposite to the one end of the two-ply sheet and move in a width direction of the two-ply sheet, after the first separator is inserted into the gap in the two-ply sheet and relatively moves from the one end of the two-ply sheet to said another end of the two-ply sheet.

This specification further describes an improved sheet separation device that separates the non-bonding portion of the two-ply sheet in which the two sheets are overlapped and bonded together at one end as the bonding portion of the two-ply sheet. The sheet separation device includes a separator configured to be inserted into a gap formed between the two sheets of the two-ply sheet, relatively move from the one end of the two-ply sheet to said another end of the two-ply sheet, and move in the width direction of the two-ply sheet at said another end of the two-ply sheet.

This specification still further describes an improved sheet separation device that separates the non-bonding portion of the two-ply sheet in which the two sheets are overlapped and bonded together at one end as the bonding portion of the two-ply sheet. The sheet separation device includes two branched conveyance paths branched in different directions and a separator. The separator is configured to be inserted into a gap formed between the two sheets of the two-ply sheet, separate the two sheets, and guide the two sheets to the two branched conveyance paths, respectively.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 5A to 5D are schematic views illustrating operations of the sheet separation device according to the first embodiment, subsequent from the operations of FIGS. 4A to 4D;

FIG. 11 including

Figure 1:
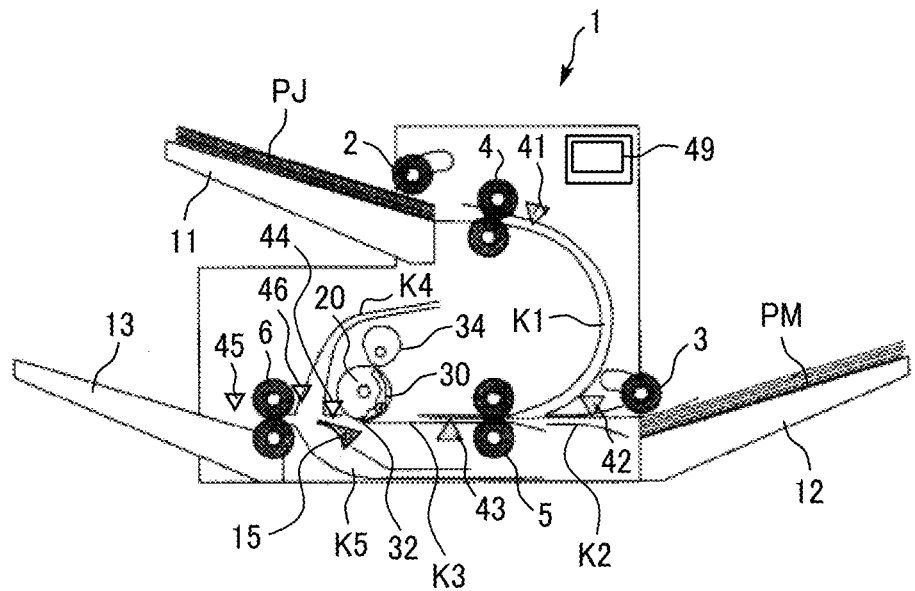
FIG. 1 is a schematic view illustrating a sheet separation device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise. Identical reference numerals are assigned to identical components or equivalents and a description of those components is simplified or omitted.

A configuration and operations of a sheet separation device 1 are described below with reference to FIG. 1.

Figure 10A:
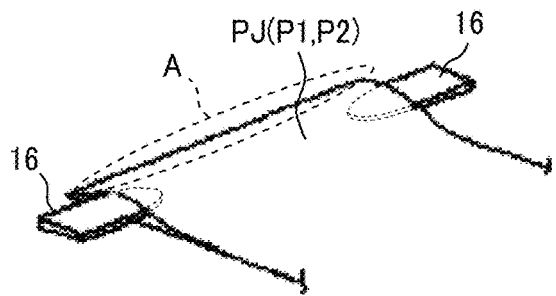
FIGS. 10A to 10E are perspective views illustrating operations of the first separation claws and a second separation claw in the first embodiment.
Figure 10B:
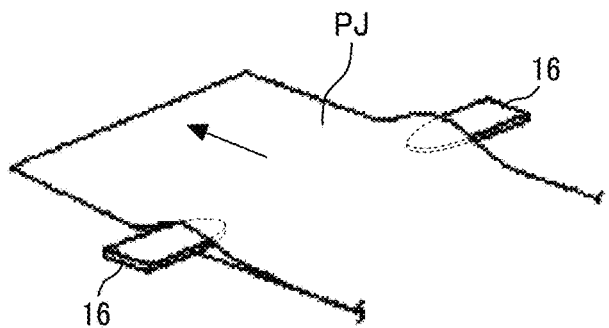
Figure 10C:
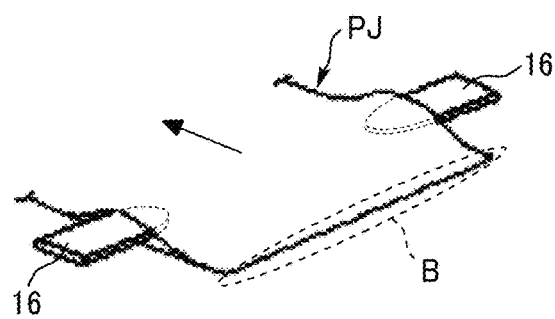

The sheet separation device 1 separates a non-bonding portion of a two-ply sheet PJ in which two sheets P1 and P2 are overlapped and bonded together at one end of the two-ply sheet as a bonding portion A of the two-ply sheet (see FIGS. 10A to 10C).

The two-ply sheet PJ in the present embodiment is made of two sheets P1 and P2 overlapped and bonded together at one side of four sides as the bonding portion A. That is, in the two-ply sheet PJ made of two sheets P1 and P2, only one sides of the two sheets P1 and P2 are connected by thermal welding or the like as the bonding portion A, and the other sides of the two sheets P1 and P2 are not connected. As the two sheets P1 and P2 constituting the two-ply sheet PJ, a transparent film sheet (that is, a laminate sheet) may be used.

The sheet separation device 1 separates the two sheets P1 and P2 constituting the tow-ply sheet PJ (i.e. separates the other side of the two sheets that is opposite the bonding portion A that maintains bonding the two sheets P1 and P2). Subsequently, the sheet separation device 1 inserts an insertion sheet PM between the separated two sheets P1 and P2. The insertion sheet PM is a sheet such as one plain sheet or a photograph.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, an ejection tray 13, a first sensor 41, a second sensor 42, a third sensor 43, a fourth sensor 44, a fifth sensor 45, an abnormality detection sensor 46, a winding roller 20, a moving mechanism 30, a switching claw 15 as a divider, first separation claws 16 as a first separator that is a separator (see FIGS. 6A to 6C, 10A, and 10B), a second separation claw 17 as a second separator that is the separator (see FIGS. 7A to 7C and 10A to 10E).

Additionally, the sheet separation device 1 includes a plurality of conveyance paths such as a first conveyance path K1, a second conveyance path K2, a third conveyance path K3, a first branched conveyance path K4, and a second branched conveyance path K5. The above-described conveyance paths K1 to K5 each include two conveyance guide plates facing each other to guide and convey the sheet such as the two-ply sheet PJ or the insertion sheet PM.

Specifically, the two-ply sheet PJ is stacked on the first feed tray 11. The first feed roller 2 feeds the uppermost two-ply sheet PJ on the first feed tray 11 to the first conveyance roller pair 4, and the first conveyance roller pair 4 conveys the two-ply sheet PJ along the first conveyance path K1.

The insertion sheet PM is stacked on the second feed tray 12. The second feed roller 3 feeds the uppermost insertion sheet PM on the second feed tray 12 to the second conveyance path K2.

Each of the first to third conveyance roller pairs 4 to 6 includes a drive roller and a driven roller and conveys the sheet nipped in a nip between the drive roller and the driven roller. The third conveyance path K3 includes, from the upstream side, the second conveyance roller pair 5, the winding roller 20, and the third conveyance roller pair 6. The winding roller 20 and the third conveyance roller pair 6 is configured to be able to rotate in forward or in reverse. The third conveyance roller pair 6 can convey the sheet in the forward direction that is the left direction in FIG. 1 and in the reverse direction that is the right direction in FIG. 1. The third conveyance roller pair 6 also functions as an ejection roller pair that ejects the sheet to the ejection tray 13.

Each of the first to fifth sensors 41 to 45 as a sheet detection sensor is a reflective photosensor that optically detects whether the sheet is present at the position of each sensor. The first sensor 41 is disposed in the vicinity of the downstream side of the first conveyance roller pair 4. The second sensor 42 is disposed in the vicinity of the downstream side of the second feed roller 3. The third sensor 43 is disposed in the vicinity of the downstream side of the second conveyance roller pair 5. The fourth sensor 44 is disposed in the vicinity of the downstream side of the winding roller 20 (that is the left side of the winding roller 20 in FIG. 1) and the upstream side of the third conveyance roller pair 6 (that is the right side of the third conveyance roller pair 6 in FIG. 1). The fifth sensor 45 is disposed downstream the third conveyance roller pair 6 (that is the left side of the third conveyance roller pair 6 in FIG. 1).

With reference to FIGS. 2A, 2B, 3A, 3B, 5B to 5D, and 6A, a configuration of the winding roller 20 and operations of the winding roller 20 to separate the two-ply sheet PJ are described. In the winding roller 20, a gripper 32 that is one example of a gripper grips a gripped portion B of the two-ply sheet PJ at a winding start position W (see FIG. 5B). The gripped portion B is another end of the two-ply sheet PJ that is opposite an end at which the bonding portion A is formed, which is referred to as the other end of the two-ply sheet PJ. While the gripper 32 grips the gripped portion B of the two-ply sheet PJ, the winding roller 20 rotates in a predetermined rotation direction (counterclockwise in FIG. 5B) to wrap the two-ply sheet PJ around the winding roller 20. The winding roller 20 can rotate about a rotation shaft 20a in forward and in reverse. A controller controls a drive motor that drives the winding roller 20. The controller includes one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components.

Specifically, the two-ply sheet PJ starts from the first feed tray 11 and passes through the first conveyance path K1, and the second conveyance roller pair 5 conveys the two-ply sheet PJ in the forward direction along the third conveyance path K3. The two-ply sheet passes through the winding start position W of the winding roller 20 once and is conveyed to a position of the third conveyance roller pair 6 that is a position at which the back end of the two-ply sheet PJ passes through the fourth sensor 44 but does not pass through the third conveyance roller pair 6, that is, the position in front of the third conveyance roller pair 6. Thereafter, the third conveyance roller pair 6 rotates in reverse to convey the two-ply sheet PJ in the reverse direction to the position of the winding roller 20 that is the winding start position W, and the gripper 32 grips the two-ply sheet PJ. The gripped two-ply sheet PJ is further conveyed, and the winding roller 20 rotates counterclockwise in FIG. 1 to wrap the 5 two-ply sheet PJ around the winding roller 20.

Figure 6A:
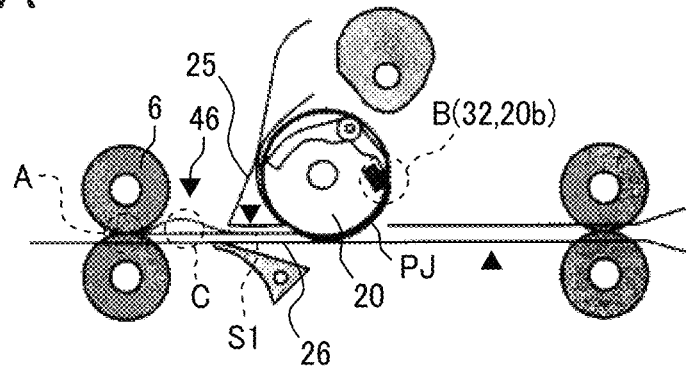
FIGS. 6A to 6C are schematic views illustrating operations of the sheet separation device according to the first embodiment, subsequent from the operations of FIGS. 5A to 5D.

With reference to FIG. 5C', when the two-ply sheet PJ is wound around the winding roller 20, a length of a sheet wound around the winding roller 20 is proportional to a distance from the center of the winding roller 20 to the sheet. Therefore, since a first sheet P1 is nearer to the center of the winding roller 20 than a second sheet P2, a length of the first sheet P1 wound around the winding roller 20 is shorter than a length of the second sheet P2. As a result, misalignment occurs in a part of the two-ply sheet PJ other than the bonding portion A and the gripped portion B and the part in which the sheet P1 is in close contact with the sheet P2 (in other words, the part in which the sheet p1 sticks to the sheet P2). As illustrated in FIGS. 5D and 6A, the misalignment causes the upper first sheet P1 to slack and bend upward and forms a gap C between the two sheets P1 and P2 in the vicinity of the bonding portion A that is referred to as one end of the two-ply sheet PJ. As described above, the two sheets P1 and P2 that are in close contact with each other without any gap are separated from each other.

In the present embodiment, in order to significantly form the gap C as described above, that is, to increase the difference between lengths of the sheets P1 and P2 wound around the winding roller 20, the two-ply sheet PJ is wound around the winding roller 20 at least once or more.

In the present embodiment, winding the two-ply sheet PJ around the winding roller 20 can separate the two-ply sheet PJ without increasing the size and cost of the sheet separation device 1.

As illustrated in FIG. 5B', the gripper 32 is configured to grip the gripped portion B of the two-ply sheet PJ without contacting the end surface of the other end of the gripped portion B on any member.

Specifically, the gripper 32 is configured to sandwich and grip the gripped portion B of the two-ply sheet PJ between the gripper 32 and a receiving portion 20b of the winding roller 20 without causing any member to abut and restrict the end surface of the other end of the two-ply sheet PJ, in other words, without causing any member to hit or contact the end surface of the two-ply sheet PJ. The receiving portion 20b is a part of an outer circumferential portion of the winding roller 20 and faces the gripper 32.

More specifically, the two-ply sheet PJ is not gripped and sandwiched by the gripper 32 and the receiving portion 20b in a state in which a specific member such as the gripper 32 abuts on the end surface of the other end (that is the tip of the other end). Without abutting the end surface of the other end that is the tip of the other end to any member, the two-ply 5 sheet PJ is sandwiched and gripped by the outer gripper 32 and the inner receiving portion 20b.

Compared with a structure that abuts the end surface of the tip of the two-ply sheet on a member, the above-described structure can reduce a disadvantage that the two-ply sheet PJ (particularly, the tip of the other end) is damaged. Since a part of the two-ply sheet PJ including a damaged front end surface is hard for the laminating process, the configuration of the present disclosure is useful.

In the present embodiment, the bonding portion A of the two-ply sheet PJ wound around the winding roller 20 is the one end of the two-ply sheet PJ. The one end is opposite to the other end serving as the gripped portion B, that is, another end of the two-ply sheet PJ.

In the present embodiment, at least one of the gripper 32 and the receiving portion 20b is made of elastic material such as rubber.

Compared with a sheet separation device including the gripper 32 and the receiving portion 20b that are rigid bodies made of metal or resin, the above-described sheet separation device can increase a gripping force to grip the two-ply sheet PJ and prevent surfaces of the two-ply sheet PJ from being damaged. In particular, the sheet separation device including the gripper 32 and the receiving portion 20b made of the elastic material easily exhibits the above-described effect.

As illustrated in FIGS. 2A to 3B, the moving mechanism 30 moves the gripper 32 between a gripping position (a position illustrated in FIGS. 2A and 3A) at which the gripper 32 can grip the two-ply sheet PJ and a releasing position (a position illustrated in FIGS. 2B and 3B) at which the gripper 32 is released from the gripping position.

Specifically, the moving mechanism 30 includes an arm 31, a compression spring 33 as a biasing member, a cam 34, and a motor that rotates the cam 34 in forward or in reverse. The arm 31 holds the gripper 32, and the arm 31 and the gripper 32 are held together by the winding roller 20 to be rotatable about a support shaft 31a. In the present embodiment, the gripper 32 is connected to the tip of arm 31, and the gripper 32 and the arm 31 are made as one part. Alternatively, the gripper 32 and the arm 31 may be made as separate members, and the gripper 32 may be disposed on the arm 31, that is, may be held by the arm 31. In any case, the arm 31 holding the gripper 32 rotates around the rotation shaft 20a together with the winding roller 20.

Figure 2A:
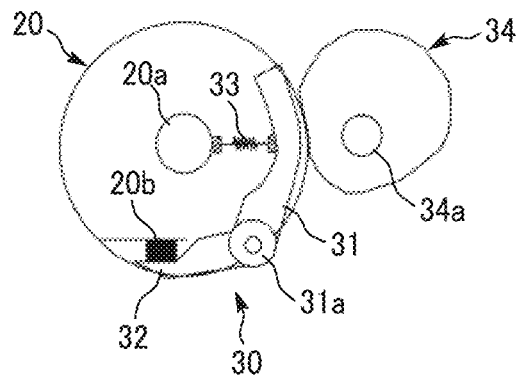
FIG. 2A is a side view illustrating a gripper according to the first embodiment that has moved to a gripping position in the sheet separation device illustrated in FIG. 1.
Figure 2B:
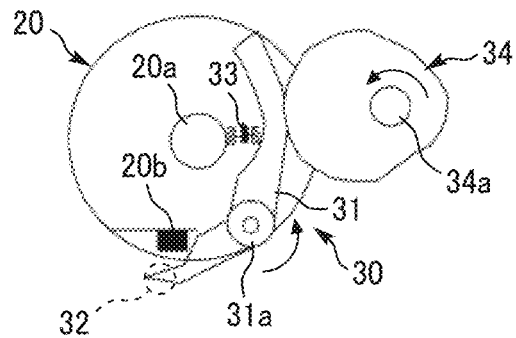
FIG. 2B is a side view illustrating the gripper according to the first embodiment that has moved to a releasing position in the sheet separation device illustrated in FIG. 1.

The compression spring 33 functions as a biasing member that biases the arm 31 so that the gripper 32 moves from the releasing position illustrated in FIG. 2B to the gripping position illustrated in FIG. 2A. Specifically, one end of the compression spring 33 is connected to a fixed part near the rotation shaft 20a, and the other end of the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 as the biasing member so that the gripper 32 moves from the gripping position illustrated in FIG. 2A to the releasing position illustrated in FIG. 2B. A motor controlled by the controller drives the cam 34 to rotate in forward or in reverse at a desired rotation angle. The cam 34 is held by the apparatus housing so as to be rotatable about a cam shaft 34a independently of the winding roller 20.

In the moving mechanism 30 configured as described above, as illustrated in FIGS. 2A and 3A, the arm 31 not contacting the cam 34 is biased by the compression spring 33 and presses the gripper 32 against the receiving portion 20b. This state is referred to as a closed state. In the closed state, the gripper 32 and the receiving portion 20b can grip the two-ply sheet PJ.

Figure 3A:
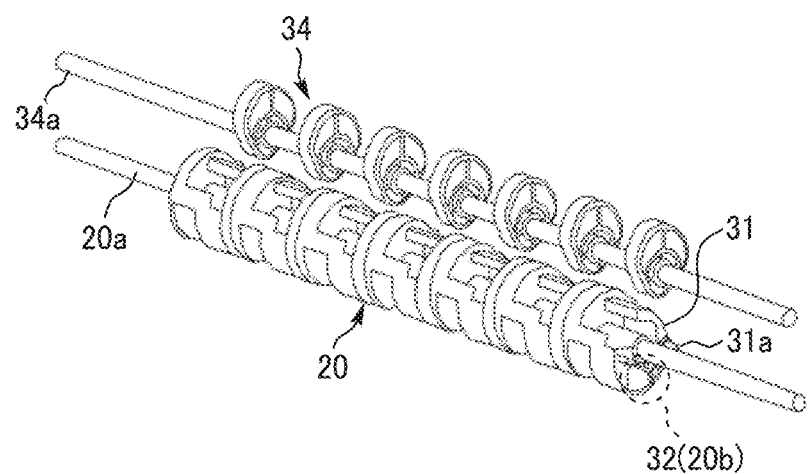
FIG. 3A is a perspective view illustrating the gripper according to the first embodiment that has moved to the gripping position in the sheet separation device illustrated in FIG. 1.
Figure 3B:
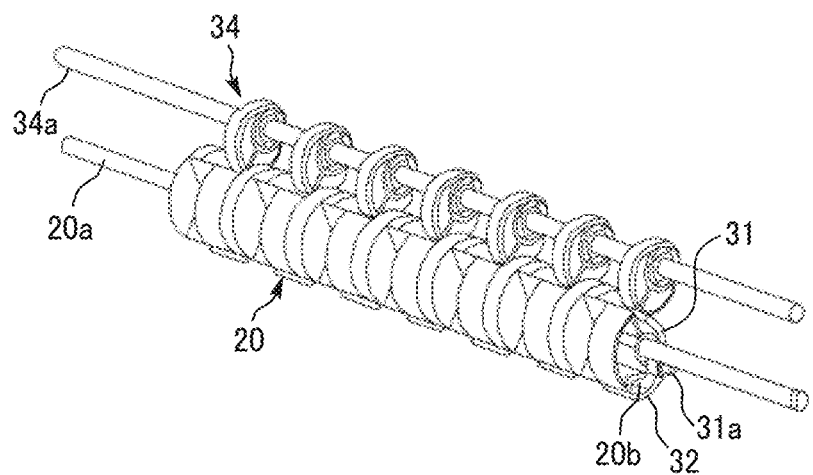
FIG. 3B is a perspective view illustrating the gripper according to the first embodiment that has moved to the releasing position in the sheet separation device illustrated in FIG. 1.

In contrast, as illustrated in FIGS. 2B and 3B, the arm 31 pressed by the cam 34 rotates counterclockwise in FIG. 2B about the support shaft 31a against the urging force of the compression spring 33 and separates the gripper 32 from the receiving portion 20b. This state is referred to as an open state. In the open state, the two-ply sheet PJ is not gripped, which is referred to as a grip release state.

In the present embodiment, as illustrated in FIGS. 3A and 3B, the winding roller 20 includes a plurality of roller portions (i.e. seven roller portions in the present embodiment) separated in the axial direction of the winding roller 20. Corresponding to the roller portions, the cam 34 includes a plurality of portions separated in the axial direction.

Setting portions separated in the axial direction to grip the two-ply sheet PJ as described above, that is, not setting entire area in the axial direction to grip the two-ply sheet PJ can share load necessary to grip the two-ply sheet PJ. The above-described configuration is useful when a necessary gripping force becomes large.

Figure 4A:
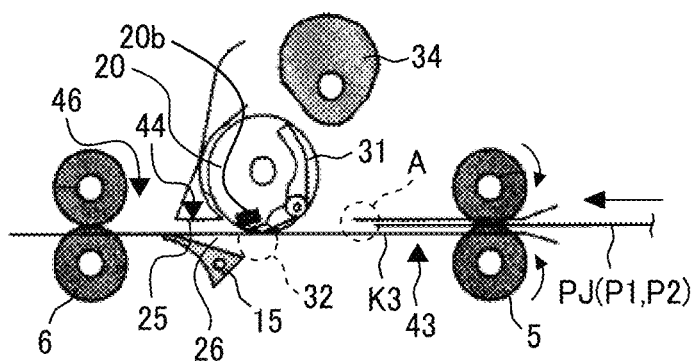
FIGS. 4A to 4D are schematic views illustrating operations of the sheet separation device according to the first embodiment illustrated in FIG. 1.
Figure 4B:
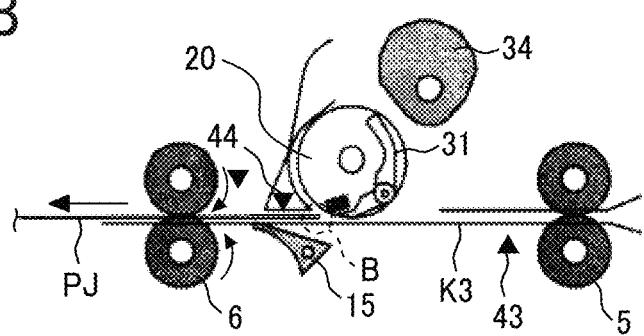
Figure 4C:
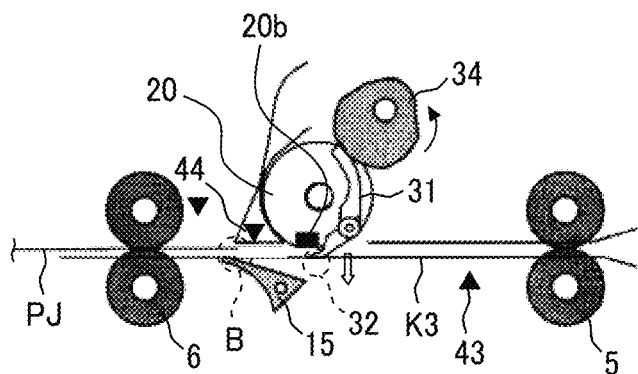
Figure 4D:
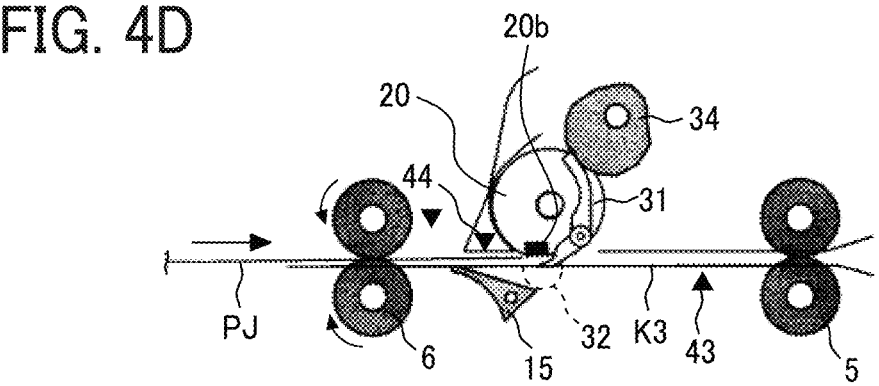

With reference to FIGS. 1, 4D, and 5A, the following describes the fourth sensor 44 in the sheet separation device 1 in the present embodiment. The fourth sensor 44 is the sheet detection sensor to detect two-ply sheet PJ conveyed between the winding roller 20 and the third conveyance roller pair 6. The fourth sensor 44 detects the front end of the two-ply sheet PJ conveyed from the third conveyance roller pair 6 to the winding roller 20. Based on results detected by the fourth sensor 44, the controller controls the moving mechanism 30.

Specifically, the fourth sensor 44 is disposed on the conveyance path between the winding roller 20 and the third conveyance roller pair 6. As illustrated in FIGS. 4D and 5A, the third conveyance roller pair 6 conveys the two-ply sheet PJ in reverse toward the position of the winding roller 20, so that the gripped portion B of the two-ply sheet PJ becomes a front end in the reverse direction conveyance, and the fourth sensor 44 detects the front end of the two-ply sheet PJ conveyed in reverse, that is, the tip of the gripped portion B. The controller uses a timing at which the fourth sensor 44 detects the tip of the gripped portion B as a trigger to adjust and control a timing to stop the two-ply sheet PJ at the gripping position and a timing at which the gripper 32 grips the gripped portion B. Specifically, after a predetermined time has passed since the fourth sensor 44 detected the front end of the two-ply sheet PJ, the third conveyance roller pair 6 stops the reverse direction conveyance of the two-ply sheet PJ, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the end surface of the two-ply sheet PJ is sandwiched by the gripper 32 and the receiving portion 20b without abutting the end surface of the two-ply sheet PJ on any member.

As described above, the third conveyance roller pair 6 conveys the tip of the other end of the gripped portion B of the two-ply sheet as a front end toward the winding start position W of the winding roller 20 in the third conveyance path K3 between the third conveyance roller pair 6 and the winding roller 20.

With reference to FIGS. 6A to 6C, 10A to 10E, and 12, the first separation claws 16 as a first separator are described. The first separation claws 16 are claw-shaped members that move from standby positions illustrated in FIG. 12 and are inserted into the gap C formed between two sheets P1 and P2 at a predetermined position of the two-ply sheet PJ. The predetermined position is a position at which the first separation claws 16 as the first separator can enter the gap formed between the two sheets P1 and P2 and is determined by experiments. Preferably, the gap formed between the two sheets P1 and P2 becomes largest at the predetermined position in the sheet separation device 1.

Specifically, the first separation claws 16 are inserted into the gap C formed between two sheets P1 and P2 and between the winding roller 20 and the third conveyance roller pair 6 from the standby positions outside both ends of the two-ply sheet PJ in the width direction of the two-ply sheet PJ in which the other end (that is the gripped portion B) is wound around the winding roller 20 and the one end (that is the bonding portion A) is nipped by the third conveyance roller pair 6.

Figure 6B:
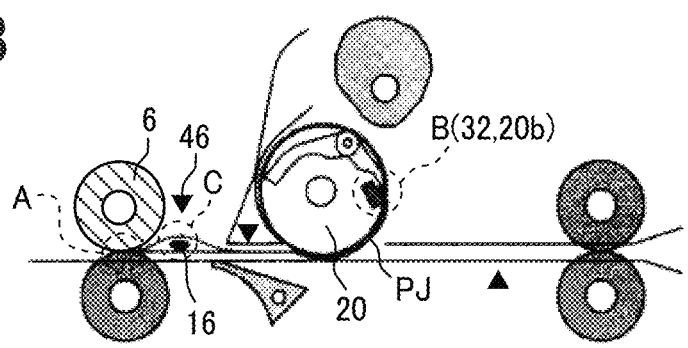
Figure 6C:
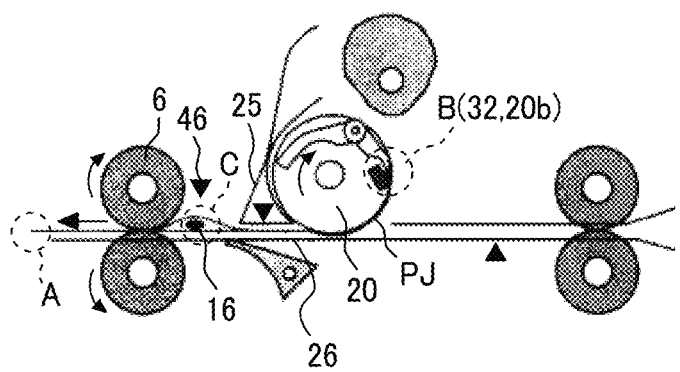
Figure 9:
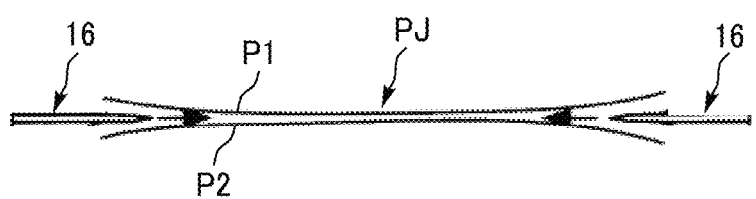
FIG. 9 is a schematic view illustrating first separation claws according to the first embodiment that is inserted into a two-ply sheet in a width direction of the two-ply sheet.
Figure 12:
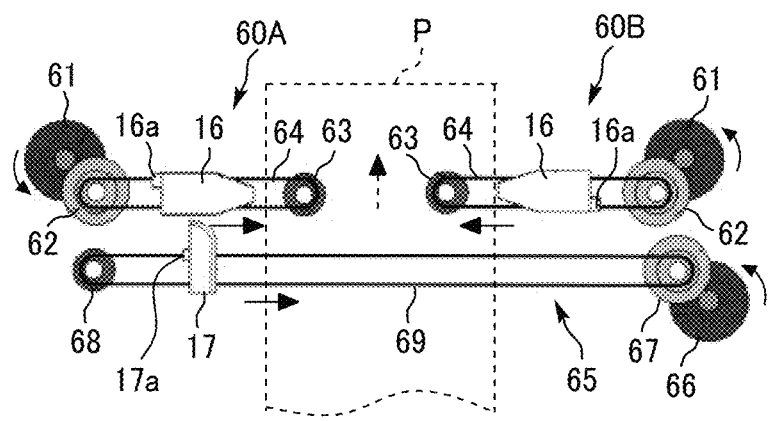
FIG. 12 is a schematic view illustrating a configuration of a driving device for each of the first and second separation claws in the first embodiment.

More specifically, in the present embodiment, the first separation claws 16 are a pair of separation claws as a pair of separators disposed at both sides of the third conveyance path K3 in the width direction that is the direction perpendicular to a plane on which FIGS. 6A to 6C are illustrated and the horizontal direction in FIGS. 9 and 12. As illustrated in FIGS. 10A to 10E, the first separation claw 16 is a pointed shaped (in other words, a taper-shaped) plate having a tip at a center of the plate in a width direction of the plate. A thickness direction of the plate is the thickness direction of the two-ply sheet PJ. The first separation claws 16 are moved in the width direction of the two-ply sheet PJ by driving devices 60A and 60B (see FIG. 12) controlled by the controller.

The first separation claws 16 configured as described above ordinarily stand by at standby positions at which the first separation claws 16 do not interfere with the conveyance of the sheet such as the two-ply sheet PJ in the third conveyance path K3. As illustrated in FIG. 12, the standby positions are outside of the sheet P in the width direction of the sheet P. When the two-ply sheet PJ (configured by two sheets P1 and P2) is separated, the first separation claws 16 enter the gap C in the two-ply sheet PJ as illustrated in FIGS. 9 and 10A and secure the gap C to be large.

As illustrated in FIG. 12, each of the driving devices 60A and 60B moves each of the pair of first separation claws 16 in the width direction and includes a motor 61, a gear pulley 62, a pulley 63, a timing belt 64. The gear pulley 62 has a step-like ring shape including a gear that meshes with a motor gear disposed on a motor shaft of the motor 61 and a pulley that stretches and supports the timing belt 64 together with the pulley 63. The first separation claw 16 has a fixed portion 16a that is fixed to a part of the timing belt 64.

In the driving devices 60A and 60B as configured described above, the motor 61 drives to rotate the motor shaft in a direction indicated by arrow in FIG. 12 (i.e. counterclockwise), the gear pulley 62 rotates clockwise, the timing belt 64 rotates clockwise, and the pair of first separation claws 16 moves from the outside portions in the width direction toward the center portion in the width direction (that is, each of the first separation claws moves from the standby position to a separation position). In contrast, when the motor 61 drives to rotate the motor shaft in the direction opposite to the arrow direction in FIG. 12, the pair of first separation claws 16 move from the center portion in the width direction toward the outside portions in the width direction (that is, each of the first separation claws moves from the separation position to the standby position).

In addition to the first separation claws 16, the sheet separation device 1 according to the present embodiment includes a second separation claw 17 as a second separator as illustrated in FIGS. 7A to 7C, 10D, and 12.

The second separation claw 17 is a claw-shaped member that is inserted between two sheets P1 and P2 at the other end of the two-ply sheet near the gripped portion B and moves in the width direction, after the first separation claws 16 inserted into the gap C in the two-ply sheet PJ relatively move from the one end of the two-ply sheet PJ near the bonding portion A to the other end of the two-ply sheet PJ that is opposite to the one end.

Specifically, the first separation claws 16 inserted into the gap C in the two-ply sheet PJ relatively move toward the other end of the two-ply sheet PJ (toward the gripped portion B) with respect to the two-ply sheet PJ and stop at the other end of the two-ply sheet PJ (the gripped portion B), and the second separation claw 17 is inserted between the two sheets P1 and P2 from one end of the two-ply sheet PJ in the width direction (that is the left side in FIG. 12) at the other end of the two-ply sheet PJ and moves from the one end (that is the left side in FIG. 12) to the other end of the two-ply sheet in the width direction (that is the right side in FIG. 12).

Figure 7A:
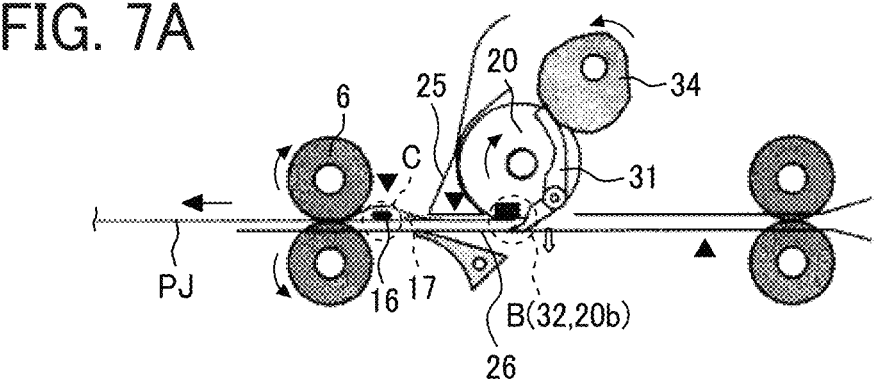
FIGS. 7A to 7C are schematic views illustrating operations of the sheet separation device according to the first embodiment, subsequent from the operations of FIGS. 6A to 6C.
Figure 7B:
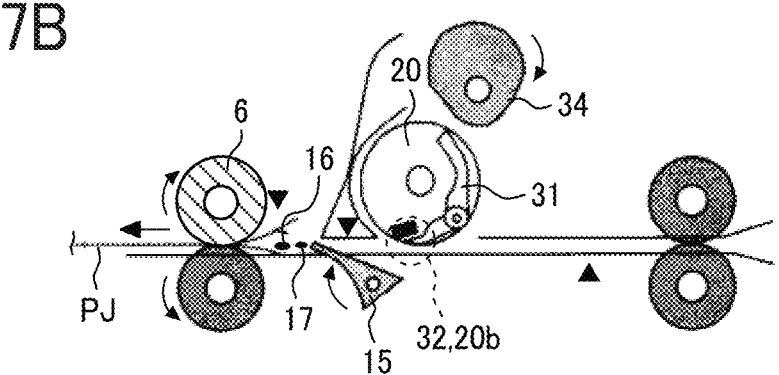
Figure 7C:
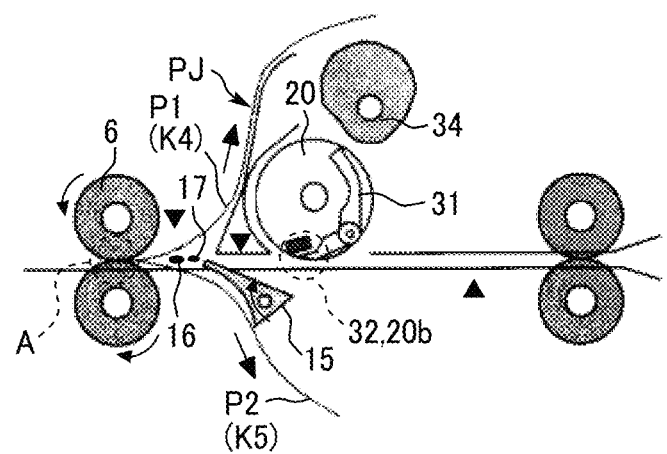

More specifically, as illustrated in FIGS. 7A to 7C, the second separation claw 17 in the present embodiment is disposed between the first separation claws 16 and the winding roller 20. The second separation claw 17 is a plate-shaped member extending in a conveyance direction indicated by a broken-line arrow in FIG. 12 (a thickness direction of the plate-shaped member is the thickness direction of the two-ply sheet PJ) and also has a shape like a knife having an edge extending from the tip in the conveyance direction at one end in the width direction of the plate-shaped member to the other end in the width direction. The second separation claw 17 is moved in the width direction of the two-ply sheet PJ by driving device 65 (see FIG. 12) controlled by the controller.

Figure 10D:
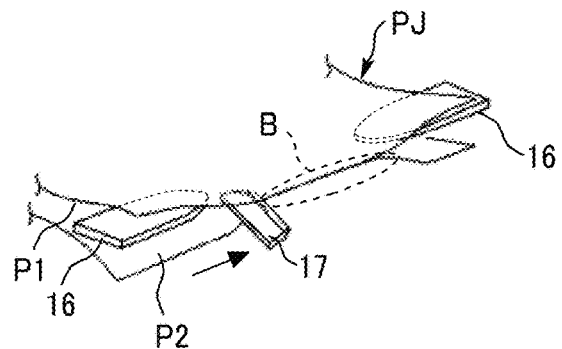

The second separation claw 17 configured as described above ordinarily stand by at a standby position at which the second separation claw 17 does not interfere with the conveyance of the sheet such as the two-ply sheet PJ in the third conveyance path K3. As illustrated in FIG. 12, the standby position is outside of the sheet P in the width direction of the sheet P. Then, as illustrated in FIG. 10D, the second separation claw 17 enters the gap C of the two-ply sheet PJ, the gap secured by the first separation claw 16 and moves from one end in the width direction to the other end in the width direction to separate an entire area in the width direction of the two-ply sheet PJ (that is the two sheets P1 and P2) that is the back end of the two-ply sheet PJ in the forward direction.

As illustrated in FIG. 12, the driving device 65 moves the second separation claw 17 in the width direction and includes a motor 66, a gear pulley 67, a pulley 68, a timing belt 69. The gear pulley 67 has a step-like ring shape including a gear that meshes with a motor gear disposed on a motor shaft of the motor 66 and a pulley that stretches and supports the timing belt 69 together with the pulley 68. The second separation claw 17 has a fixed portion 17a that is fixed to a part of the timing belt 69.

In the driving device 65 as configured described above, the motor 66 drives to rotate the motor shaft in a direction indicated by arrow in FIG. 12 (i.e. counterclockwise), the gear pulley 67 rotates clockwise, the timing belt 69 rotates clockwise, and the second separation claw 17 move from the one end in the width direction to the other end in the width direction (that is, the second separation claw 17 moves from the standby position and passes through the entire area of the two sheets P1 and P2 in the width direction). In contrast, when the motor 66 drives to rotate the motor shaft in the direction opposite to the arrow direction in FIG. 12, the second separation claw 17 moves from the other end in the width direction to the one end in the width direction (that is, moves to the standby position).

The above-described mechanism including the winding roller 20 winding the two-ply sheet and the first separation claws 16 and the second separation claw 17 that are inserted into the two-ply sheet PJ to separate the two-ply sheet PJ can reduce the size of the sheet separation device as compared with a mechanism using a large-scale device such as a vacuum device to separate the two-ply sheet PJ. That is, without increasing the size of the sheet separation device 1, the above-described mechanism can satisfactorily separate the two sheets P1 and P2 constituting the two-ply sheet PJ.

In particular, since the sheet separation device 1 in the present embodiment includes the second separation claw 17 configured and operated as described above, the sheet separation device 1 can sufficiently separate (in other words, peel) the other ends of the two sheets P1 and P2 constituting the two-ply sheet PJ that is opposite the bonding portion A. The above-described configuration prevents a disadvantage that the other end of the two-ply sheet PJ that is opposite the bonding portion A is not sufficiently separated and the insertion sheet PM cannot be inserted into the other end of the two-ply sheet PJ. Additionally, the above-described configuration allows the switching claw 15 to easily function, that is, separately guide the two sheets P1 and P2 to the two branched conveyance paths K4 and K5. The function of the switching claw 15 is described below.

With reference to FIGS. 7A to 7C, switching claws 15 as a divider are described. The switching claws 15 are claw-shaped members moving to a position to guide the two sheets P1 and P2 separated from the two-ply sheet PJ by the first separation claws 16 to the two branched conveyance paths K4 and K5, respectively. The two branched conveyance paths K4 and K5 are branched from the third conveyance path K3 in different directions between the first separation claws 16 and the winding roller 20, and the third conveyance path K3 is interposed by the two branched conveyance paths K4 and K5. The switching claw 15 is disposed to be movable to the position to guide the two sheets P1 and P2 to the two branched conveyance paths K4 and K5, respectively.

Specifically, in the present embodiment, the switching claws 15 are a plurality of claws divided with a gap therebetween in the width direction that is the direction perpendicular to a plane on which FIGS. 7A to 7C are illustrated. The switching claws 15 are configured to be rotatable about a support shaft. The controller controls a driving device that rotates the switching claws 15.

The switching claws 15 configured as described above ordinarily stand by at standby positions as illustrated in FIG. 7A at which the switching claws 15 do not interfere with the conveyance of the sheets such as the two-ply sheet PJ in the third conveyance path K3. When the switching claws 15 guide the two sheets P1 and P2 separated from the two-ply sheet PJ by the first separation claws 16 to the branched conveyance paths K4 and K5, respectively, the switching claws 15 rotate to positions at which the switching claws 15 prevent the two-ply sheet PJ from entering the third conveyance path K3 when viewed from the two-ply sheet PJ as illustrated in FIG. 7B.

As a result, the first sheet P1 is guided to the first branched conveyance path K4, and the second sheet P2 is guided to the second branched conveyance path K5.

Figure 8A:
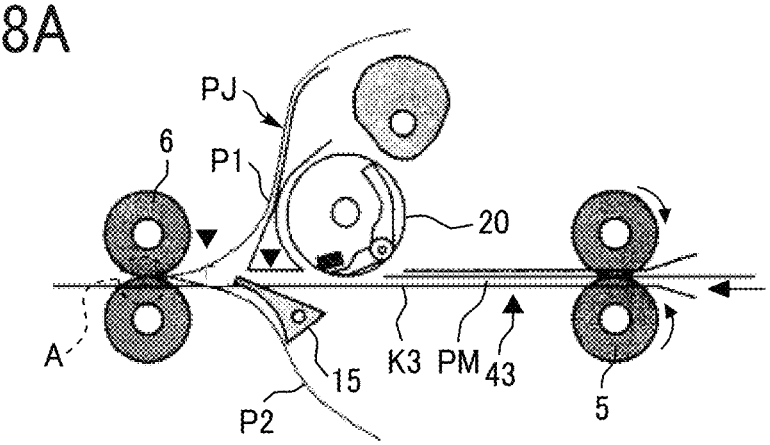
FIGS. 8A to 8C are schematic views illustrating operations of the sheet separation device according to the first embodiment, subsequent from the operations of FIGS. 7A to 7C.
Figure 8B:
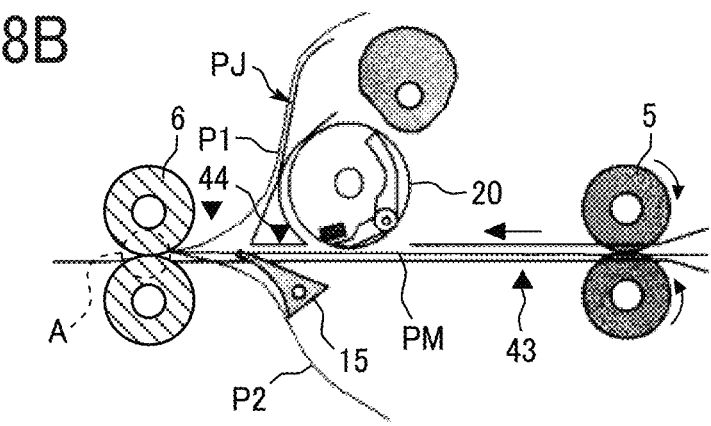
Figure 8C:
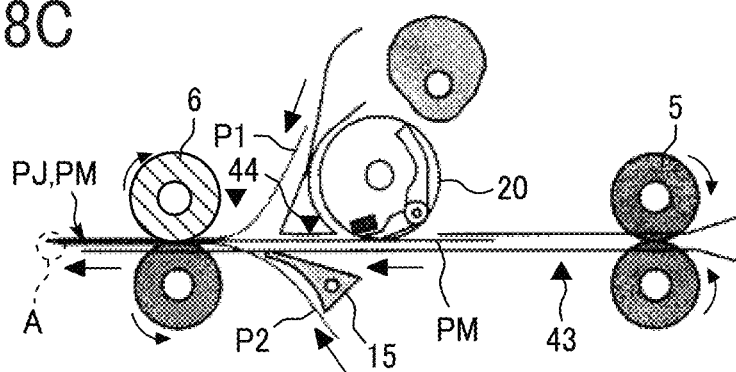

Specifically, the third conveyance roller pair 6 conveys the one end of the two-ply sheet PJ to the left side in FIG. 7A after the first separation claws 16 are inserted into the gap C to release winding the other end of the two-ply sheet PJ around the winding roller 20. After the third conveyance roller pair 6 conveys the two-ply sheet PJ at a position at which the back end of the two-ply sheet PJ is between the switching claws 15 and the second separation claw 17, the switching claws 15 rotates clockwise in FIG. 7B about the support shaft, the third conveyance roller pair 6 conveys the other end of the two-ply sheet PJ to the right side as illustrated in FIG. 7C again, and the switching claws 15 guide the first sheet P1 separated by the first separation claws 16 and the second separation claw 17 to the first branched conveyance path K4 and guide the second sheet P2 to the second branched conveyance path K5. Subsequently, as illustrated in FIGS. 8A to 8C, the second conveyance roller pair 5 conveys the insertion sheet PM to the third conveyance path K3, that is, the left side in FIGS. 8A to 8C to insert the insertion sheet PM between the two sheets P1 and P2 separated from the two-ply sheet PJ.

With reference to FIGS. 6A to 6C, the first guide 25 is described below. The first guide 25 is disposed between the first and second separation claws 16 and 17 and the winding roller 20 in the third conveyance path K3 and functions as a limiter to limit an amount of slack of the first sheet P1 that is an inner sheet of the two sheet P1 and P2 of the two-ply sheet PJ wound around the winding roller 20.

Specifically, the first guide 25 as the limiter is a conveyance guide disposed on the side in which the winding roller 20 is disposed with respect to an imaginary plane S1, that is, above the imaginary plane S1 in FIG. 6A, in the third conveyance path. The imaginary plane S1 is an imaginary plane passing through the winding start position W of the winding roller 20 and the nip of the third conveyance roller pair 6 in the third conveyance path (see FIG. 6A). The first guide 25 has a shape like a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third conveyance path K3 and a conveyance guide of the first branched conveyance path K4. That is, the first guide 25 guides the sheet conveyed on the third conveyance path K3, the sheet conveyed on the first branched conveyance path K4, and the sheet wound around the winding roller 20.

In the third conveyance path K3, the first guide 25 limits bending the two-ply sheet PJ upward (in particular, bending the first sheet P1 upward) between the winding roller 20 and the third conveyance roller pair 6. Therefore, the gap C in the two-ply sheet PJ that is mainly formed by bending the first sheet P1 upward is intensively formed between the first guide 25 and the third conveyance roller pair 6. Accordingly, the above-described configuration can increase the size of the gap C even if the winding amount of the two-ply sheet PJ wound around the winding roller 20 is not large, and the first separation claws 16 can smoothly enter the gap C to separate the two-ply sheet PJ.

With reference to FIGS. 6A to 6C, the second guide 26 is described below. The second guide 26 is disposed between the first and second separation claws 16 and 17 and the winding roller 20 in the third conveyance path K3 and functions as a guide to guide the second sheet P2 that is an outer sheet of the two sheet P1 and P2 of the two-ply sheet PJ wound around the winding roller 20.

Specifically, the second guide 26 as the guide is a conveyance guide disposed on the side in which the winding roller 20 is not disposed with respect to the imaginary plane S1, that is, below the imaginary plane S1 in FIG. 6A, in the third conveyance path. The second guide 26 is disposed to face the lower surface of the sheet from a portion upstream from the second conveyance roller pair 5 to a portion downstream from the third conveyance roller pair 6 in the forward direction. That is, the second guide 26 guides the sheet conveyed on the third conveyance path K3.

In the third conveyance path K3 between the winding roller 20 and the third conveyance roller pair 6, a clearance between the first guide 25 and the second guide 26 is set to be a value by which the sheet having the largest thickness can be conveyed to limit a gap between the sheets P1 and P2 of the two-ply sheet PJ between the first guide 25 and the second guide 26 not to be too large. Therefore, the gap C in the two-ply sheet PJ that is mainly formed by bending the first sheet P1 upward is intensively formed between an end of the first guide 25 and the third conveyance roller pair 6. Accordingly, the first separation claws 16 can smoothly enter the gap C to separate the two-ply sheet PJ.

With reference to FIGS. 6A to 6C, the abnormality detection sensor 46 is described below. The abnormality detection sensor 46 functions as an abnormality detection device to detect an abnormal state in which the gap C formed between the two sheets P1 and P2 at a predetermined position (that is between the third conveyance roller pair 6 and the winding roller 20) is not larger than a predetermined size before movements of the first separation claws 16 from the standby positions (that is, movements from the standby positions illustrated in FIG. 12 to separation positions illustrated in FIG. 10B and FIG. 9. The predetermined size is a size of the gap C into which the first separation claws 16 can enter and is determined by experiments. That is, the abnormality detection sensor 46 as the abnormality detection device detects the abnormal state in which the gap C formed between the two sheets P1 and P2 at a predetermined position is not larger than the predetermined size before the first separation claws 16 are inserted into the gap C.

In other words, at a timing at which the gap C is formed between the two sheets P1 and P2 as illustrated in FIGS. 5D and 6A, the abnormality detection sensor 46 as the abnormality detection device detects the abnormal state such as a state in which the gap is not formed at all or a state in which the gap is not formed as a sufficient gap C.

In the present embodiment, the controller notifies the occurrence of the abnormal state when the abnormal state is detected by the abnormality detection sensor 46 that is the abnormality detection device. Specifically, as illustrated in FIG. 1, the sheet separation device 1 includes an operation display panel 49 as an operation display device on the exterior of the sheet separation device 1 to display various kinds of information about the sheet separation device 1 and input various kinds of commands. When the controller determines 5 that the abnormal state occurs based on the results detected by the abnormality detection sensor 46, that is, when the two-ply sheet PJ does not have the sufficiently large gap C, the controller controls the operation display panel 49 to display that the abnormal state is detected. For example, the operation display panel 49 displays "Since an abnormality has occurred, the process of inserting the insertion sheet is stopped. Please check the setting direction of the two-ply sheet in the first feed tray. If the setting direction is correct and similar abnormalities are repeated, please contact a service person."

The above-described abnormality detection sensor 46 as the abnormality detection device may be a lever type sensor that comes into contact with the upper first sheet P1 of the two-ply sheet PJ forming the gap C larger than the predetermined size or other type sensors.

With reference to FIGS. 4A to 8C, the following describes operations of the sheet separation device 1 to separate the two-ply sheet PJ.

In the description of the operations, operations of the first separation claws 16 and the second separation claw 17 are appropriately described with reference to FIGS. 9, 10A to 10E, and 12, and the control flow is described with reference to a flowchart of FIG. 11, that is, FIGS. 11A and 11B.

Figure 11A:
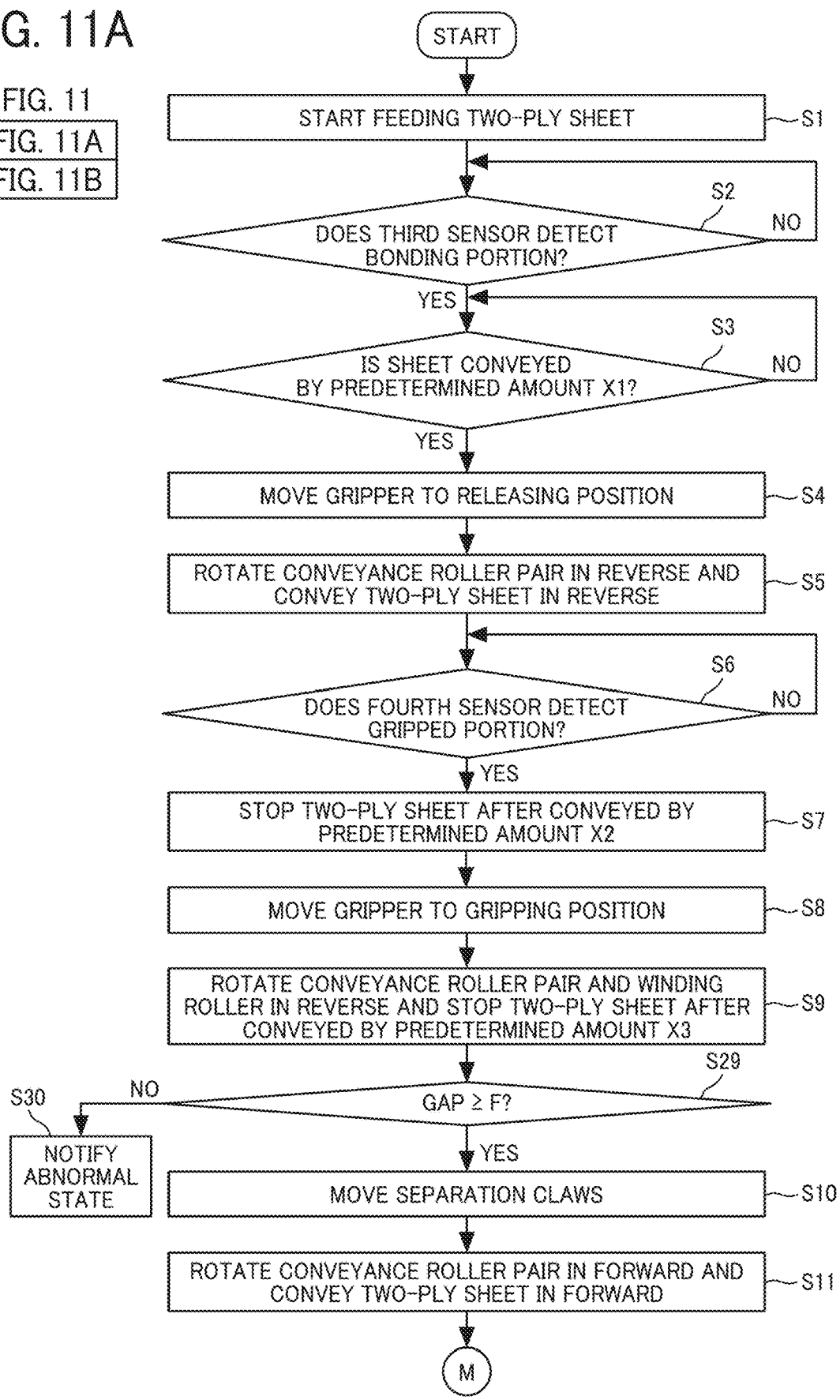
FIGS. 11A and 11B is a flowchart illustrating control performed in the sheet separation device according to the first embodiment.

After the first feed roller 2 and the first conveyance roller pair 4 start feeding the two-ply sheet PJ from the first feed tray 11 in step S1 of FIG. 11A, as illustrated in FIG. 4A, the second conveyance roller pair 5 conveys the two-ply sheet PJ with the bonding portion A as a front end in the forward direction that is a direction from the right side to the left side in FIG. 4A in the third conveyance path K3.

At this time, the controller controls the moving mechanism 30 so that the gripper 32 is positioned at the gripping position. That is, the cam 34 moves to a rotational position at which the cam 34 does not push the arm 31. When the gripper 32 is positioned at the gripping position as described above, the gripper 32 does not interfere the sheet conveyance in the third conveyance path K3. In addition, the first separation claws 16 and the second separation claw 17 stand by at the standby positions at which the first separation claws 16 and the second separation claw 17 do not interfere with the conveyance of the sheets in the third conveyance path K3. The switching claws 15 stand by at the standby positions (illustrated in FIG. 1) at which the switching claws 15 do not interfere with the conveyance of the sheets in the third conveyance path K3.

Subsequently, the controller determines whether the third sensor 43 detects the bonding portion A of the two-ply sheet PJ (that is a front end of the two-ply sheet PJ conveyed in the forward direction and the one end of the two-ply sheet PJ) in step S2 of FIG. 11A. The controller uses a timing at which the third sensor 43 detects the bonding portion A as a trigger and, as illustrated in FIG. 4B, the controller controls the third conveyance roller pair 6 to convey the two-ply sheet PJ in the forward direction by a predetermined amount X1 until the gripped portion B of the two-ply sheet PJ (that is the other end of the two-ply sheet PJ and a back end of the two-ply sheet PJ conveyed in the forward direction) passes through the position of the winding roller 20 in step S3 of FIG. 11A.

As illustrated in FIG. 4C, the controller temporarily stops the third conveyance roller pair 6 to stop the conveyance of the two-ply sheet PJ conveyed by the predetermined amount X1 and controls the gripper 32 to move from the gripping position to the releasing position in step S4 of FIG. 11A. That is, the cam 34 moves to a rotational position at which the cam 34 pushes the arm 31. In this state, the gripped portion B of the two-ply sheet PJ can be received between the gripper 32 and the receiving portion 20b.

Then, as illustrated in FIG. 4D, the third conveyance roller pair 6 rotates in reverse to start conveyance of the two-ply sheet PJ in the reverse direction in step S5 of FIG. 11A. At this time, the fourth sensor 44 detects the gripped portion B of the two-ply sheet PJ that is the other end of the two-ply sheet PJ and the front end of the two-ply sheet PJ conveyed in the reverse direction.

Subsequently, as illustrated in FIG. 5A, the controller uses the timing at which the fourth sensor 44 detects the gripped portion B of the two-ply sheet PJ as a trigger in step S6 of FIG. 11A and stops the conveyance of the two-ply sheet PJ in step S7 of FIG. 11A at a timing at which the third conveyance roller pair 6 conveys the two-ply sheet PJ by a predetermined amount X2 that is a timing at which the gripped portion B of the two-ply sheet PJ reaches the position of the winding roller 20 that is the winding start position W.

After the gripped portion B reaches the winding start position W, as illustrated in FIG. 5B, the gripper 32 is moved from the releasing position to the gripping position in step S8 of FIG. 11A. That is, the cam 34 moves to a rotational position at which the cam 34 does not push the arm 31. In step S8, as illustrated in FIG. $5B^1$, the end surface of the other end of the two-ply sheet PJ does not abut on any member, and the gripped portion B is gripped between the gripper 32 and the receiving portion 20b.

Next, as illustrated in FIG. 5C, the winding roller 20 rotates in reverse (that is, counterclockwise) while the gripper 32 grips the two-ply sheet PJ, and the third conveyance roller pair 6 again rotates in reverse together with the winding roller 20. As the winding roller 20 rotates, the gap C is formed between the two sheets P1 and P2 of the two-ply sheet PJ between the winding roller 20 and the third conveyance roller pair 6 as illustrated in FIG. 5D. While the gap C is formed, the first guide 25 and the second guide 26 limit the bend of the two-ply sheet PJ in the vicinity of the winding roller 20. Accordingly, the gap C of the two-ply sheet PJ is intensively formed near the third conveyance roller pair 6.

Since the controller uses the timing at which the fourth sensor 44 disposed downstream from the third conveyance roller pair 6 in the reverse direction detects the gripped portion B of the two-ply sheet PJ conveyed in the reverse direction as the trigger to determine the timing at which the gripper 32 and the receiving portion 20b grip the gripped portion B, the gripped portion B of the two-ply sheet PJ can be accurately conveyed to a desired gripping position regardless of variations in sheet lengths with respect to the sheet conveyance amount X2 (Note that the size of sheets includes an error even if the sheets are sold as the same size).

The fourth sensor 44 can shorten the sheet conveyance amount X2 that is measured since the fourth sensor 44 detects the front end of the two-ply sheet PJ conveyed in the reverse direction regardless of the sheet length. Therefore, the above-described configuration can reduce variation in the conveyance amount X2 and enables an accurate conveyance of the gripped portion B of the two-ply sheet PJ to the desired gripping position.

Accordingly, the fourth sensor 44 is preferably disposed near the winding roller 20.

With reference to FIG. 5C', a mechanism that winding the two-ply sheet PJ around the winding roller 20 generates the gap C in the two-ply sheet PJ between the winding roller 20 and the third conveyance roller pair 6 is described above.

The following additionally describes the mechanism.

In the two-ply sheet PJ wound around the winding roller 20, the gripped portion B of the two-ply sheet PJ gripped by the gripper 32 does not generate a slip between the sheets P1 and P2. However, winding the two-ply sheet PJ around the winding roller 20 generates the difference in winding circumferential length between the two sheets P1 and P2 and, therefore, causes a slip between the two sheets P1 and P2, and a conveyance amount of the inner sheet P1 is smaller than a conveyance amount of the outer sheet P2. As a result, slack occurs in the inner sheet P1 between the nip of the third conveyance roller pair 6 and the winding roller 20. Winding the two-ply sheet PJ around the winding roller 20 one or more times additionally generates the difference in winding circumferential length between the inner circumference and the outer circumference by the thickness of the sheet and increases the slack.

Specifically, a distance from the rotation shaft 20a (i.e. the center of the shaft) of the winding roller 20 to the outer sheet P2 is R+ΔR when a distance from the rotation shaft 20a (i.e. the center of the shaft) of the winding roller 20 to the inner sheet P1 is R, and the thickness of the inner sheet P1 is ΔR. The difference between a radius of the inner sheet P1 wound around the winding roller 20 and a radius of the outer sheet P2 wound around the inner sheet P1, that is, the thickness of the inner sheet P1ΔR, generates a circumferential length difference of 2×ΔR×π when the two-ply sheet PJ is wound around the winding roller 20 by one round. Therefore, winding the two-ply sheet PJ around the winding roller 20 M times generates the circumferential length difference 2×ΔR×π×M that is a slack of the inner sheet P1.

Finally, the slack is accumulated between the third conveyance roller pair 6 and the winding roller 20, and the gap C corresponding to 2×ΔR×π×M is formed between the two sheets P1 and P2.

In step S9 of FIG. 11A, after the winding roller 20 starts the winding of the two-ply sheet PJ, as illustrated in FIG. 6A, the third conveyance roller pair 6 stops the conveyance of the two-ply sheet PJ and the winding roller 20 stops the winding of the two-ply sheet PJ at the timing at which the third conveyance roller pair 6 conveys the two-ply sheet by a predetermined amount X3. In this state, the two-ply sheet PJ is wound around the winding roller 20 one or more times, and the gap C in the two-ply sheet PJ (a distance between the sheet P1 and the sheet P2) is sufficiently widened if the two-ply sheet PJ is normally separated.

When the gap C is widened, the controller determines whether the gap C formed in the two-ply sheet PJ is equal to or larger than a predetermined distance F based on results detected by the abnormality detection sensor 46 in step S29 of FIG. 11A.

When the controller determines that the gap C is the sufficiently large gap equal to or larger than the predetermined size F, the controller determines that subsequent separation operations of the first separation claws 16 does not cause a problem and controls the first separation claws 16 to insert into the gap C sufficiently widened in the two-ply sheet PJ as illustrated in FIG. 6B in step S10 of FIG. 11A. That is, as illustrated in FIGS. 9 and 10A, each of the pair of first separation claws 16 is moved from the standby position to a position to separate the two-ply sheet PJ.

Next, as illustrated in FIG. 6C, the third conveyance roller pair 6 and the winding roller 20 start rotating in forward, that is, clockwise in step S11 of FIG. 11A after the first separation claws 16 are inserted into the gap C. That is, as illustrated in FIGS. 10A to 10C, the first separation claw 16 inserted into the gap C of the two-ply sheet PJ relatively moves from the one end A to the other end B with respect to the two-ply sheet PJ. The above described relative movement in the present embodiment is caused by moving the two-ply sheet PJ itself in a direction indicated by arrow in FIGS. 10B and 10C without changing the positions of the first separation claws 16 in the conveyance direction.

Figure 11B:
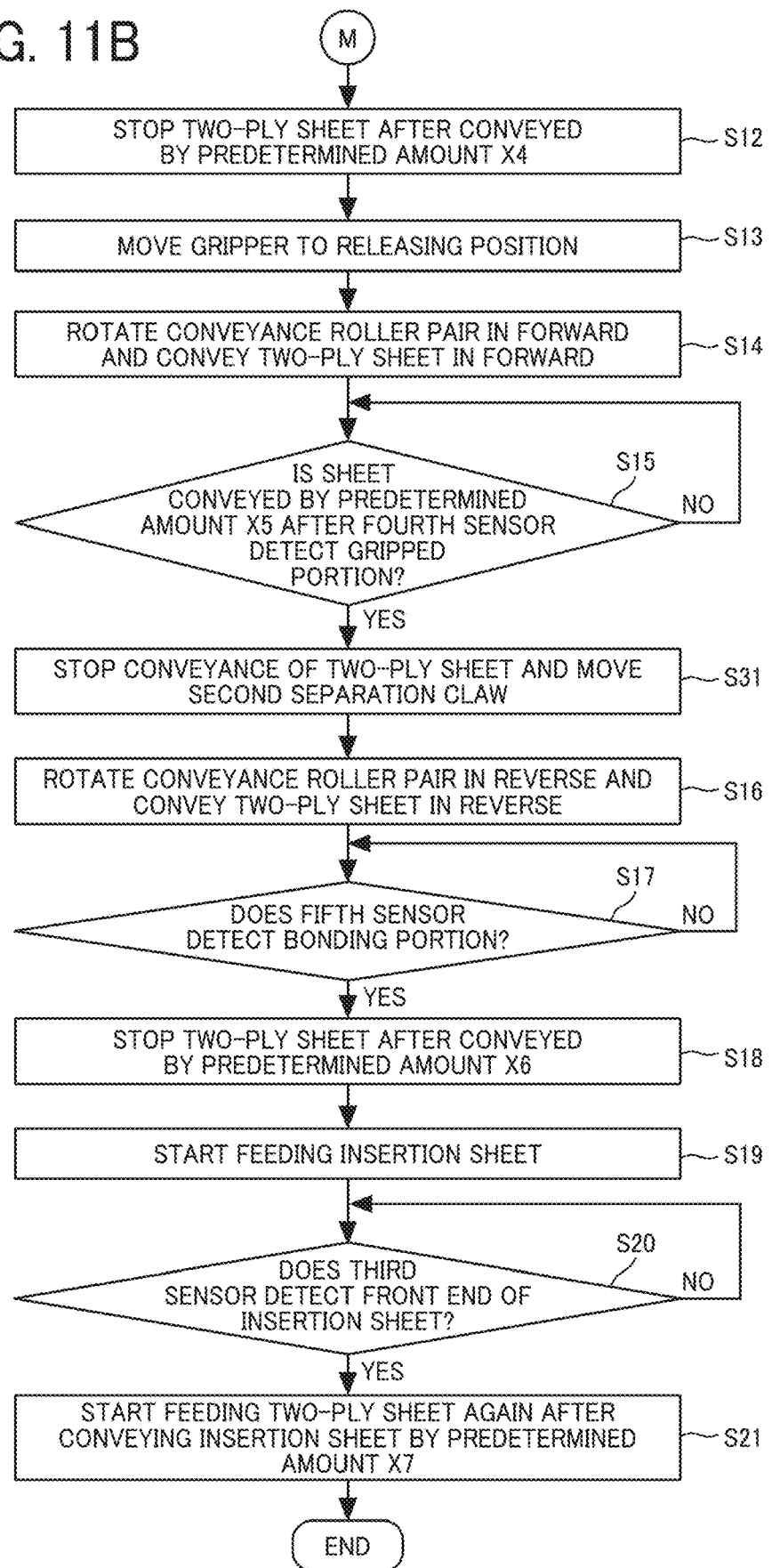

In step S12 of FIG. 11B, as illustrated in FIG. 7A, the controller stops forward rotation in the third conveyance roller pair 6 and forward rotation in the winding roller 20 after the forward rotation in the third conveyance roller pair 6 conveys the two-ply sheet PJ by a predetermined amount of X4. At this time, the gripped portion B of the two-ply sheet PJ is positioned on the third conveyance path K3 (that is, at the winding start position W illustrated in FIG. 5B), and the gripper 32 can release the gripped portion B. In addition, as illustrated in FIG. 10C, the first separation claws 16 stop near the other end of the two-ply sheet PJ after the first separation claws are inserted into the gap C of the two-ply sheet and relatively moves to the other end B of the two-ply sheet PJ with respect to the two-ply sheet PJ.

In this state, the gripper 32 moves from the gripping position to the releasing position in step S13 of FIG. 11B. That is, the cam 34 moves to a rotational position at which the cam 34 does not push the arm 31. The gripper 32 releases gripping the two-ply sheet PJ. In the present embodiment, the cam 34 in the moving mechanism 30 moves to release the gripping of the gripper 32, but the third conveyance roller pair 6 may pull the two-ply sheet from the gripper 32 to release the gripping and convey the two-ply sheet without the above-described movement of the cam 34 in the moving mechanism 30 when a pulling force due to the conveyance of the third conveyance roller pair 6 is larger than a force of the gripper 32 that grips the tow-ply sheet PJ.

In step S14 of FIG. 11B, as illustrated in FIG. 7B, the third conveyance roller pair 6 again rotates in forward to start conveyance of the two-ply sheet PJ in the forward direction. At this time, the fourth sensor 44 detects the gripped portion B of the two-ply sheet PJ that is the other end of the two-ply sheet PJ and the back end of the two-ply sheet PJ conveyed in the forward direction. In addition, the gripper 32 moves from the releasing position to the gripping position, and the switching claws 15 rotates clockwise from the standby position to a switching position after the gripped portion B of the two-ply sheet PJ that is the other end of the two-ply sheet PJ and the back end of the two-ply sheet PJ passes over the switching claws 15. The controller determines whether the third conveyance roller pair 6 conveys the two-ply sheet PJ by a predetermined amount X5 after the timing, as a trigger, at which the fourth sensor 44 detects the back end of the two-ply sheet PJ conveyed in the forward direction in step S15 of FIG. 11B and stops the conveyance of the two-ply sheet PJ when the third conveyance roller pair 6 conveys the two-ply sheet PJ by the predetermined amount X5. In step S31 of FIG. 11B, the second separation claw 17 moves in the width direction as illustrated in FIG. 10D. As a result, as illustrated in FIG. 7B, back ends of the two sheets P1 and P2 of the two-ply sheet PJ conveyed in the forward direction are separated and largely opened (see FIG. 10E).

Then, as illustrated in FIG. 7C, the third conveyance roller pair 6 rotates in reverse to start conveyance of the two-ply sheet PJ in the reverse direction in step S16 of FIG. 11B. At this time, since the switching claws 15 are disposed at the switching positions at which the switching claws 15 block the two-ply sheet PJ moving to the third conveyance path K3, the two sheets P1 and P2 separated each other are guided to the two branched conveyance paths K4 and K5, respectively, as illustrated in FIG. 7C. At this time, the fifth sensor 45 (see FIG. 1) detects the bonding portion A of the two-ply sheet PJ that is the one end of the two-ply sheet PJ and the back end of the two-ply sheet PJ conveyed in the reverse direction.

Subsequently, the controller uses, as a trigger, the timing at which the fifth sensor 45 (see FIG. 1) detects the back end of the two-ply sheet PJ conveyed in the reverse direction that is the bonding portion A in step S17 of FIG. 11B and stops the conveyance of the two-ply sheet PJ at a timing at which the third conveyance roller pair 6 conveys the two-ply sheet PJ by a predetermined amount X6 as illustrated in FIG. 8A in step S18 of FIG. 11B. When the third conveyance roller pair 6 conveys the two-ply sheet PJ by the predetermined amount X6, the bonding portion A of the two-ply sheet PJ is in the nip of the third conveyance roller pair 6 or at a position slightly leftward from the nip. That is, the third conveyance roller pair 6 nips the one end of the two-ply sheet PJ.

Subsequently, as illustrated in FIG. 8A, the second conveyance roller pair 5 starts feeding the insertion sheet PM from the second feed tray 12 (see FIG. 1) in step S19 of FIG. 11B. At this time, the third sensor 43 detects the front end of the insertion sheet PM conveyed in the forward direction that is also referred to as the one end of the insertion sheet PM. In addition, as illustrated in FIG. 8B, the first separation claws 16 and the second separation claw 17 move to the standby positions.

Figure 10E:
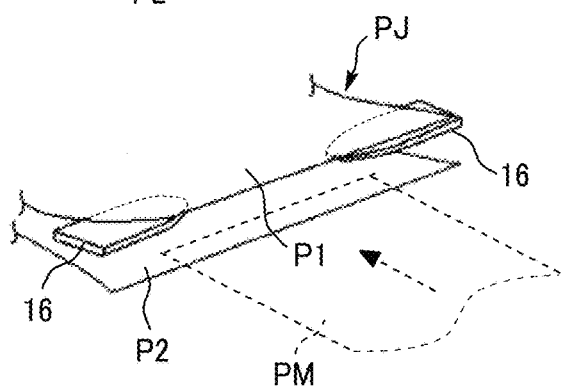

Subsequently, the controller uses the timing at which the third sensor 43 detects the front end of the insertion sheet PM as a trigger in step S20 of FIG. 11B. After the second conveyance roller pair 5 conveys the insertion sheet PM by a predetermined amount X7 since the third sensor 43 detects the front end of the insertion sheet PM, the third conveyance roller pair 6 again starts the conveyance of the two-ply sheet PJ in the forward direction in step S21 of FIG. 11B as illustrated in FIGS. 8C and 10E. At this time, the insertion sheet PM is accurately sandwiched at a desired position between the two sheets P1 and P2.

Thus, the controller ends processes to insert the insertion sheet PM between the two sheets P1 and P2 in the two-ply sheet PJ. The third conveyance roller pair 6 conveys the two-ply sheet PJ with the insertion sheet PM inserted therein in the forward direction, and the two-ply sheet PJ with the insertion sheet PM inserted therein is ejected and placed on the ejection tray 13 (see FIG. 1).

In contrast, when the controller determines that the gap C in the two-ply sheet PJ is not the sufficiently large gap equal to or larger than the predetermined distance F in step S29 of FIG. 11A, that is, when the controller determines that the abnormal state occurs based on results detected by the abnormality detection sensor 46, the controller determines that subsequent separation operations of the first separation claws 16 cause various kinds of problems and does not move the first separation claws 16 from the standby positions to the separation positions. In addition, the controller controls the operation display panel 49 (see FIG. 1) to notify that the occurrence of the abnormal state stops the separation operations and the insertion operations of the insertion sheet PM in step S30 of FIG. 11A.

Next, a first variation is described.

Figure 13:
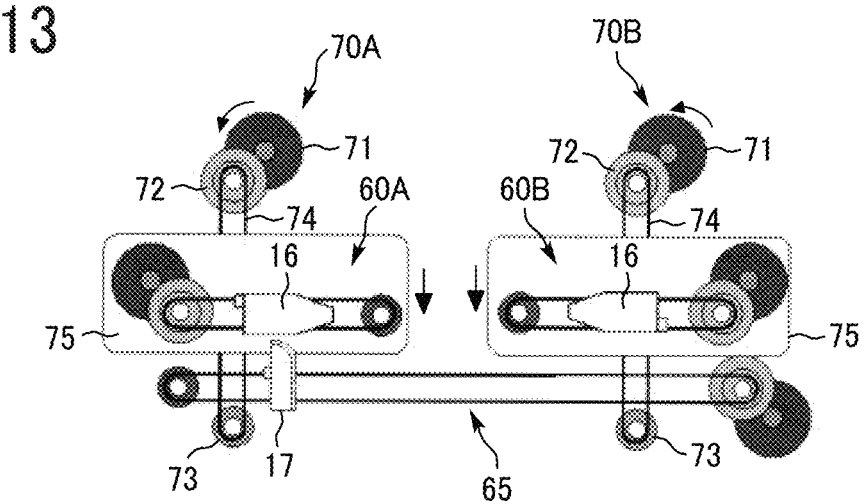
FIG. 13 is a schematic view illustrating a configuration of a driving device for each of the first and second separation claws according to a first variation of the first embodiment.

As illustrated in FIG. 13, the sheet separation device 1 according to the first variation also includes the first separation claws 16 and the second separation claw 17. In the first variation, the second separation claw 17 is also inserted between two sheets P1 and P2 at the other end of the two-ply sheet near the gripped portion B (that is the back end of the two-ply sheet PJ conveyed in the forward direction) and moves in the width direction after the first separation claws 16 inserted into the gap C in the two-ply sheet PJ relatively move from the one end of the two-ply sheet PJ near the bonding portion A to the other end of the two-ply sheet PJ near the gripped portion B, improving the separation at the back end of the two-ply sheet PJ.

In the first variation, the relative movement of the first separation claws 16 with respect to the two-ply sheet PJ is not caused by the movement of the two-ply sheet PJ in the conveyance direction, but is caused by the movement of the first separation claws 16 in the conveyance direction. The controller controls second driving devices 70A and 70B to move the first separation claws 16 in the conveyance direction (that is the vertical direction in FIG. 13) as illustrated in FIG. 13.

Specifically, as illustrated in FIG. 13, the pair of driving devices 60A and 60B moves the pair of first separation claws 16 in the width direction, and each of the first separation claws 16 disposed on each of moving tables 75. The second driving devices 70A and 70B move the pair of moving tables 75 in the conveyance direction, respectively so that the first separation claw 16 relatively moves on the two-ply sheet PJ in the conveyance direction at the timing described above with reference to FIGS. 6A to 7C.

Specifically, each of the pair of second driving devices 70A and 70B includes a motor 71, a gear pulley 72, a pulley 73, a timing belt 74. The gear pulley 72 has a step-like ring shape including a gear that meshes with a motor gear disposed on a motor shaft of the motor 71 and a pulley that stretches and supports the timing belt 74 together with the pulley 73. The moving table 75 has a fixed portion that is fixed to a part of the timing belt 74.

In the second driving devices 70A and 70B as configured described above, the motor 71 drives to rotate the motor shaft in a direction indicated by arrow in FIG. 13 (i.e. counterclockwise), the gear pulley 72 rotates clockwise, the timing belt 74 rotates clockwise, and the pair of moving table 75 moves from one end in the conveyance direction to the other end in the conveyance direction (that is, the first separation claws 16 moves in a direction away from the bonding portion A). In contrast, when the motor 71 drives to rotate the motor shaft in the direction opposite to the arrow direction in FIG. 13, the pair of moving tables 75 moves from the other end in the conveyance direction to the one end in the conveyance direction (that is, the first separation claws 16 approach the bonding portion A and move to a reference position).

Next, a second variation is described.

Figure 14A:
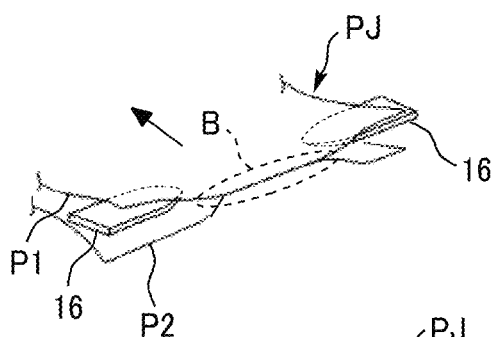
FIGS. 14A and 14B are perspective views illustrating operations of separation claws according to a second variation of the first embodiment.
Figure 14B:
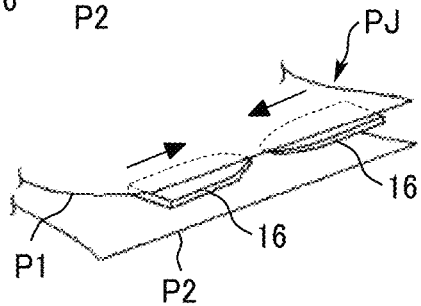
Figure 15:
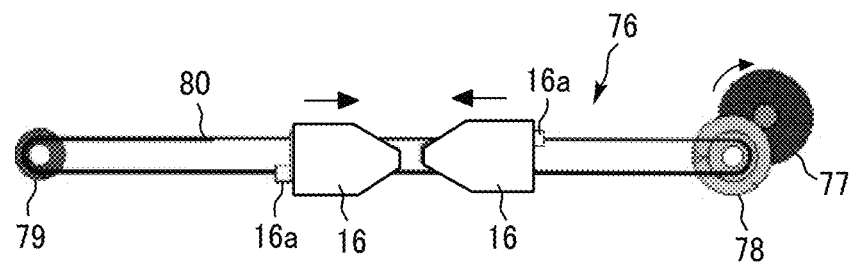
FIG. 15 is a schematic view illustrating a configuration of a driving device for the separation claws in FIGS. 14A and 14B.

As illustrated in FIGS. 14A, 14B, and 15, the sheet separation device 1 according to the second variation does not include the second separation claw 17 and includes only one type of separation claws 16 that are the pair of first separation claws 16 disposed at both ends of the conveyance path in the width direction.

The separation claws 16 are inserted into the gap C in the two-ply sheet PJ, move from the one end of the two-ply sheet PJ near the bonding portion A to the other end of the two-ply sheet PJ near the gripped portion B, and approach each other between the two sheets P1 and P2 at the other end of the two-ply sheet PJ.

Specifically, the controller controls a driving device 76 (see FIG. 15) to move the pair of separation claws 16 as follows. As illustrated in FIGS. 10A to 10C, the pair of separation claws 16 is inserted into the both ends of the gap C in the two-ply sheet PJ in the width direction and relatively moves to the other end of the two-ply sheet PJ that is the gripped portion B. After the pair of separation claws reaches to the other end of the two-ply sheet PJ, as illustrated in FIGS. 14A and 14B, the pair of separation claws on the other end of the two-ply sheet PJ moves in the width direction from the both ends of the two-ply sheet PJ to the center of the two-ply sheet PJ between the two sheets P1 and P2. That is, the operation of the separation claw 16 according to the second variation is the same as that of the first separation claw 16 described above with reference to FIGS. 10A to 10E until the separation claw 16 reaches the position of the gripped portion B of the two-ply sheet PJ, and then the separation claw 16 moves in the width direction as illustrated in FIG. 14B, which is an operation different from that of the first separation claw 16. To enable the above-described operations of the pair of separation claws 16, the driving device 76 needs to be configured so that the pair of separation claws 16 can move from the standby positions to positions at which the pair of separation claws is close to each other.

Specifically, as illustrated in FIG. 15, the driving device 76 according to the second variation includes a motor 77, a gear pulley 78, a pulley 79, and a timing belt 80. The gear pulley 78 has a step-like ring shape including a gear that meshes with a motor gear disposed on a motor shaft of the motor 77 and a pulley that stretches and supports the timing belt 80 together with the pulley 79. One separation claw 16 of the pair of separation claws 16 includes the fixed portion 16a fixed to the belt surface of the timing belt 80 that is the upper side of the belt surface in FIG. 15, and the other separation claw 16 includes the fixed portion 16a fixed to the other belt surface of the timing belt 80 that is the lower side of the belt surface in FIG. 15.

In the driving device 76 as configured described above, the motor 77 drives to rotate the motor shaft in a direction indicated by arrow in FIG. 15 (i.e. clockwise), the gear pulley 78 rotates counterclockwise, the timing belt 80 rotates counterclockwise, and the pair of separation claws 16 moves from the outside portions in the width direction to the center portion in the width direction (that is, the pair of separation claws 16 approaches each other). In contrast, when the motor 77 drives to rotate the motor shaft in the direction opposite to the arrow direction in FIG. 15, the pair of first separation claws 16 moves from the center portion in the width direction toward the outside portions in the width direction (that is, the pair of the separation claws 16 moves in a direction away from each other). Driving the motor 77 adjusts the distance between the pair of separation claws 16 to move the pair of separation claws 16 to the standby position, the insertion position (the peeling position) at the both ends of the two-ply sheet PJ in the width direction of the two-ply sheet PJ illustrated in FIGS. 10A to 10C, or the insertion position (the peeling position) at the central portion in the width direction of the two-ply sheet PJ illustrated in FIG. 14B.

The sheet separation device 1 according to the second variation satisfactorily separates an entire area of the two-ply sheet PJ in the width direction at the other end of the two-ply sheet PJ because the separation claws 16 move over the entire area in the width direction at the other end of the two-ply sheet PJ that is the back end of the two-ply sheet PJ.

Figure 16A:
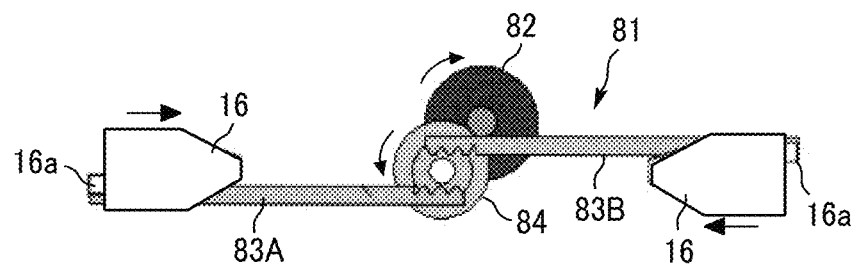
FIGS. 16A and 16B are schematic views each illustrating a configuration of a driving device according to another embodiment in the first embodiment for the separation claws.

A driving device to move the pair of separation claws 16 in the width direction may be the driving device 76 using a belt type moving mechanism as illustrated in FIG. 15 or a driving device 81 using a pinion rack type moving mechanism as illustrated in FIG. 16A. Specifically, the driving device 81 illustrated in FIG. 16A includes a motor 82, a gear pinion 84, racks 83A and 83B. The gear pinion 84 has a step-like ring shape including a gear that meshes with a motor gear disposed on a motor shaft of the motor 82 and a pinion gear that meshes with each of rack gears of a pair of racks 83A and 83B. One separation claw 16 of the pair of separation claws 16 includes the fixed portion 16*a* fixed to the rack 83A, and the other separation claw 16 includes the fixed portion 16*a* fixed to the rack 83B.

In the driving device 81 as configured described above, the motor 82 drives to rotate the motor shaft in a direction indicated by arrow in FIG. 16A (i.e. clockwise), the gear pinion 84 rotates counterclockwise, and the pair of separation claws 16 moves from the outside portions in the width direction to the center portion in the width direction (that is, the pair of separation claws 16 approaches each other). In contrast, when the motor 82 drives to rotate the motor shaft in the direction opposite to the arrow direction in FIG. 16A, the pair of separation claws 16 moves from the center in the width direction toward the outside in the width direction (that is, the pair of the separation claws 16 moves in a direction away from each other).

Figure 16B:
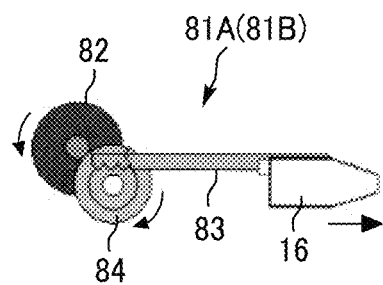

As in the first variation, the relative movement of the first separation claws 16 with respect to the two-ply sheet PJ in the second variation may be not caused by the movement of the two-ply sheet PJ in the conveyance direction, but may be caused by the movement of the separation claws 16 in the conveyance direction. To move the separation claws 16, the second driving devices 70A and 70B (see FIG. 13) may include driving devices 81A and 81B as illustrated in FIG. 16B on the moving tables 75. The driving devices 81A and 81B each include the motor 82, the gear pinion 84, and the rack 83.

A third variation is described.

Figure 17A:
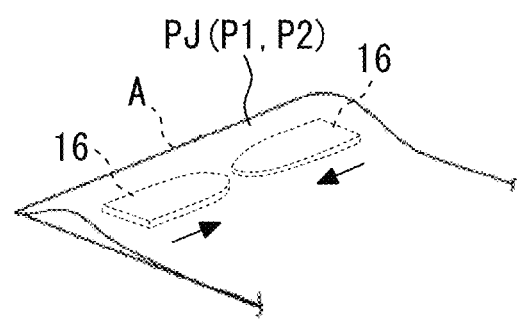
FIGS. 17A to 17C are perspective views illustrating operations of the separation claws according to a third variation in the first embodiment.
Figure 17B:
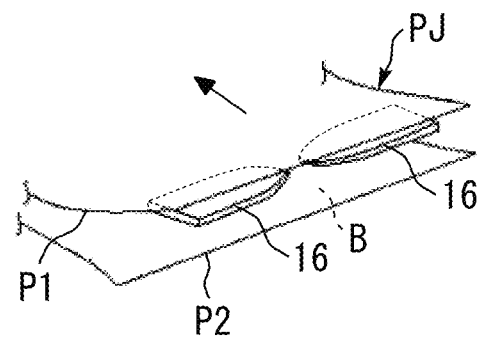
Figure 17C:
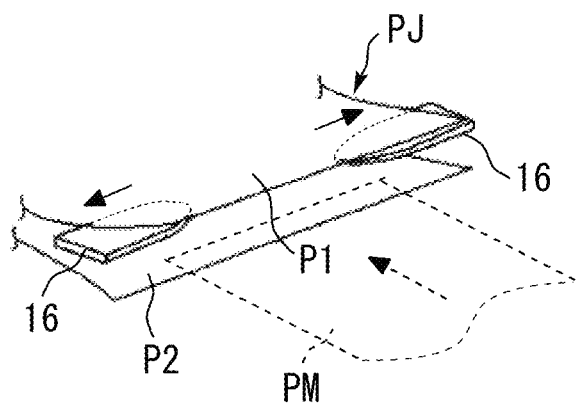

As illustrated in FIGS. 17A to 17C, the sheet separation device 1 according to the third variation includes only the pair of separation claws 16 and does not include the second separation claw 17 similar to the second variation.

In the third variation, as illustrated in FIGS. 17A and 17B, the pair of separation claws 16 is inserted into a center portion of the gap C of the two-ply sheet PJ in the width direction and moves from the one end of the two-ply sheet PJ near the bonding portion A to the other end of the two-ply sheet PJ near the gripped portion B. Subsequently, as illustrated in FIG. 17C, the pair of separation claws 16 between the two sheets at the other end of the two-ply sheet PJ moves from the center of the two-ply sheet in the width direction to the both ends of the two-ply sheet PJ in the width direction.

The sheet separation device 1 configured as described above satisfactorily separates an entire area of the two-ply sheet PJ in the width direction at the other end of the two-ply sheet PJ because the separation claws 16 move over the entire area in the width direction at the other end of the two-ply sheet PJ that is the back end of the two-ply sheet PJ.

A fourth variation is described.

Figure 18:
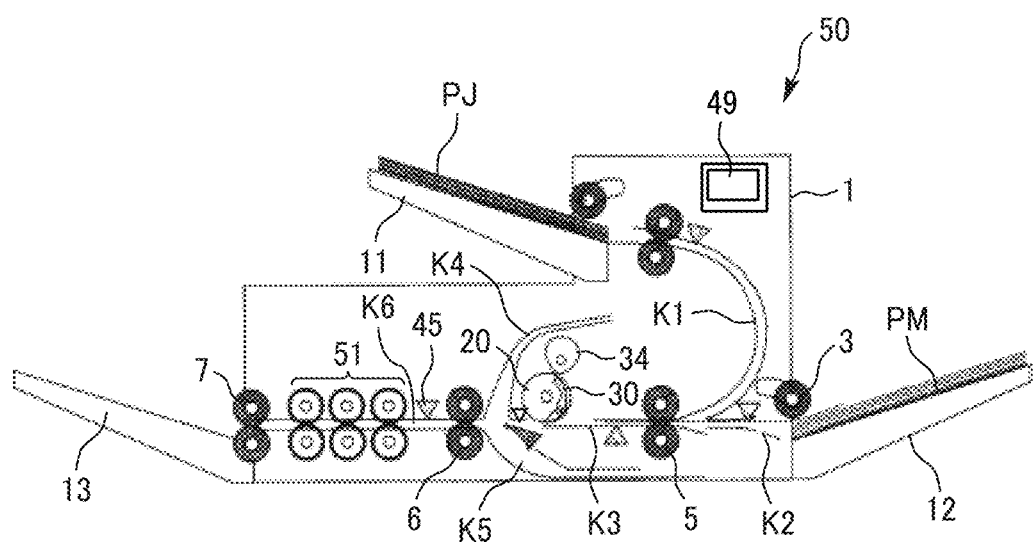
FIG. 18 is a schematic view illustrating a laminator according to a fourth variation in the first embodiment.

As illustrated in FIG. 18, a laminator 50 as the fourth variation includes the sheet separation device 1 illustrated in FIG. 1.

The laminator 50 includes a lamination processor 51 downstream from the third conveyance roller pair 6 in the sheet separation device 1 in the forward direction. The lamination processor 51 performs a laminating process on the two-ply sheet PJ in which the insertion sheet PM is inserted between the two sheets P1 and P2 separated by the sheet separation device 1 (that is, the normally processed two-ply sheet PJ).

The lamination processor 51 includes a plurality of heat and pressure roller pairs that apply heat and pressure to the two-ply sheet PJ while conveying, in the forward direction, the two-ply sheet PJ into which the insertion sheet PM is inserted. The fourth conveyance path K6 is disposed between the third conveyance roller pair 6 and the lamination processor 51.

As described above with reference to FIGS. 4A to 8C, the two-ply sheet PJ (into which the insertion sheet PM has been inserted after the separation operations) passes through the fourth conveyance path K6 and is conveyed to the lamination processor 51. The two-ply sheet PJ into which the insertion sheet PM is inserted inside passes through the lamination processor 51, and the entire region of the two-ply sheet PJ is joined. The two-ply sheet PJ subjected to the laminating process described above is ejected to the outside of the lamination processor 51 by an ejection roller pair 7 and is placed on the ejection tray 13.

As described above, the laminator 50 according to the fourth variation performs a process to feed the sheets PJ and PM, a process to separate the two sheets P1 and P2 in the two-ply sheet PJ, a process to insert the insertion sheet PM into the space between the two separated sheets P1 and P2, and a process to perform the laminating process on the two-ply sheet PJ in which the insertion sheet PM is inserted, as a sequence of processes, thus enhancing the convenience for a user.

The laminator 50 includes the operation display panel 49. When the controller determines that the abnormal state occurs based on the results detected by the abnormality 5 detection sensor 46, the controller controls the operation display panel 49 to display that the occurrence of the abnormal state stops the separation operations and the insertion operations of the insertion sheet PM.

A fifth variation is described.

Figure 19:
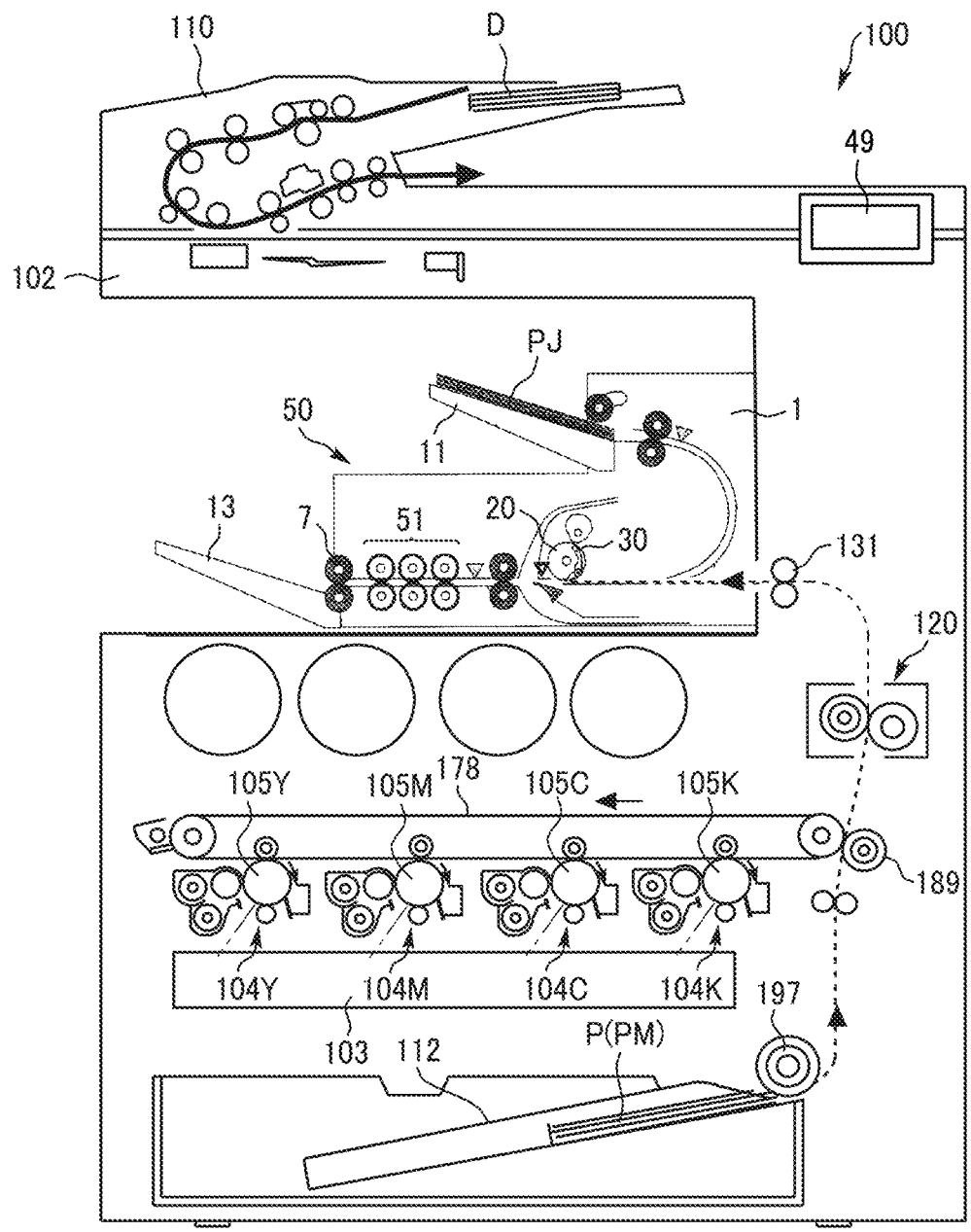
FIG. 19 is a schematic view illustrating an image forming apparatus according to a fifth variation in the first embodiment.

As illustrated in FIG. 19, an image forming apparatus 100 as the fifth variation includes the laminator 50 illustrated in FIG. 18 and an image forming apparatus main body that forms an image on a sheet P.

With reference to FIG. 19, in the image forming apparatus 100, multiple pairs of sheet conveying rollers disposed in the document feeder 110 feed the original document D from a document loading table and conveys the original document D in a direction indicated by arrow in FIG. 19, and the original document D passes over the document reading device 102. The document reading device 102 optically reads image data of the original document D passing over the document reading device 102.

The image data optically read by the document reading device 102 is converted into electric signals and transmitted to a writing device 103. The writing device 103 emits laser beams onto the photoconductor drums 105Y, 105M, 105C, and 105K based on the electric signals of the image data in each of colors, respectively, performing an exposure process.

On the photoconductor drums 105Y, 105M, 105C, and 105K of the image forming units 104Y, 104M, 104C, and 104K, a charging process, the exposure process, and a developing process are performed to form desired images on the photoconductor drums 105Y, 105M, 105C, and 105K, respectively.

The images formed on the photoconductor drums 105Y, 105M, 105C, and 105K are transferred and superimposed onto the intermediate transfer belt 178 to form a color image. The color image formed on the intermediate transfer belt 178 is transferred to the surface of the sheet P (which is the sheet to be the insertion sheet PM) fed and conveyed by a feed roller 197 from a feeding device 112 at a position at which the intermediate transfer belt 178 faces the secondary transfer roller 189.

After the color image is transferred onto the surface of the sheet P (that is the insertion sheet PM), the sheet P is conveyed to the position of a fixing device 220. The fixing device 220 fixes the transferred color image on the sheet P.

Thereafter, the sheet P is ejected from the image forming apparatus main body of the image forming apparatus 100 by an ejection roller pair 131 and is fed into the laminator 50 as the insertion sheet PM. When the laminator 50 including the sheet separation device 1 receives the insertion sheet PM, the laminator 50 has completed the process described with 5 reference to FIGS. 4A to 7C (that is, the process to separate the two-ply sheet PJ) and performs the process described with reference to FIGS. 8A to 8C (that is, the process to insert the insertion sheet PM into the two-ply sheet PJ) after the laminator 50 (the sheet separation device 1) receives the insertion sheet PM. After the lamination processor 51 performs the laminating process on the two-ply sheet PJ into which the insertion sheet PM is inserted, the ejection roller pair 7 ejects the two-ply sheet PJ to the outside of the lamination processor 51 to place the two-ply sheet PJ on the ejection tray 13.

As described above, a series of image formation processes (i.e. printing operations) in the image forming apparatus 100 and a series of sheet separation processes and the laminating process using the insertion sheet PM on which the image is formed are completed.

In the fifth variation, the image forming apparatus 100 includes the laminator 50, but may include the sheet separation device 1 illustrated in FIG. 1.

The image forming apparatus 100 includes the operation display panel 49. When the controller determines that the abnormal state occurs based on the results detected by the abnormality detection sensor 46, the controller controls the operation display panel 49 to display that the occurrence of the abnormal state stops the separation operations and the insertion operations of the insertion sheet PM.

The image forming apparatus 100 according to the fifth variation of the present disclosure is a color image forming apparatus but may be a monochrome image forming apparatus. The image forming apparatus 100 according to the fifth variation of the present disclosure employs electrophotography, but the present disclosure is not limited to this. The present disclosure may be applied to other types of image forming apparatuses such as an inkjet image forming apparatus and a stencil printing machine.

A sixth variation is described.

Figure 20:
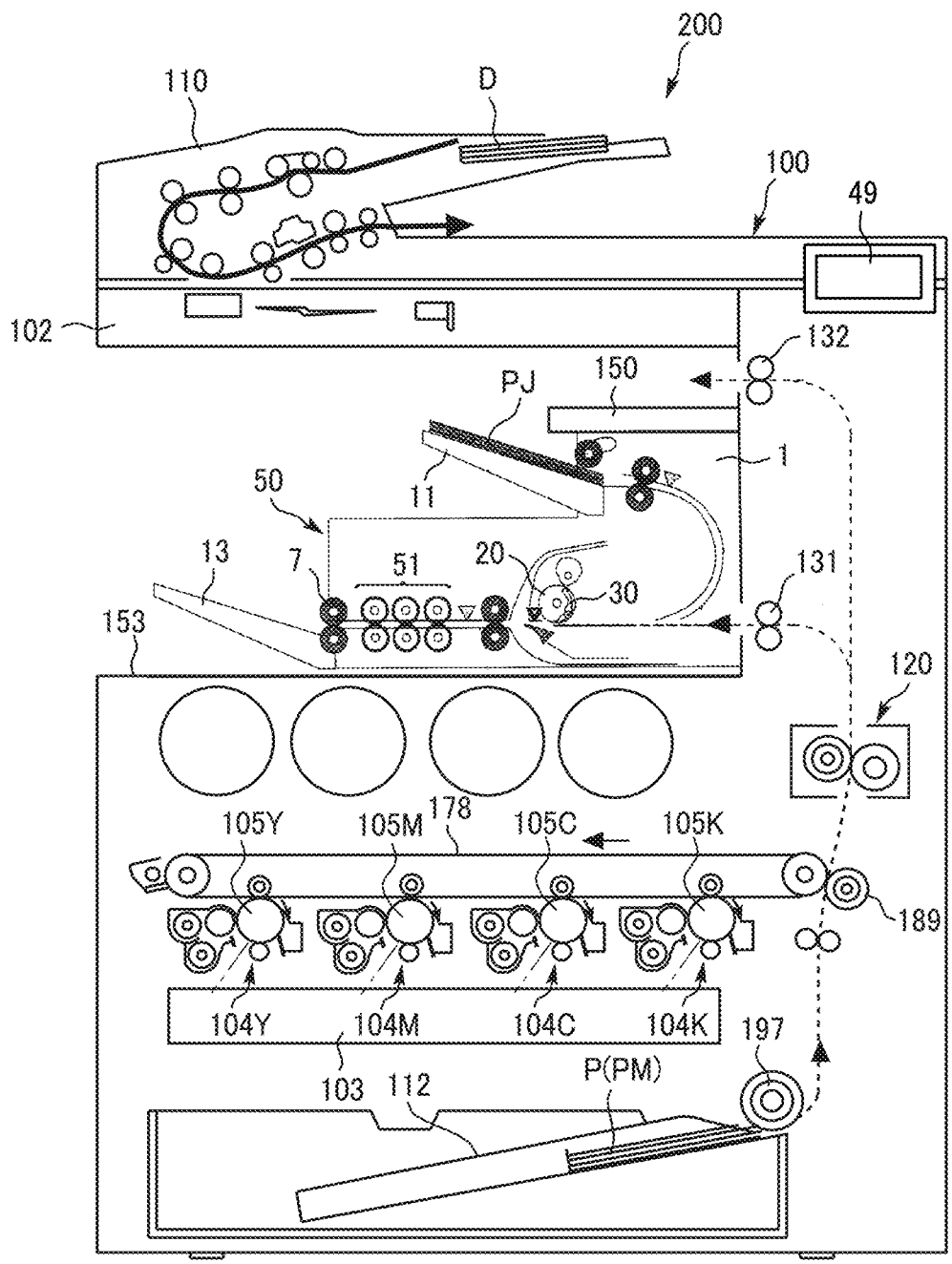
FIG. 20 is a schematic view illustrating an image forming system according to a sixth variation in the first embodiment.

As illustrated in FIG. 20, an image forming system 200 according to the sixth variation includes the image forming apparatus 100 illustrated in FIG. 19 that forms the image on the sheet P and the laminator 50 illustrated in FIG. 18, and the laminator 50 is detachably attached to the image forming apparatus 100.

In the image forming system 200 illustrated in FIG. 20, the image forming apparatus 100 performs the image formation described above with reference to FIG. 18 and ejects the sheet P (that is the insertion sheet formed a desired image) from the ejection roller pair 131 to the laminator 50, and the laminator 50 performs the laminating process on the two-ply sheet PJ to which the insertion sheet PM has been inserted, and the ejection roller pair 7 ejects the two-ply sheet PJ to the outside of the laminator 50 to place the two-ply sheet PJ on the 5 ejection tray 13.

When such a laminating process is not performed, the image forming apparatus 100 in the image forming system 200 ejects the sheet P formed the image by the image formation process from a second ejection roller pair 132 to the outside of the image forming apparatus 100 to place the sheet P on a second ejection tray 150.

The laminator 50 is detachably attached to the image forming apparatus 100 and can be detached from the image forming apparatus 100 when the laminator 50 is not necessary. The image forming apparatus 100 from which the laminator 50 is detached uses a placement surface 153 to place the laminator 50 as an ejection tray to place the sheet P formed the image by the image formation process and ejected from the ejection roller pair 131 to the outside of the image forming apparatus 100.

In the sixth variation, the image forming system 200 includes the detachable laminator 50. However, the image forming system 200 may include the sheet separation device 1 illustrated in FIG. 1 detachable.

The image forming system 200 includes the operation display panel 49. When the controller determines that the abnormal state occurs based on the results detected by the abnormality detection sensor 46, the controller controls the operation display panel 49 to display that the occurrence of the abnormal state stops the separation operations and the insertion operations of the insertion sheet PM.

As described above, the sheet separation device 1 according to the present embodiment separates the non-bonding portion of the two-ply sheet PJ in which the two sheets P1 and P2 are overlapped and bonded at one end as the bonding portion A and includes the first separation claws 16 as the first separator that are inserted into the gap C formed between the two sheets P1 and P2 of the two-ply sheet PJ at a predetermined positions. In addition, the sheet separation device 1 according to the present embodiment includes the second separation claw 17 as the second separator that is inserted between two sheets P1 and P2 at the other end B of the two-ply sheet and moves in the width direction after the first separation claws 16 inserted into the gap C in the two-ply sheet PJ relatively move from the one end of the two-ply sheet PJ to the other end of the two-ply sheet PJ that is opposite to the one end.

Thus, the above-described sheet separation device can satisfactorily separate the two sheets P1 and P2 constituting the two-ply sheet PJ.

With reference to the drawings, a second embodiment of the present disclosure are described below. Identical reference numerals are assigned to identical components or equivalents and a description of those components is simplified or omitted.

A configuration and operations of a sheet separation device 101 are described below with reference to FIG. 21.

The sheet separation device 101 separates a non-bonding portion of a two-ply sheet PJ in which two sheets P1 and P2 are overlapped and bonded together at one end of the two-ply sheet as a bonding portion A of the two-ply sheet (see FIGS. 30A to 30E and other drawings).

The two-ply sheet PJ in the second embodiment is made of two sheets P1 and P2 overlapped and bonded together at one side of four sides as the bonding portion A. That is, in the two-ply sheet PJ made of two sheets P1 and P2, only one sides of the two sheets P1 and P2 are connected by thermal welding or the like as the bonding portion A, and the other sides of the two sheets P1 and P2 are not connected. As the two sheets P1 and P2 constituting the two-ply sheet PJ, a transparent film sheet (that is, a laminate sheet) may be used.

The sheet separation device 101 separates the two sheets P1 and P2 constituting the tow-ply sheet PJ (i.e. separates the other side of the two sheets that is opposite the bonding portion A that maintains bonding the two sheets P1 and P2). Subsequently, the sheet separation device 101 inserts an insertion sheet PM between the separated two sheets P1 and P2. The insertion sheet PM is a sheet such as one plain sheet or a photograph.

Figure 21:
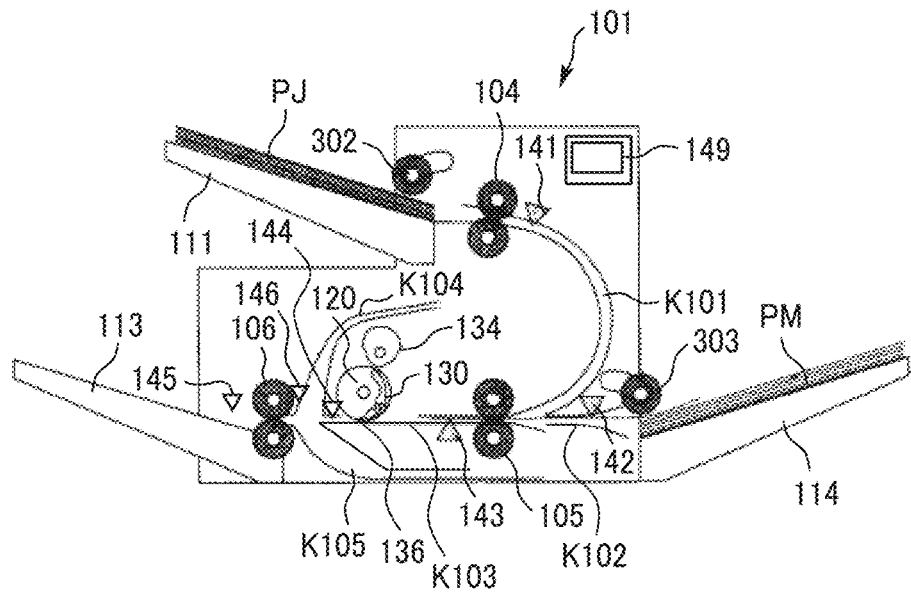
FIG. 21 is a schematic view illustrating a sheet separation device according to a second embodiment of the present disclosure.

As illustrated in FIG. 21, the sheet separation device 101 includes a first feed tray 111, a second feed tray 114, a first feed roller 302, a second feed roller 303, a first conveyance roller pair 104, a second conveyance roller pair 105, a third conveyance roller pair 106, an ejection tray 113, a first sensor 141, a second sensor 142, a third sensor 143, a fourth sensor 144, a fifth sensor 145, an abnormality detection sensor 146 as an abnormality detection device, a winding roller 120, a moving mechanism 130, and a separation claw 116 as a separator (see FIGS. 26B, 26C, FIGS. 30A to 30E, or the like).

Additionally, the sheet separation device 101 includes a plurality of conveyance paths such as a first conveyance path K101, a second conveyance path K102, a third conveyance path K103, a first branched conveyance path K104, and a second branched conveyance path K105. The above-described conveyance paths K101 to K105 each include two conveyance guide plates facing each other to guide and convey the sheet such as the two-ply sheet PJ or the insertion sheet PM.

Specifically, the two-ply sheet PJ is stacked on the first feed tray 111. The first feed roller 302 feeds the uppermost two-ply sheet PJ on the first feed tray 111 to the first conveyance roller pair 104, and the first conveyance roller pair 104 conveys the two-ply sheet PJ to the first conveyance path K101.

The insertion sheet PM is stacked on the second feed tray 114. The second feed roller 303 feeds the uppermost insertion sheet PM on the second feed tray 114 to the second conveyance path K102.

Each of the first to third conveyance roller pairs 104 to 106 includes a drive roller and a driven roller, and conveys the sheet nipped by the nips. The third conveyance path K103 includes, from the upstream side, the second conveyance roller pair 105, the winding roller 120, and the third conveyance roller pair 106. The winding roller 120 and the third conveyance roller pair 106 is configured to be able to rotate in forward or in reverse. The third conveyance roller pair 106 can convey the sheet in the forward direction that is the left direction in FIG. 21 and in the reverse direction that is the right direction in FIG. 21. The third conveyance roller pair 106 also functions as an ejection roller pair that ejects the sheet to the ejection tray 113.

Each of the first to fifth sensors 141 to 145 as a sheet detection sensor is a reflective photosensor that optically detects whether the sheet is present at the position of each sensor. The first sensor 141 is disposed in the vicinity of the downstream side of the first conveyance roller pair 104. The second sensor 142 is disposed in the vicinity of the downstream side of the second feed roller 303. The third sensor 143 is disposed in the vicinity of the downstream side of the second conveyance roller pair 105. The fourth sensor 144 is disposed in the vicinity of the downstream side of the winding roller 120 (that is the left side of the winding roller 120 in FIG. 21) and the upstream side of the third conveyance roller pair 106 (that is the right side of the third conveyance roller pair 106 in FIG. 21). The fifth sensor 145 is disposed downstream the third conveyance roller pair 106 (that is the left side of the third conveyance roller pair 106 in FIG. 21).

With reference to FIGS. 22A, 22B, 23A, 23B, 25B to 25D, and 26A, the winding roller 120 is described. In the winding roller 120, a gripper 136 that is one example of a gripper grips a gripped portion B of the two-ply sheet PJ at a winding start position W (see FIG. 25B). The gripped portion B is another end of the two-ply sheet PJ that is opposite an end at which the bonding portion A is formed, which is referred to as the other end of the two-ply sheet PJ. While the gripper 136 grips the gripped portion B of the two-ply sheet PJ, the winding roller 120 rotates in a predetermined rotation direction (counterclockwise in FIG. 25B) to wrap the two-ply sheet PJ around the winding roller 120. The winding roller 120 can rotate about a rotation shaft 120$a$ in forward and in reverse. A controller controls a drive motor that drives the winding roller 120. The controller includes one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components.

Specifically, the two-ply sheet PJ starts from the first feed tray 111 and passes through the first conveyance path K101, and the second conveyance roller pair 105 conveys the two-ply sheet PJ in the forward direction along the third conveyance path K103. The two-ply sheet passes through the winding start position W of the winding roller 120 once and is conveyed to a position of the third conveyance roller pair 106 that is a position at which the back end of the two-ply sheet PJ passes through the fourth sensor 144 but does not pass through the third conveyance roller pair 106, that is, the position in front of the third conveyance roller pair 106. Thereafter, the third conveyance roller pair 106 rotates in reverse to convey the two-ply sheet PJ in the reverse direction to the position of the winding roller 120 that is the winding start position W, and the gripper 136 grips the two-ply sheet PJ. The gripped two-ply sheet PJ is further conveyed, and the winding roller 120 rotates counterclockwise in FIG. 21 to wrap the two-ply sheet PJ around the winding roller 120.

Figure 25A:
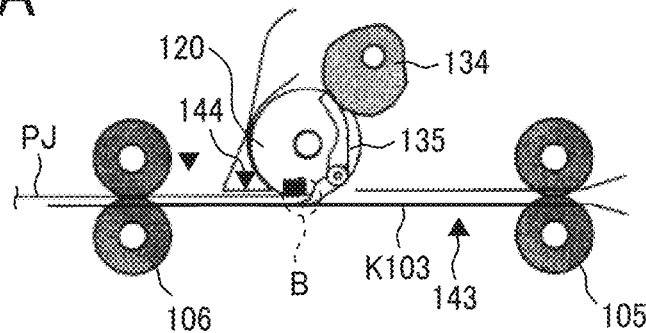
FIGS. 25A to 25D are schematic views illustrating operations of the sheet separation device, subsequent from the operations of FIGS. 24A to 24D.
Figure 25B:
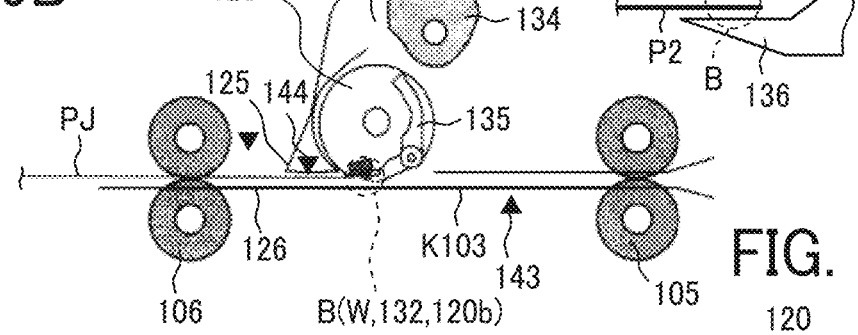
Figure 25C:
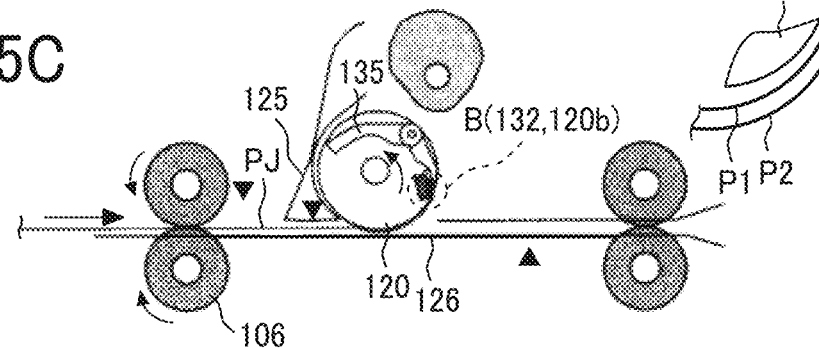
Figure 25D:
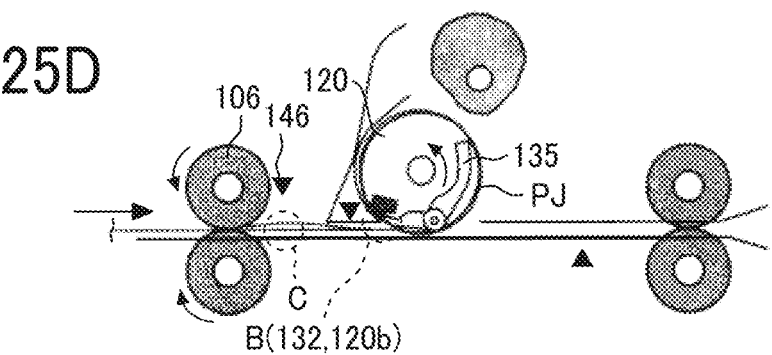
Figure 26A:
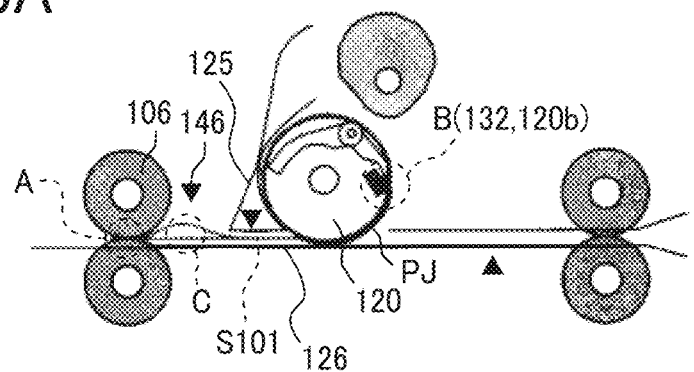
FIGS. 26A to 26C are schematic views illustrating operations of the sheet separation device, subsequent from the operations of FIGS. 25A to 25D.

With reference to FIG. 25C', when the two-ply sheet PJ is wound around the winding roller 120, a length of a sheet wound around the winding roller 120 is proportional to a distance from the center of the winding roller 120 to the sheet. Therefore, since the first sheet P1 is nearer to the center of the winding roller 120 than the second sheet P2, the length of the first sheet P1 wound around the winding roller 120 is shorter than the length of the second sheet P2 wound around the winding roller 120. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. As illustrated in FIGS. 25D and 26A, the misalignment causes the upper first sheet P1 to slack and bend upward and forms the gap C between the two sheets P1 and P2 in the vicinity of the bonding portion A that is referred to as one end of the two-ply sheet PJ. As described above, the two sheets P1 and P2 that are in close contact with each other without any gap are separated from each other.

In the second embodiment, in order to significantly form the gap C as described above, that is, to increase the difference between lengths of the sheets P1 and P2 wound around the winding roller 120, the two-ply sheet PJ is wound around the winding roller 120 at least once or more.

In the second embodiment, winding the two-ply sheet PJ around the winding roller 120 can separate the two-ply sheet PJ without increasing the size and cost of the sheet separation device 101.

As illustrated in FIG. 25B', the gripper 136 in the second embodiment is configured to grip the gripped portion B of the two-ply sheet PJ without contacting the end surface of the other end of the gripped portion B on any member.

Specifically, the gripper 136 is configured to sandwich and grip the gripped portion B of the two-ply sheet PJ between the gripper 136 and a receiving portion 120b of the winding roller 120 without causing any member to abut and restrict the end surface of the other end of the two-ply sheet PJ, in other words, without causing any member to hit or contact the end surface of the two-ply sheet PJ. The receiving portion 120b is a part of an outer circumferential portion of the winding roller 120 and faces the gripper 136.

More specifically, the two-ply sheet PJ is not gripped and sandwiched by the gripper 136 and the receiving portion 120b in a state in which a specific member such as the gripper 136 abuts on the end surface of the other end (that is the tip of the other end). Without abutting the end surface of the other end that is the tip of the other end to any member, the two-ply sheet PJ is sandwiched and gripped by the outer gripper 136 and the inner receiving portion 120b.

Compared with a structure that abuts the end surface of the tip of the two-ply sheet on a member, the above-described structure can reduce a disadvantage that the two-ply sheet PJ (particularly, the tip of the other end) is damaged. Since a part of the two-ply sheet PJ including a damaged front end surface is hard for the laminating process, the configuration of the present disclosure is useful.

In the second embodiment, the bonding portion A of the two-ply sheet PJ wound around the winding roller 120 is the one end of the two-ply sheet PJ. The one end is opposite to the other end serving as the gripped portion B.

In the second embodiment, at least one of the gripper 136 and the receiving portion 120b is made of elastic material such as rubber.

Compared with a sheet separation device including the gripper 136 and the receiving portion 120b that are rigid bodies made of metal or resin, the above-described sheet separation device can increase a gripping force to grip the two-ply sheet PJ and prevent surfaces of the two-ply sheet PJ from being damaged. In particular, the sheet separation device including the gripper 136 and the receiving portion 120b made of the elastic material easily exhibits the above-described effect.

As illustrated in FIGS. 22A to 23B, the moving mechanism 130 moves the gripper 136 between a gripping position (a position illustrated in FIGS. 22A and 23A) at which the gripper 136 can grip the two-ply sheet PJ and a releasing position (a position illustrated in FIGS. 22B and 23B) at which the gripper 136 is released from the gripping position.

Specifically, the moving mechanism 130 includes an arm 135, a compression spring 133 as a biasing member, a cam 134, and a motor that rotates the cam 134 in forward or in reverse.

The arm 135 holds the gripper 136, and the arm 135 and the gripper 136 are held together by the winding roller 120 to be rotatable about a support shaft 131a. In the second embodiment, the gripper 136 is connected to the tip of arm 135, and the gripper 136 and the arm 135 are made as one part. Alternatively, the gripper 136 and the arm 135 may be made as separate members, and the gripper 136 may be disposed on the arm 135, that is, may be held by the arm 135. In any case, the arm 135 holding the gripper 136 rotates around the rotation shaft 120a together with the winding roller 120.

Figure 22A:
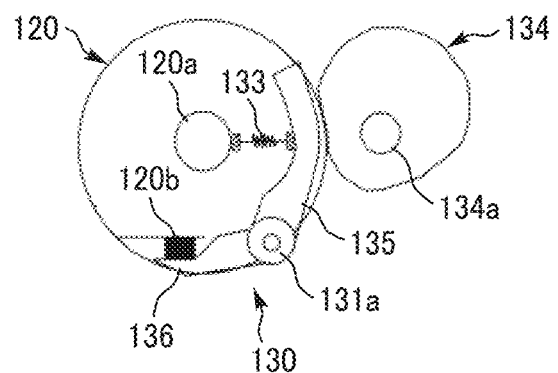
FIG. 22A is a side view illustrating a gripper according to the second embodiment that has moved to a gripping position in the sheet separation device illustrated in FIG. 21.
Figure 22B:
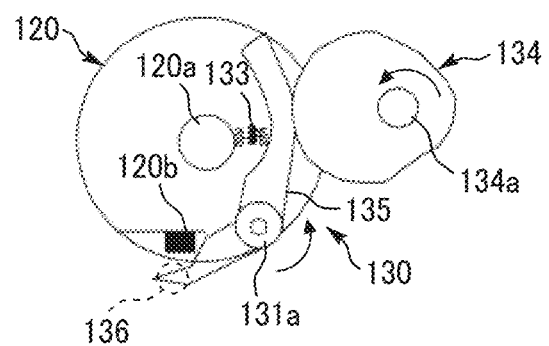
FIG. 22B is a side view illustrating the gripper according to the second embodiment that has moved to a releasing position in the sheet separation device illustrated in FIG. 21.

The compression spring 133 functions as a biasing member that biases the arm 135 so that the gripper 136 moves from the releasing position illustrated in FIG. 22B to the gripping position illustrated in FIG. 22A. Specifically, one end of the compression spring 133 is connected to a fixed part near the rotation shaft 120a, and the other end the compression spring 133 is connected to one end of the arm 135 that is an end opposite to the other end of the arm 135 connected to the gripper 136 with respect to the support shaft 131a.

The cam 134 pushes the arm 135 against the biasing force of the compression spring 133 as the biasing member so that the gripper 136 moves from the gripping position illustrated in FIG. 22A to the releasing position illustrated in FIG. 22B. A motor controlled by the controller drives the cam 134 to rotate in forward or in reverse at a desired rotation angle. The cam 134 is held by a housing of the sheet separation device 101 so as to be rotatable about a cam shaft 134a independently of the winding roller 120.

In the moving mechanism 130 configured as described above, as illustrated in FIGS. 22A and 23A, the arm 135 not contacting the cam 134 is biased by the compression spring 133 and presses the gripper 136 against the receiving portion 120b. This state is referred to as a closed state. In the closed state, the gripper 136 and the receiving portion 120b can grip the two-ply sheet PJ.

Figure 23A:
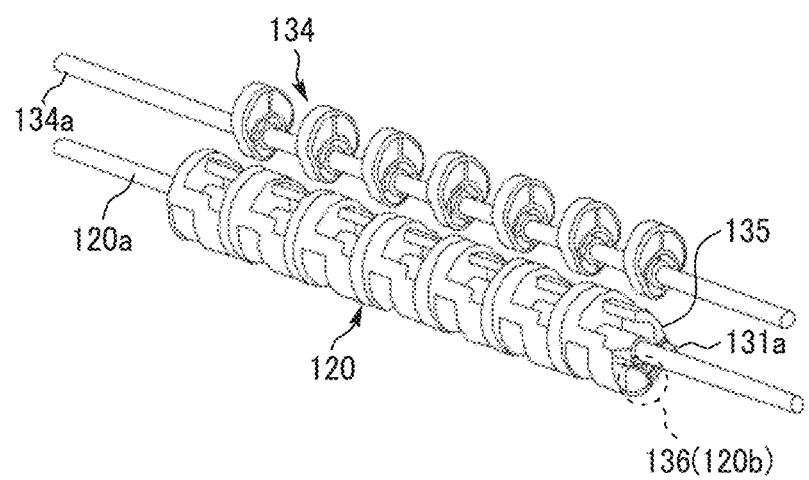
FIG. 23A is a perspective view illustrating the gripper according to the second embodiment that has moved to the gripping position in the sheet separation device illustrated in FIG. 21.
Figure 23B:
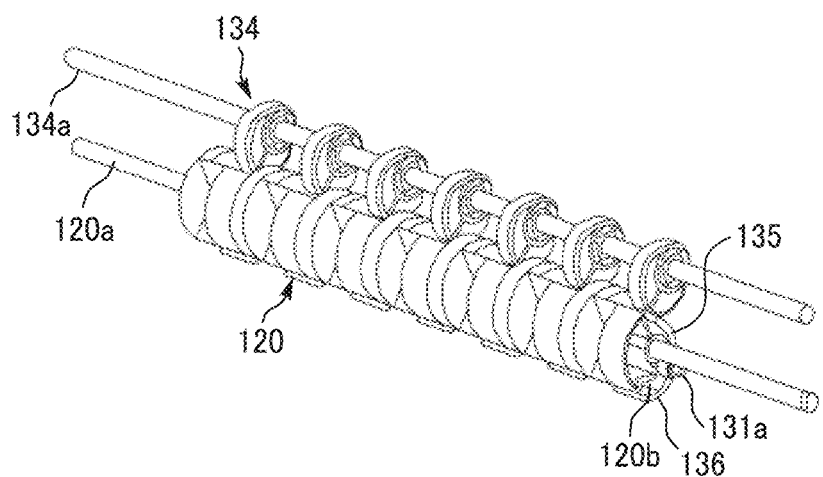
FIG. 23B is a perspective view illustrating the gripper according to the second embodiment that has moved to the releasing position in the sheet separation device illustrated in FIG. 21.

In contrast, as illustrated in FIGS. 22B and 23B, the arm 135 pressed by the cam 134 rotates counterclockwise in FIG. 22B about the support shaft 131a against the urging force of the compression spring 133 and separates the gripper 136 from the receiving portion 120b. This state is referred to as an open state. In the open state, the two-ply sheet PJ is not gripped, which is referred to as a grip release state.

In the second embodiment, as illustrated in FIGS. 23A and 23B, the winding roller 120 includes a plurality of roller portions (i.e. seven roller portions in the present embodiment) separated in the axial direction of the winding roller 120. Corresponding to the roller portions, the cam 134 includes a plurality of portions separated in the axial direction.

Setting portions separated in the axial direction to grip the two-ply sheet PJ as described above, that is, not setting entire area in the axial direction to grip the two-ply sheet PJ can share load necessary to grip the two-ply sheet PJ. The above-described configuration is useful when a necessary gripping force becomes large.

Figure 24A:
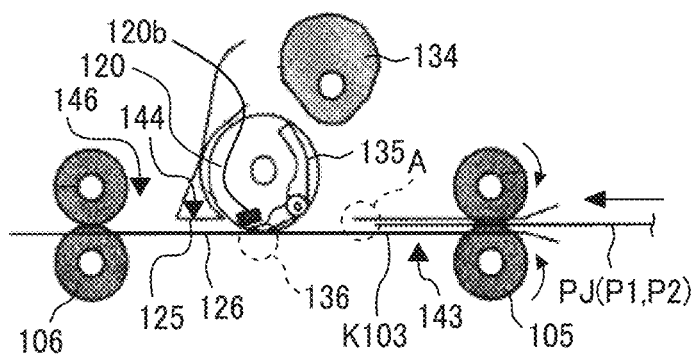
FIGS. 24A to 24D are schematic views illustrating operations of the sheet separation device according to the second embodiment illustrated in FIG. 21.
Figure 24B:
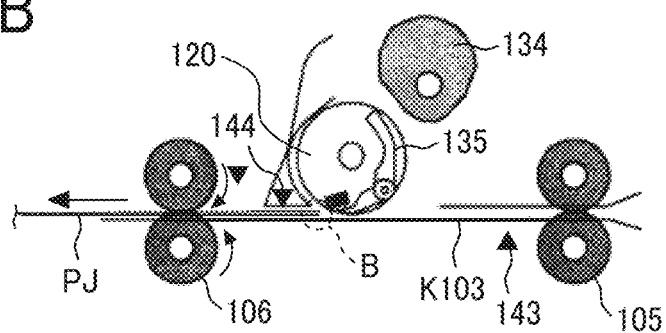
Figure 24C:
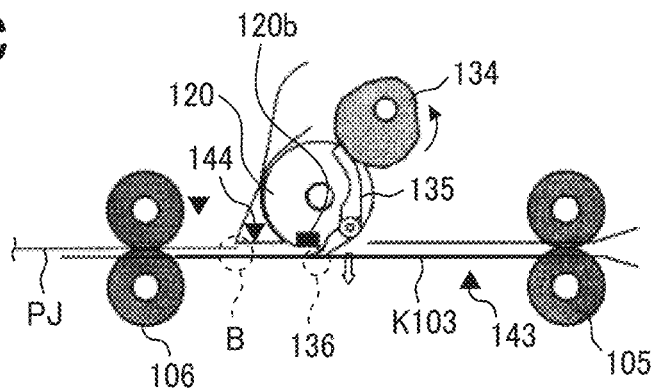
Figure 24D:
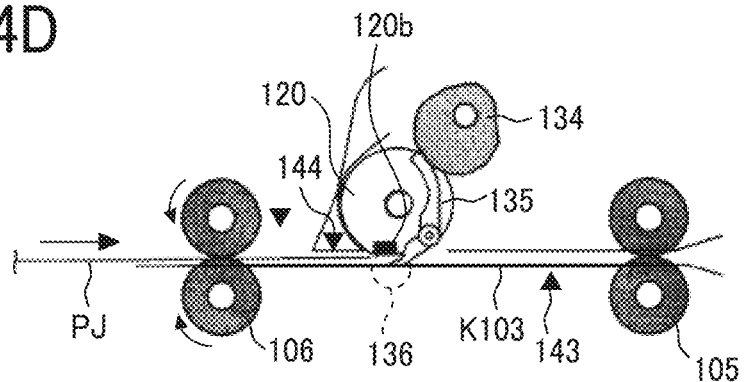

With reference to FIGS. 21, 24D, and 25A, the following describes the fourth sensor 144 in the sheet separation device 101 in the second embodiment. The fourth sensor 144 is the sheet detection sensor to detect two-ply sheet PJ conveyed between the winding roller 120 and the third conveyance roller pair 106. The fourth sensor 144 detects the front end of the two-ply sheet PJ conveyed to the winding roller 120 by the third conveyance roller pair 106. Based on results detected by the fourth sensor 144, the controller controls the moving mechanism 130.

Specifically, the fourth sensor 144 is disposed on the conveyance path between the winding roller 120 and the third conveyance roller pair 106. As illustrated in FIGS. 24D and 25A, the third conveyance roller pair 106 conveys the two-ply sheet PJ in the reverse direction toward the position of the winding roller 120, so that the gripped portion B of the two-ply sheet PJ becomes a front end in the reverse direction conveyance, and the fourth sensor 144 detects the front end of the two-ply sheet PJ conveyed in the reverse direction, that is, the tip of one end of the gripped portion B. The controller uses a timing at which the fourth sensor 144 detects the tip of one end of the gripped portion B as a trigger to adjust and control a timing to stop the two-ply sheet PJ at the gripping position and a timing at which the gripper 136 grips the gripped portion B. Specifically, after a predetermined time has passed since the fourth sensor 144 detected the front end of the two-ply sheet PJ, the third conveyance roller pair 106 stops the reverse direction conveyance of the two-ply sheet PJ, and the cam 134 rotates to pivot the arm 135 of the moving mechanism 130 so that the gripper 136 moves from the releasing position illustrated in FIG. 22B to the gripping position illustrated in FIG. 22A.

The above-described control accurately performs an operation in which the end surface of the two-ply sheet PJ is sandwiched by the gripper 136 and the receiving portion 120b without abutting the end surface of the two-ply sheet PJ on any member.

As described above, the third conveyance roller pair 106 conveys the other end (i.e. the gripped portion B) of the two-ply sheet as a front end toward the winding start position W of the winding roller 120 in the third conveyance path K103 between the third conveyance roller pair 6 and the winding roller 120.

With reference to FIGS. 26A to 26C, 29, 30A to 30E, and 32, the separation claws 116 as a separator are described. The separation claws 116 are claw-shaped members that move from standby positions illustrated in FIG. 30A and are inserted into the gap C formed between two sheets P1 and P2 at a predetermined position of the two-ply sheet PJ. The predetermined position is a position at which the separation claws 116 as the separator can enter the gap formed between the two sheets P1 and P2 and is determined by experiments. Preferably, the gap formed between the two sheets P1 and P2 becomes largest at the predetermined position in the sheet separation device 101.

Specifically, the separation claws 116 are inserted into the gap C formed between two sheets P1 and P2 at a position between the winding roller 120 and the third conveyance roller pair 106 from the standby positions outside both ends of the two-ply sheet PJ in the width direction of the two-ply sheet PJ in which the other end (that is the gripped portion B) is wound by the winding roller 120 and the one end (that is the bonding portion A) is nipped by the third conveyance roller pair 106.

Figure 26B:
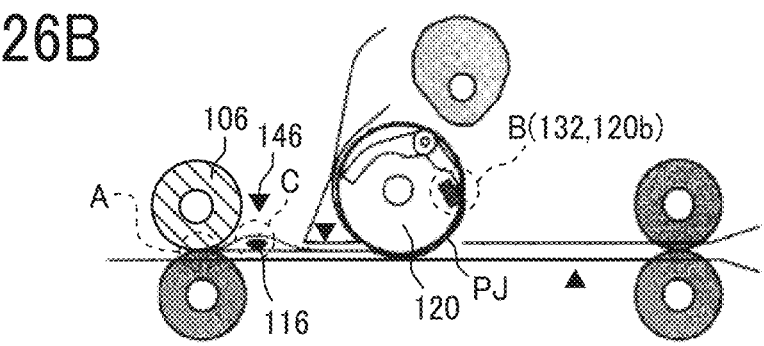
Figure 26C:
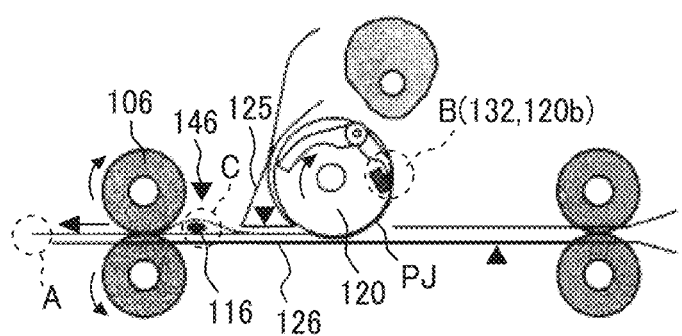
Figure 29:
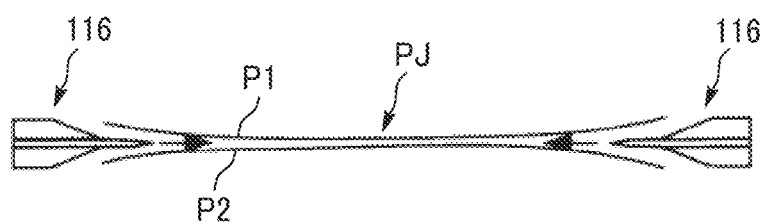
FIG. 29 is a schematic view illustrating separation claws inserted into a two-ply sheet according to the second embodiment in the width direction of the two-ply sheet.
Figure 32:
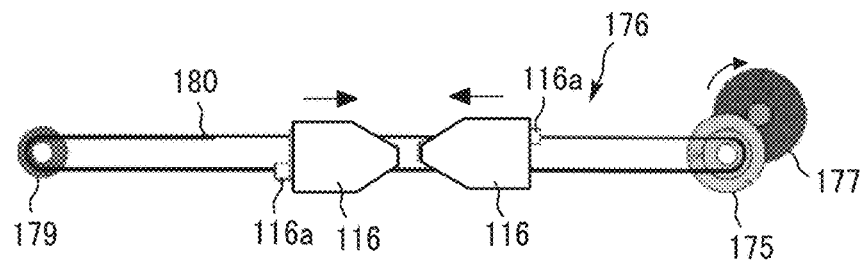
FIG. 32 is a schematic view illustrating a configuration of a driving device for the separation claws in the second embodiment.

More specifically, in the second embodiment, the separation claws 116 are a pair of separation claws as a pair of separators disposed at both sides of the third conveyance path K103 in the width direction that is the direction perpendicular to a plane on which FIGS. 26A to 26C are illustrated and the horizontal direction in FIGS. 29 and 32. As illustrated in FIGS. 30A to 30E, and 33A to 33D, the vertical length of the separation claw 116 in the thickness direction of the two-ply sheet PJ gradually increases from the tip of the separation claw 116 near the center of the two-ply sheet PJ in the width direction of the two-ply sheet PJ to the back end of the separation claw 116 that is an outer end of the separation claw 116 in the width direction of the separation claw 116. The separation claws 116 is moved in the width direction of the two-ply sheet PJ by a driving device 176 (see FIG. 32) controlled by the controller.

Figure 30A:
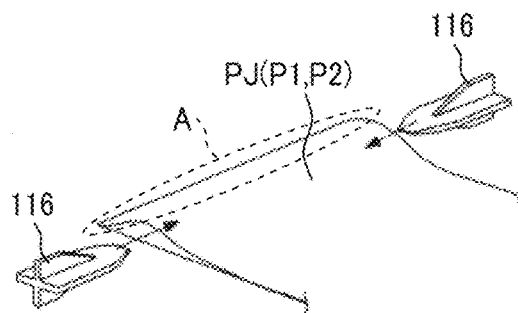
FIGS. 30A to 30E are perspective views illustrating operations of the separation claws in the second embodiment.
Figure 30B:
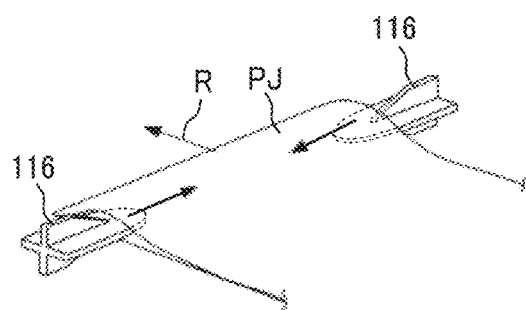

The separation claws 116 configured as described above ordinarily stand by at standby positions at which the separation claws 116 do not interfere with the conveyance of the sheet such as the two-ply sheet PJ in the third conveyance path K103. As illustrated in FIG. 30A, the standby positions are outside of the sheet P in the width direction of the sheet P. Subsequently, as illustrated in FIGS. 29 and 30B, the separation claws 116 enter the gap C in the two-ply sheet PJ when the two-ply sheet PJ (configured by two sheets P1 and P2) is separated. As a result, the separation claws 116 secure the gap C to be large.

As illustrated in FIG. 32, the driving device 176 moves the pair of separation claws 116 in the width direction and includes a motor 177, a gear pulley 175, a pulley 179, a timing belt 180. The gear pulley 175 has a step-like ring shape including a gear that meshes with a motor gear disposed on a motor shaft of the motor 177 and a pulley that stretches and supports the timing belt 180 together with the pulley 179. One separation claw 116 of the pair of separation claws 116 includes the fixed portion 116a fixed to the belt surface of the timing belt 164 that is the upper side of the belt surface in FIG. 35, and the other separation claw 116 includes the fixed portion 116a fixed to the other belt surface of the timing belt 164 that is the lower side of the belt surface in FIG. 35.

In the driving device 176 as configured described above, the motor 177 drives to rotate the motor shaft in a direction indicated by arrow in FIG. 32 (i.e. clockwise), the gear pulley 175 rotates counterclockwise, the timing belt 180 rotates counterclockwise, and the pair of separation claws 116 moves from the outside portions in the width direction to the center portion in the width direction (that is, the pair of separation claws 116 approaches each other). In contrast, when the motor 177 drives to rotate the motor shaft in the direction opposite to the arrow direction in FIG. 32, the pair of separation claws 116 moves from the center in the width direction toward the outside in the width direction (that is, the pair of the separation claws 116 moves in a direction away from each other).

The separation claws 116 are inserted into the gap C in the two-ply sheet PJ, relatively move from the one end of the two-ply sheet PJ near the bonding portion A to the other end of the two-ply sheet PJ near the gripped portion B, and subsequently move in the width direction between the two sheets P1 and P2 at the other end of the two-ply sheet PJ.

Figure 30C:
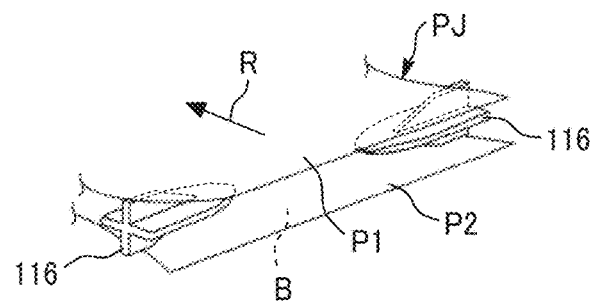
Figure 30D:
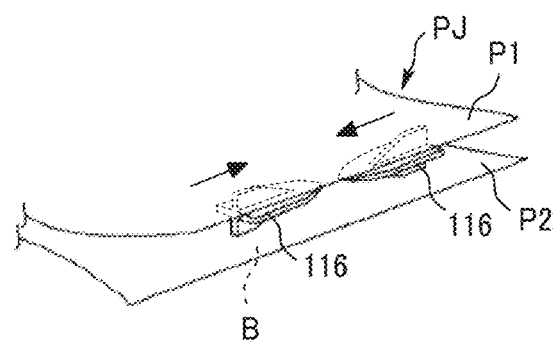

Specifically, the controller controls the driving device 176 (see FIG. 32) to move the pair of separation claws 116 as follows. As illustrated in FIGS. 30B and 30C, the pair of separation claws 116 is inserted into the both ends of the gap C in the two-ply sheet PJ in the width direction and relatively moves to the other end of the two-ply sheet PJ that is the gripped portion B. After the pair of separation claws 116 reaches to the other end of the two-ply sheet PJ, as illustrated in FIG. 30D, the pair of separation claws 116 on the other end of the two-ply sheet PJ moves in the width direction from the both ends of the two-ply sheet PJ to the center of the two-ply sheet PJ between the two sheets P1 and P2. To enable the above-described operations of the pair of separation claws 116, the driving device 176 is configured so that the pair of separation claws 116 can move from the standby positions to positions at which the pair of separation claws is close to each other.

The above-described mechanism including the winding roller 120 winding the two-ply sheet and the separation claws 116 inserted into the two-ply sheet PJ to separate the two-ply sheet PJ can reduce the size of the sheet separation device as compared with a mechanism using a large-scale device such as a vacuum device to separate the two-ply sheet PJ. That is, without increasing the size of the sheet separation device 101, the above-described mechanism can satisfactorily separate the two sheets P1 and P2 constituting the two-ply sheet PJ.

In particular, since the separation claws 116 in the second embodiment move over substantially an entire region of the two-ply sheet PJ on the other end of the two-ply sheet PJ (that is the back end of the two-ply sheet PJ), the separation claws 116 can sufficiently separate (in other words, peel) the other ends of the two sheets P1 and P2 constituting the two-ply sheet PJ that are opposite the bonding portion A. The above-described configuration prevents a disadvantage that the other end of the two-ply sheet PJ that is opposite the bonding portion A is not sufficiently separated and the insertion sheet PM (see FIG. 30E) cannot be inserted into the other end of the two-ply sheet PJ. Additionally, the above-described configuration allows the separation claws 116 as a divider to easily function, that is, separately guide the two sheets P1 and P2 to the two branched conveyance paths K104 and K105. The function of the separation claws 116 as the divider is described below.

Figure 27A:
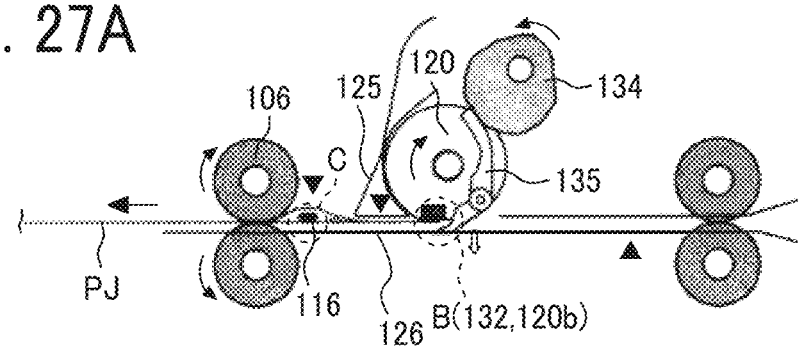
FIGS. 27A to 27C are schematic views illustrating operations of the sheet separation device, subsequent from the operations of FIGS. 26A to 26C.
Figure 27B:
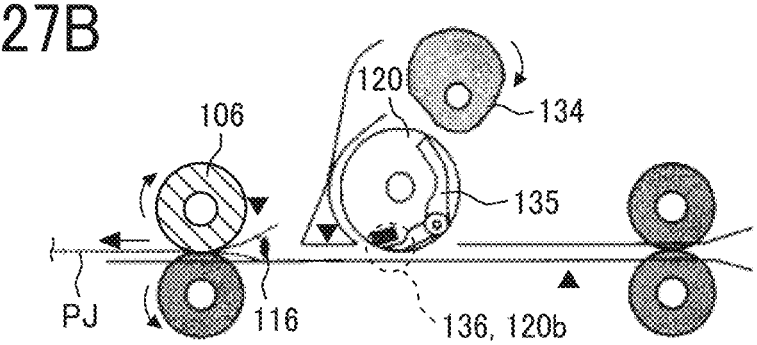
Figure 27C:
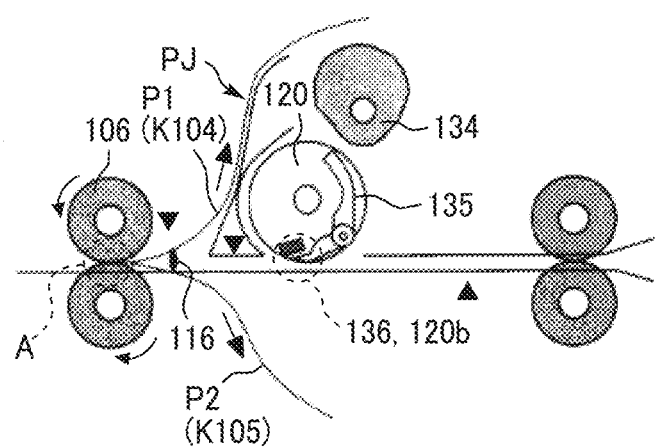

With reference to FIGS. 27A to 27C, the separation claws 116 as the divider are described. The separation claws 116 also function as the divider that guides the two sheets P1 and P2 separated by the separation claws 116 to the two branched conveyance paths K104 and K105 that branch off in different directions, respectively.

Specifically, as illustrated in FIG. 27C, the two branched conveyance paths K104 and K105 branch off in different directions from the third conveyance path K103 between the separation claws 116 and the winding roller 120. In other words, the third conveyance path K103 is interposed by the two branched conveyance paths K104 and K105. The first branched conveyance path K104 branches upward from the third conveyance path K103, and the second branched conveyance path K105 branches downward from the third conveyance path K103.

As illustrated in FIGS. 27A to 27C, the third conveyance roller pair 106 conveys the one end of the two-ply sheet PJ to the left side in FIG. 27A after the separation claws 116 are inserted into the gap C until the winding of the other end of the two-ply sheet PJ on the 5 winding roller 120 is released (see FIG. 30A to FIG. 30C). After the winding of the other end of the two-ply sheet PJ on the winding roller 120 is released, the separation claws 116 move to a center portion of the two-ply sheet PJ as illustrated in FIG. 30D and stop at the center portion, and the third conveyance roller pair 106 conveys the other end of the two-ply sheet PJ to the right side in FIG. 27 again. Then, the separation claws 116 guide the two sheets P1 and P2 separated by the separation claws 116 to the two branched conveyance paths K104 and K105, respectively. As a result, the first sheet P1 is guided to the first branched conveyance path K104, and the second sheet P2 is guided to the second branched conveyance path K105. Subsequently, as illustrated in FIGS. 28A to 28C and 30E, the second conveyance roller pair 105 conveys the insertion sheet PM to the third conveyance path K103, that is, the right side in FIGS. 28A to 28C to insert the insertion sheet PM between the two sheets P1 and P2 separated from the two-ply sheet PJ.

As described above, the separation claws 116 in the second embodiment functions as a separator that separates (in other words, peels) the non-bonding portion of the two-ply sheet PJ configured by the two sheets P1 and P2, and also functions as a divider that separately guides the separated two sheets P1 and P2 to the two branched conveyance paths K104 and K105, respectively. Accordingly, the above-described configuration can reduce the size and cost of the sheet separation device 101 compared to the sheet separation device including both the separator and the divider. That is, the above-described configuration can satisfactorily separate the two sheets P1 and P2 constituting the two-ply sheet PJ.

With reference to FIG. 33, the separation claw 116 according to the second embodiment as the separator is more specifically described. The separation claw 116 includes a first plate 116b and a second plate 116c. The thickness direction of the first plate 116b is substantially the same as the thickness direction of the two-ply sheet PJ. The second plate 116c intersects the first plate 116b in the thickness direction of the first plate 116b, the first plate 116b and the second plate 116c are formed as one part.

Figure 33A:
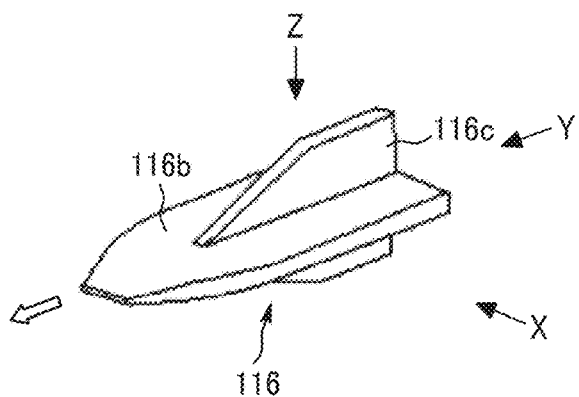
FIG. 33A is a perspective view of the separation claw according to the second embodiment.

FIG. 33A is a perspective view of the separation claw 116. In FIG. 33A, the separation claw 116 moves in a direction indicated by a white arrow, that is, moves toward the gap C in the two-ply sheet PJ. FIG. 33C is a rear view of the separation claw 116 viewed from y direction in FIG. 33A. As illustrated in FIG. 33C, the separation claw 116 has a substantially cross shape configured by the first plate 116b extending in the lateral direction in FIG. 33C that is a conveyance direction of the two-ply sheet PJ and the second plate 116c extending in the vertical direction that is a direction in which the gap C is formed.

As illustrated in FIG. 30D, the second plate 116c extending in the thickness direction 5 of the two-ply sheet PJ (that is the direction in which the gap C is formed) as described above can enlarge the distance between the two sheets P1 and P2 by at least a vertical length of the second plate 116c when the separation claw 116 enters between the two sheets P1 and P2. As a result, the separation claws 116 can easily guide the two sheets P1 and P2 to the two branched conveyance paths K104 and K105, respectively. That is, the function of the separation claw 116 as the divider is easily exhibited.

Figure 33B:
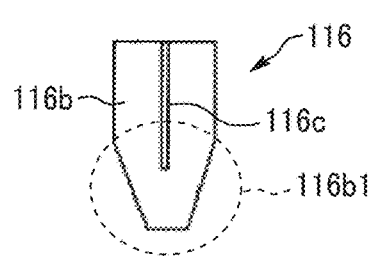
FIG. 33B is a plan view of the separation claw as viewed from the Z direction in FIG. 33A.
Figure 33C:
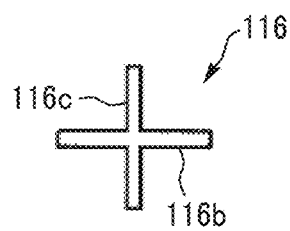
FIG. 33C is a rear view of the separation claw as viewed from the Y direction in FIG. 33A.
Figure 33D:
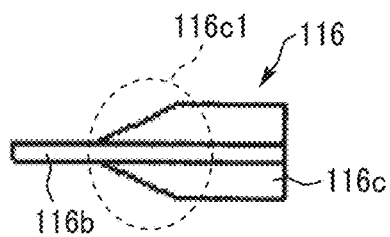
FIG. 33D is a side view of the separation claw as viewed from the X direction in FIG. 33A.

As illustrated in FIG. 33D, the separation claw 116 includes a tapered portion 116c1. A length of the tapered portion 116c1 in the thickness direction of the two-ply sheet PJ (that is the vertical direction in FIG. 33D) gradually increases outward in the width direction of the two-ply sheet PJ.

Specifically, as illustrated in FIGS. 33A, 33B, and 33D, the tip of the second plate 116c near the center of the two-ply sheet PJ in the width direction of the two-ply sheet PJ is positioned further outward in the width direction of the two-ply sheet PJ than the tip of the first plate 116b near the center of the two-ply sheet PJ in the width direction of the two-ply sheet PJ. In addition, the back end of the second plate 116c that is an outer end of the second plate 116c in the width direction of the two-ply sheet PJ is the same position in the width direction of the two-ply sheet PJ as the back end of the first plate 116b that is an outer end of the first plate 116b in the width direction of the two-ply sheet PJ. The tapered portion 116c1 extends in a horizontal direction in FIG. 33D from the tip of the second plate 116c near the center of the two-ply sheet PJ in the width direction of the two-ply sheet PJ and gradually increases the vertical length from the left to the right in FIG. 33D.

More specifically, the second plate 116c has an upper trapezoidal portion and a lower trapezoidal portion that sandwich the first plate 116b as illustrated in FIG. 33D.

The second plate 116c (that is, the separation claw 116) including the tapered portion 116c1 as described above prevents a disadvantage that the separation claw 116 is caught by the sheet P1 or P2 when the separation claw 116 enters into the gap C in the two-ply sheet PJ from the standby position as illustrated in FIGS. 30A and 30B. That is, the separation claw 116 smoothly enters the gap C in the two-ply sheet PJ, and the second plate 116c separates the two sheets P1 and P2 at a sufficient interval.

As illustrated in FIG. 33B, the separation claw 116 includes a tapered portion 116b1. A length of the tapered portion 116b1 in the conveyance direction of the two-ply sheet PJ (that is the horizontal direction in FIG. 33B) gradually increases outward in the width direction of the two-ply sheet PJ.

Specifically, as illustrated in FIGS. 33A, 33B, and 33D, the tip of the first plate 116b near the center of the two-ply sheet PJ in the width direction of the two-ply sheet PJ is positioned nearer to the center of the two-ply sheet PJ in the width direction of the two-ply sheet PJ than the tip of the second plate 116c near the center of the two-ply sheet PJ in the width direction of the two-ply sheet PJ. The tapered portion 116b1 extends in the vertical direction in FIG. 33B from the tip of the first plate 116b near the center of the two-ply sheet PJ in the width direction of the two-ply sheet PJ, and a length of the tapered portion 116b1 in the conveyance direction of the two-ply sheet PJ gradually increases from the lower side to the upper side in FIG. 33B.

More specifically, as illustrated in FIG. 33B, the tip of the first plate 116b is substantially V-shaped.

The first plate 116b (that is, the separation claw 116) including the tapered portion 116b1 as described above prevents the disadvantage that the separation claw 116 is caught by the sheet P1 or P2 when the separation claw 116 enters into the gap C in the two-ply sheet PJ from the standby position as illustrated in FIGS. 30A and 30B. That is, the separation claw 116 smoothly enters the gap C in the two-ply sheet PJ, increases the width of the gap C, and separates the two sheets P1 and P2.

With reference to FIGS. 26A to 26C, the first guide 125 is described below. The first guide 125 is disposed between the separation claws 116 and the winding roller 120 in the third conveyance path K103 and functions as a limiter to limit an amount of slack of the first sheet P1 that is an inner sheet of the two sheet P1 and P2 of the two-ply sheet PJ wound around the winding roller 120.

Specifically, the first guide 125 as the limiter is a conveyance guide disposed on the side in which the winding roller 120 is disposed with respect to an imaginary plane S101, that is, above the imaginary plane S101 in FIG. 26A, in the third conveyance path K103. The imaginary plane S101 is an imaginary plane passing through the winding start position W of the winding roller 120 and the nip of the third conveyance roller pair 106 in the third conveyance path K103 (see FIG. 26A). The first guide 125 has a shape like a triangular prism having a plane along the outer circumferential surface of the winding roller 120, and the plane covers a part of the outer circumferential surface of the winding roller 120 and is separated from the winding roller 120 by a predetermined gap. The first guide 125 functions as a conveyance guide of the third conveyance path K103 and a conveyance guide of the first branched conveyance path K104. That is, the first guide 125 guides the sheet conveyed on the third conveyance path K103, the sheet conveyed on the first branched conveyance path K104, and the sheet wound around the winding roller 120.

In the third conveyance path K103, the first guide 125 limits bending the two-ply sheet PJ upward (in particular, bending the first sheet P1 upward) between the winding roller 120 and the third conveyance roller pair 106. Therefore, the gap C in the two-ply sheet PJ that is mainly formed by bending the first sheet P1 upward is intensively formed between the first guide 125 and the third conveyance roller pair 106. Accordingly, the above-described configuration can increase the size of the gap C even if the winding amount of the two-ply sheet PJ wound around the winding roller 120 is not large, and the separation claws 116 can smoothly enter the gap C to separate the two-ply sheet PJ.

With reference to FIGS. 26A to 26 C, the second guide 126 is described below. The second guide 126 is disposed between the separation claws 116 and the winding roller 120 in the third conveyance path K103 and functions as a guide to guide the second sheet P2 that is an outer sheet of the two sheet P1 and P2 of the two-ply sheet PJ wound around the winding roller 120.

Specifically, the second guide 126 as the guide is a conveyance guide disposed on the side in which the winding roller 120 is not disposed with respect to the imaginary plane S101, that is, below the imaginary plane S101 in FIG. 26A, in the third conveyance path. The second guide 126 is disposed to face the lower surface of the sheet from a portion upstream from the second conveyance roller pair 105 to a portion downstream from the third conveyance roller pair 106 in the forward direction. That is, the second guide 126 guides the sheet conveyed on the third conveyance path K103.

In the third conveyance path K103 between the winding roller 120 and the third conveyance roller pair 106, a clearance between the first guide 125 and the second guide 126 is set to be a value by which the sheet having the largest thickness can be conveyed to limit a gap between the sheets P1 and P2 of the two-ply sheet PJ between the first guide 125 and the second guide 126 not to be too large. Therefore, the gap C in the two-ply sheet PJ that is mainly formed by bending the first sheet P1 upward is intensively formed between an end of the first guide 125 and the third conveyance roller pair 6. Accordingly, the separation claws 116 can smoothly enter the gap C to separate the two-ply sheet PJ.

With reference to FIGS. 26A to 26C, the abnormality detection sensor 146 is described below. The abnormality detection sensor 146 functions as an abnormality detection device to detect an abnormal state in which the gap C formed between the two sheets P1 and P2 at a predetermined position (that is between the third conveyance roller pair 106 and the winding roller 120) is not larger than a predetermined size before movements of the separation claws 116 from the standby positions (that is, movements from the standby positions illustrated in FIG. 30A to separation positions illustrated in FIGS. 29 and 30B). The predetermined size is a size of the gap C into which the separation claw 116 can enter and is determined by experiments. That is, the abnormality detection sensor 146 as the abnormality detection device detects the abnormal state in which the gap C formed between the two sheets P1 and P2 at a predetermined position is not larger than the predetermined size before the separation claws 116 are inserted into the gap C.

In other words, at a timing at which the gap C is formed between the two sheets P1 and P2 as illustrated in FIGS. 25D and 26A, the abnormality detection sensor 146 as the abnormality detection device detects the abnormal state such as a state in which the gap is not formed at all or a state in which the gap is not formed as a sufficient gap C.

In the second embodiment, the controller notifies the occurrence of the abnormal state when the abnormal state is detected by the abnormality detection sensor 146 that is the abnormality detection device. Specifically, as illustrated in FIG. 21, the sheet separation device 101 includes an operation display panel 149 as an operation display device on the exterior of the sheet separation device 101 to display various kinds of information about the sheet separation device 101 and input various kinds of commands. When the controller determines that the abnormal state occurs based on the results detected by the abnormality detection sensor 146, that is, when the two-ply sheet PJ does not have the sufficiently large gap C, the controller controls the operation display panel 149 to display that the abnormal state is detected. For example, the operation display panel 149 displays "Since an abnormality has occurred, the process of inserting the insertion sheet is stopped. Please check the setting direction of the two-ply sheet in the first feed tray. If the setting direction is correct and similar abnormalities are repeated, please contact a service person."

The above-described abnormality detection sensor 146 as the abnormality detection device may be a lever type sensor that comes into contact with the upper first sheet P1 of the two-ply sheet PJ forming the gap C larger than the predetermined size or other type sensors.

With reference to FIGS. 24A to 28C, the following describes operations of the sheet separation device 101 to separate the two-ply sheet PJ.

Figure 30E:
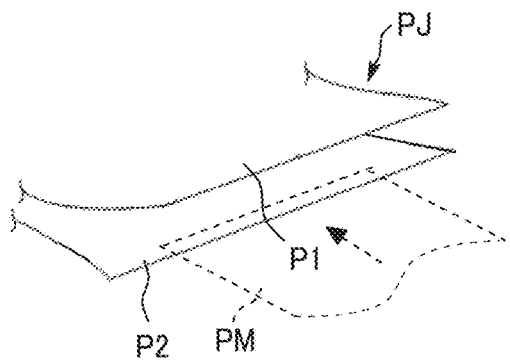

In the description of the operations, operations of the separation claws 116 is appropriately described with reference to FIGS. 29 to 30E, and the control flow is described with reference to a flowchart of FIG. 31, that is, FIGS. 31A and 31B.

Figures 31, 31A:
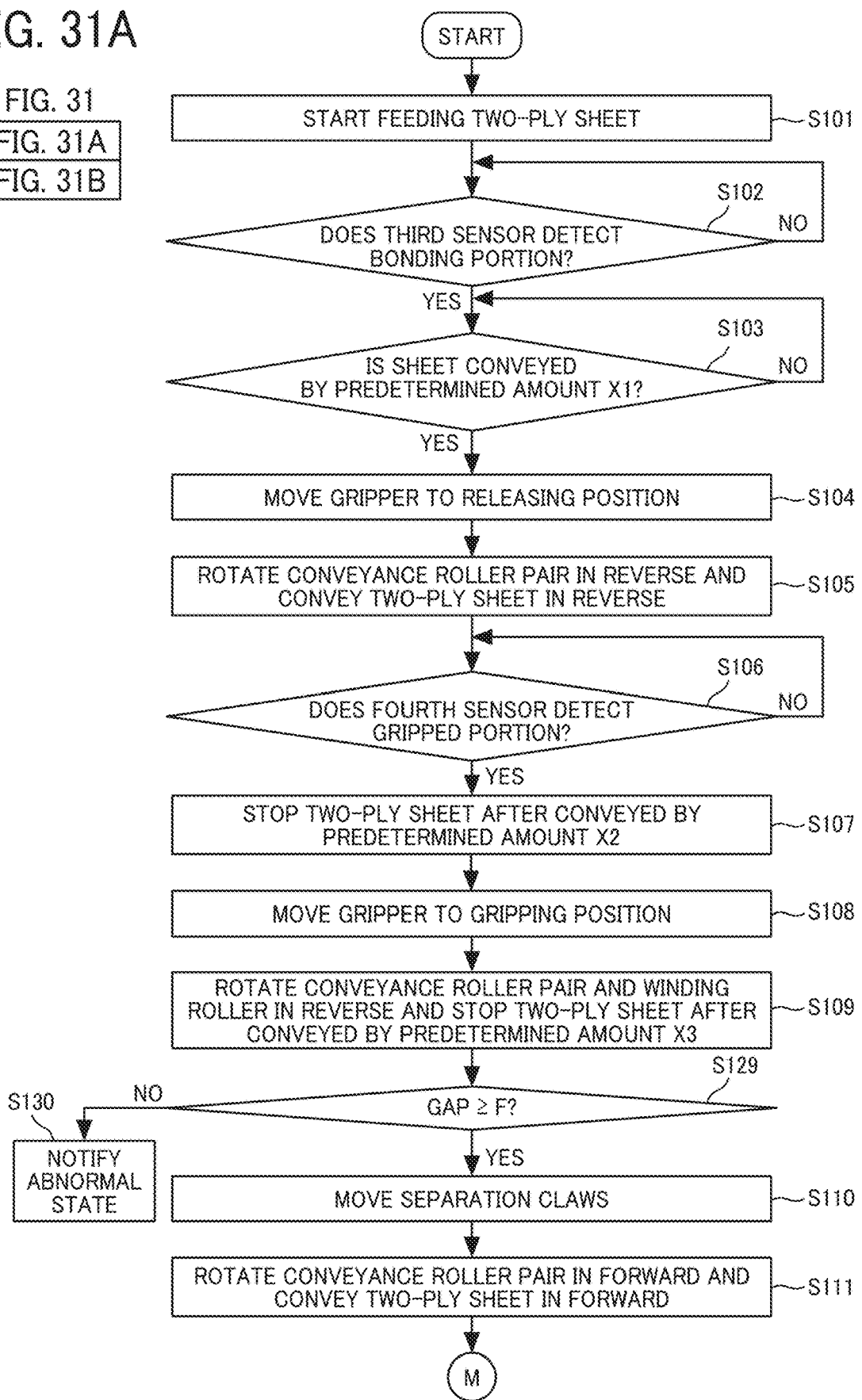
FIG. 31 including
FIGS. 31A and 31B is a flowchart illustrating control performed in the sheet separation device according to the second embodiment.

After the first feed roller 302 and the first conveyance roller pair 104 start feeding the two-ply sheet PJ from the first feed tray 111 in step S101 of FIG. 31A, as illustrated in FIG. 24A, the second conveyance roller pair 105 conveys the two-ply sheet PJ with the bonding portion A as a front end in the forward direction that is a direction from the right side to the left side in FIG. 24A in the third conveyance path K103.

At this time, the controller controls the moving mechanism 130 so that the gripper 136 is positioned at the gripping position. That is, the cam 134 moves to a rotational position at which the cam 134 does not push the arm 135. When the gripper 136 is positioned at the gripping position as described above, the gripper 136 does not interfere the sheet conveyance in the third conveyance path K103. The separation claws 116 stand by at the standby positions (illustrated in FIG. 30A) at which the separation claws 116 do not interfere with the conveyance of the sheets in the third conveyance path K103.

Subsequently, the controller determines whether the third sensor 143 detects the bonding portion A of the two-ply sheet PJ (that is a front end of the two-ply sheet PJ conveyed in the forward direction and the one end of the two-ply sheet PJ) in step S102 of FIG. 31A. The controller uses a timing at which the third sensor 143 detects the bonding portion A as a trigger and, as illustrated in FIG. 24B, the controller controls the third conveyance roller pair 106 to convey the two-ply sheet PJ in the forward direction by a predetermined amount X1 until the gripped portion B of the two-ply sheet PJ (that is the other end of the two-ply sheet PJ and a back end of the two-ply sheet PJ conveyed in the forward direction) passes through the position of the winding roller 120 in step S103 of FIG. 31A.

As illustrated in FIG. 24C, the controller temporarily stops the third conveyance roller pair 106 to stop the conveyance of the two-ply sheet PJ conveyed by the predetermined amount X1 and controls the gripper 136 to move from the gripping position to the releasing position in step S104 of FIG. 31A. That is, the cam 134 moves to a rotational position at which the cam 134 pushes the arm 135. In this state, the gripped portion B of the two-ply sheet PJ can be received between the gripper 136 and the receiving portion 120b.

Then, as illustrated in FIG. 24D, the third conveyance roller pair 106 rotates in reverse to start conveyance of the two-ply sheet PJ in the reverse direction in step S105 of FIG. 31A. At this time, the fourth sensor 144 detects the gripped portion B of the two-ply sheet PJ that is the other end of the two-ply sheet PJ and the front end of the two-ply sheet PJ conveyed in the reverse direction.

Subsequently, as illustrated in FIG. 25A, the controller uses the timing at which the fourth sensor 144 detects the gripped portion B of the two-ply sheet PJ as a trigger in step S106 of FIG. 31A and stops the conveyance of the two-ply sheet PJ in step S107 of FIG. 31A at a timing at which the third conveyance roller pair 106 conveys the two-ply sheet PJ by a predetermined amount X2 that is a timing at which the gripped portion B of the two-ply sheet PJ reaches the position of the winding roller 120 that is the winding start position W.

After the gripped portion B reaches the winding start position W, as illustrated in FIG. 25B, the gripper 136 is moved from the releasing position to the gripping position in step S108 of FIG. 31A. That is, the cam 134 moves to a rotational position at which the cam 134 does not push the arm 135. In step S108, as illustrated in FIG. 25B', the end surface of the other end of the two-ply sheet PJ does not abut on any member, and the gripped portion B is gripped between the gripper 136 and the receiving portion 120b.

Next, as illustrated in FIG. 25C, the winding roller 120 rotates in reverse (that is, counterclockwise) while the gripper 136 grips the two-ply sheet PJ, and the third conveyance roller pair 106 again rotates in reverse together with the winding roller 120. As the winding roller 120 rotates, the gap C is formed between the two sheets P1 and P2 of the two-ply sheet PJ between the winding roller 120 and the third conveyance roller pair 106 as illustrated in FIG. 25D. While the gap C is formed, the first guide 125 and the second guide 126 limit the bend of the two-ply sheet PJ in the vicinity of the winding roller 120. Accordingly, the gap C of the two-ply sheet PJ is intensively formed near the third conveyance roller pair 106.

Since the controller uses the timing at which the fourth sensor 144 disposed downstream from the third conveyance roller pair 106 in the reverse direction detects the gripped portion B of the two-ply sheet PJ conveyed in the reverse direction as the trigger to determine the timing at which the gripper 136 and the receiving portion 120b grip the gripped portion B, the gripped portion B of the two-ply sheet PJ can be accurately conveyed to a desired gripping position regardless of variations in sheet lengths with respect to the sheet conveyance amount X2 (Note that the size of sheets includes an error even if the sheets are sold as the same size).

The fourth sensor 144 can shorten the sheet conveyance amount X2 that is measured since the fourth sensor 144 detects the front end of the two-ply sheet PJ conveyed in the reverse direction regardless of the sheet length. Therefore, the above-described configuration can reduce variation in the conveyance amount X2 and enables an accurate conveyance of the gripped portion B of the two-ply sheet PJ to the desired gripping position.

Accordingly, the fourth sensor 144 is preferably disposed near the winding roller 120.

With reference to FIG. 25C', a mechanism that winding the two-ply sheet PJ around the winding roller 120 generates the gap C in the two-ply sheet PJ between the winding roller 120 and the third conveyance roller pair 106 is described above.

The following additionally describes the mechanism.

In the two-ply sheet PJ wound around the winding roller 120, the gripped portion B of the two-ply sheet PJ gripped by the gripper 136 does not generate a slip between the sheets P1 and P2. However, winding the two-ply sheet PJ around the winding roller 120 generates the difference in winding circumferential length between the two sheets P1 and P2 and, therefore, causes a slip between the two sheets P1 and P2, and a conveyance amount of the inner sheet P1 is smaller than a conveyance amount of the outer sheet P2. As a result, slack occurs in the inner sheet P1 between the nip of the third conveyance roller pair 106 and the winding roller 120. Winding the two-ply sheet PJ around the winding roller 120 one or more times additionally generates the difference in winding circumferential length between the inner circumference and the outer circumference by the thickness of the sheet and increases the slack.

Specifically, a distance from the rotation shaft 120a (i.e. the center of the shaft) of the winding roller 120 to the outer sheet P2 is R+ΔR when a distance from the rotation shaft 120a (i.e. the center of the shaft) of the winding roller 120 to the inner sheet P1 is R, and the thickness of the inner sheet P1 is ΔR. The difference between a radius of the inner sheet P1 wound around the winding roller 120 and a radius of the outer sheet P2 wound around the inner sheet P1, that is, the thickness of the inner sheet P1ΔR, generates a circumferential length difference of 2×A R×π when the two-ply sheet PJ is wound around the winding roller 120 by one round. Therefore, winding the two-ply sheet PJ around the winding roller 120 M times generates the circumferential length difference 2×ΔR×π×M that is a slack of the inner sheet P1.

Finally, the slack is accumulated between the third conveyance roller pair 106 and the winding roller 120, and the gap C corresponding to 2×ΔR×π×M is formed between the two sheets P1 and P2.

In step S109 of FIG. 31A, after the winding roller 120 starts the winding of the two-ply sheet PJ, as illustrated in FIG. 26A, the third conveyance roller pair 106 stops the conveyance of the two-ply sheet PJ and the winding roller 120 stops the winding of the two-ply sheet PJ at the timing at which the third conveyance roller pair 106 conveys the two-ply sheet by a predetermined amount X3. In this state, the two-ply sheet PJ is wound around the winding roller 120 one or more times, and the gap C in the two-ply sheet PJ (a distance between the sheet P1 and the sheet P2) is sufficiently widened if the two-ply sheet PJ is normally separated.

When the gap C is widened, the controller determines whether the gap C formed in the two-ply sheet PJ is equal to or larger than a predetermined distance F based on results detected by the abnormality detection sensor 146 in step S129 of FIG. 31A.

When the controller determines that the gap C is the sufficiently large gap equal to or larger than the predetermined size F, the controller determines that subsequent separation operations of the separation claws 116 does not cause a problem and controls the separation claws 116 to insert into the gap C sufficiently widened in the two-ply sheet PJ as illustrated in FIG. 26 B in step S110 of FIG. 31A. That is, as illustrated in FIGS. 29 and 30A, each of the pair of separation claws 116 moves from the standby position to the separation position.

Next, the third conveyance roller pair 106 and the winding roller 120 start rotating in forward, that is, clockwise in step S111 of FIG. 31A after the separation claws 116 are inserted into the gap C as illustrated in FIG. 26C. That is, as illustrated in FIGS. 30A to 30C, the separation claws 116 inserted into the gap C of the two-ply sheet PJ relatively move from the one end A to the other end B with respect to the two-ply sheet PJ. The above-described relative movement in the second embodiment is caused by moving the two-ply sheet PJ itself in a direction indicated by arrow in FIGS. 30B and 30C without changing the positions of the separation claws 116 in the conveyance direction.

Figure 31B:
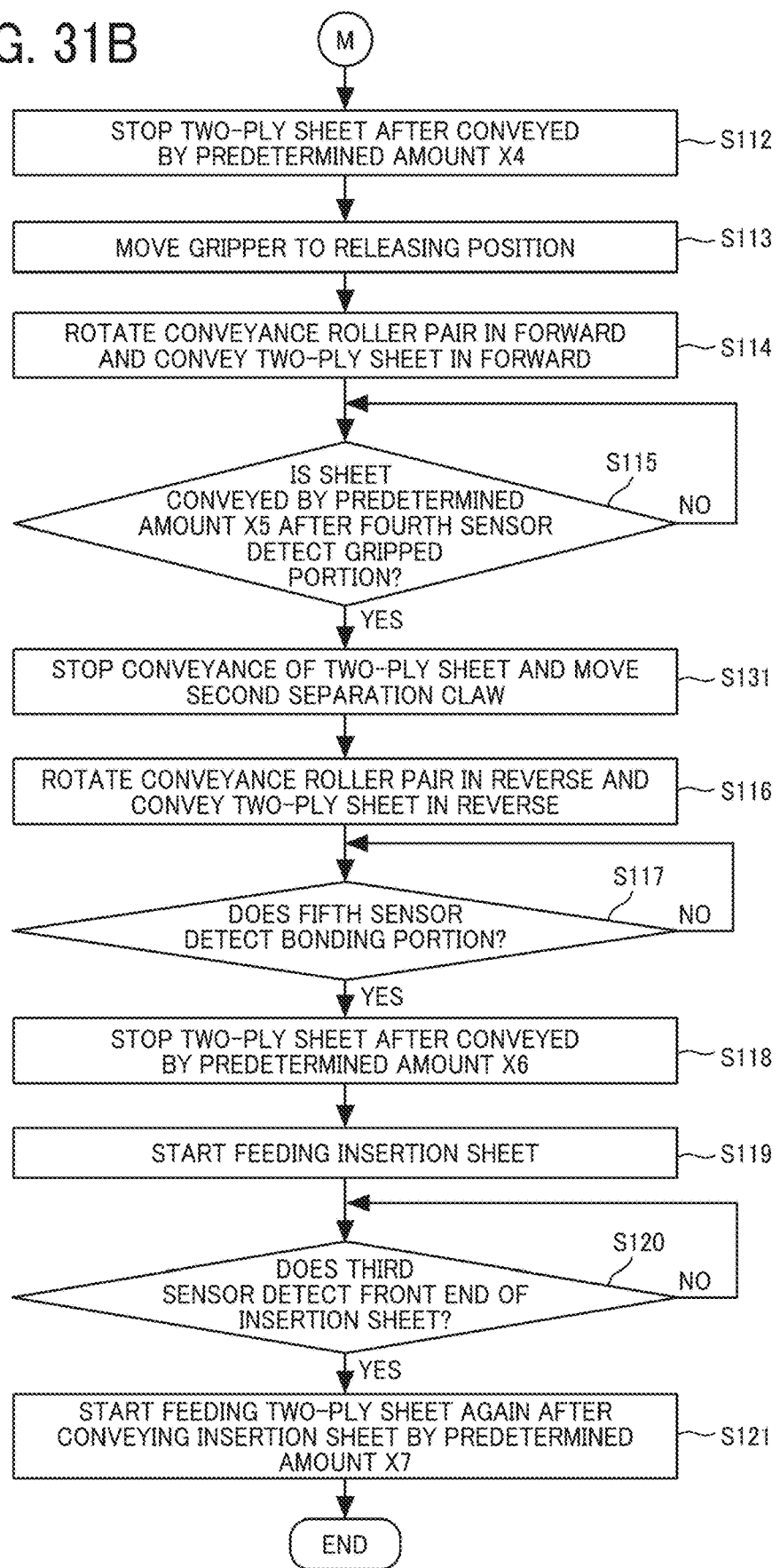

In step S112 of FIG. 31B, as illustrated in FIG. 27A, the controller stops forward rotation in the third conveyance roller pair 106 and forward rotation in the winding roller 120 after the forward rotation in the third conveyance roller pair 106 conveys the two-ply sheet PJ by a predetermined amount X4. At this time, the gripped portion B of the two-ply sheet PJ is positioned on the third conveyance path K103 (that is, at the winding start position W illustrated in FIG. 25B), and the gripper 136 can release the gripped portion B. In addition, as illustrated in FIG. 30C, the separation claws 116 stop near the other end of the two-ply sheet PJ after the separation claws are inserted into the gap C of the two-ply sheet and relatively moves to the other end B of the two-ply sheet PJ with respect to the two-ply sheet PJ.

In this state, the gripper 136 moves from the gripping position to the releasing position in step S113 of FIG. 31B. That is, the cam 134 moves to a rotational position at which the cam 134 does not push the arm 135. The gripper 136 releases gripping the two-ply sheet PJ. In the second embodiment, the cam 134 in the moving mechanism 130 moves to release the gripping of the gripper 136, but the third conveyance roller pair 106 may pull the two-ply sheet PJ from the gripper 136 to release the gripping and convey the two-ply sheet PJ without the above-described movement of the cam 134 in the moving mechanism 130 when a pulling force due to the conveyance of the third conveyance roller pair 106 is larger than a force of the gripper 136 that grips the tow-ply sheet PJ.

In step S114 of FIG. 31B, as illustrated in FIG. 27B, the third conveyance roller pair 106 again rotates in forward to start conveyance of the two-ply sheet PJ in the forward direction. In addition, after the gripped portion B of the two-ply sheet PJ that is the other end of the two-ply sheet PJ and the back end of the two-ply sheet PJ passes over a branch portion between the third conveyance path K103 and the branched conveyance paths K104 and K105, the gripper 136 moves from the releasing position to the gripping position, and, at this time, the fourth sensor 144 detects the gripped portion B of the two-ply sheet PJ that is the other end of the two-ply sheet PJ and the back end of the two-ply sheet PJ conveyed in the forward direction. The controller determines whether the third conveyance roller pair 106 conveys the two-ply sheet PJ by a predetermined amount X5 after the timing, as a trigger, at which the fourth sensor 144 detects the back end of the two-ply sheet PJ conveyed in the forward direction in step S115 of FIG. 31B and stops the conveyance of the two-ply sheet PJ when the third conveyance roller pair 106 conveys the two-ply sheet PJ by the predetermined amount X5. In step S131 of FIG. 31B, the separation claws 116 move in the width direction as illustrated in FIG. 30D. As a result, as illustrated in FIG. 27B, back ends of the two sheets P1 and P2 of the two-ply sheet PJ conveyed in the forward direction are separated and largely opened (see FIG. 30D).

Then, as illustrated in FIG. 27C, the third conveyance roller pair 106 rotates in reverse to start conveyance of the two-ply sheet PJ in the reverse direction in step S116 of FIG. 31B. At this time, since the separation claws 116 are disposed at the switching positions at which the separation claws 116 block the two-ply sheet PJ moving to the third conveyance path K103 (that is the position illustrated in FIG. 30D), the two sheets P1 and P2 separated each other are guided to the two branched conveyance paths K104 and K105, respectively, as illustrated in FIG. 27C. At this time, the fifth sensor 145 (see FIG. 21) detects the bonding portion A of the two-ply sheet PJ that is the one end of the two-ply sheet PJ and the back end of the two-ply sheet PJ conveyed in the reverse direction.

Figure 28A:
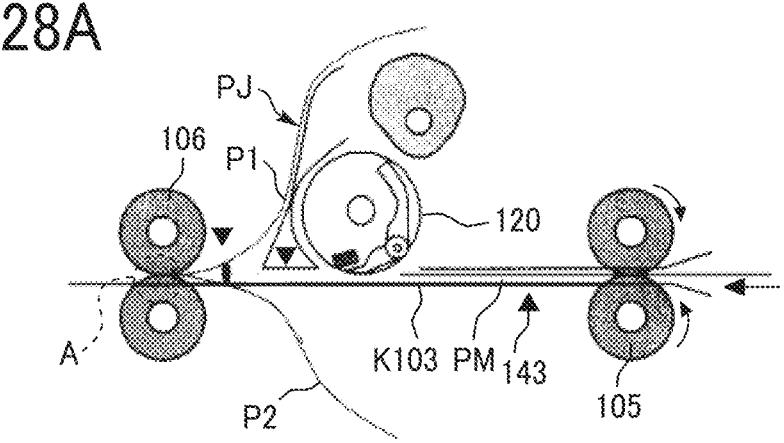
FIGS. 28A to 28C are schematic views illustrating operations of the sheet separation device, subsequent from the operations of FIGS. 27A to 27C.

Subsequently, the controller uses, as a trigger, the timing at which the fifth sensor 145 (see FIG. 21) detects the back end of the two-ply sheet PJ conveyed in the reverse direction that is the bonding portion A in step S117 of FIG. 31B and stops the conveyance of the two-ply sheet PJ at a timing at which the third conveyance roller pair 106 conveys the two-ply sheet PJ by a predetermined amount X6 as illustrated in FIG. 28A in step S118 of FIG. 31B. When the third conveyance roller pair 106 conveys the two-ply sheet PJ by the predetermined amount X6, the bonding portion A of the two-ply sheet PJ is in the nip of the third conveyance roller pair 106 or at a position slightly leftward from the nip. That is, the third conveyance roller pair 106 nips the one end of the two-ply sheet PJ.

Figure 28B:
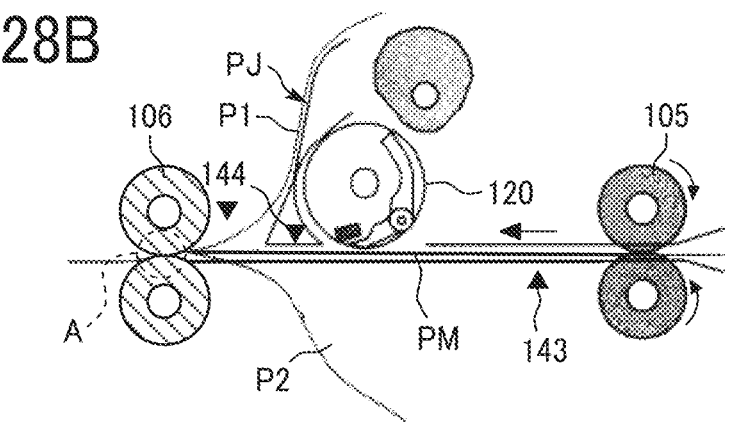

Subsequently, as illustrated in FIG. 28A, the second conveyance roller pair 105 starts feeding the insertion sheet PM from the second feed tray 114 (see FIG. 21) in step S119 of FIG. 31B. At this time, the third sensor 143 detects the front end of the insertion sheet PM conveyed in the forward direction that is also referred to as the one end of the insertion sheet PM. In addition, as illustrated in FIG. 28B, the separation claw 116 moves to the standby position.

Figure 28C:
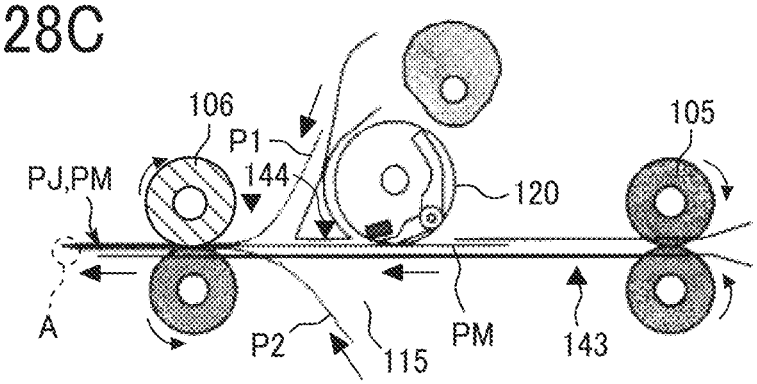

Subsequently, the controller uses the timing at which the third sensor 143 detects the front end of the insertion sheet PM as a trigger in step S120 of FIG. 31B. After the second conveyance roller pair 105 conveys the insertion sheet PM by a predetermined amount X7 since the third sensor 43 detects the front end of the insertion sheet PM, the third conveyance roller pair 106 again starts the conveyance of the two-ply sheet PJ in the forward direction in step S121 of FIG. 31B as illustrated in FIGS. 28C and 30E. At this time, the insertion sheet PM is accurately sandwiched at a desired position between the two sheets P1 and P2.

Thus, the controller ends processes to insert the insertion sheet PM between the two sheets P1 and P2 in the two-ply sheet PJ. The third conveyance roller pair 106 conveys the two-ply sheet PJ with the insertion sheet PM inserted therein in the forward direction, and the two-ply sheet PJ with the insertion sheet PM inserted therein is ejected and placed on the ejection tray 113 (see FIG. 21).

In contrast, when the controller determines that the gap C in the two-ply sheet PJ is not the sufficiently large gap equal to or larger than the predetermined distance F in step S129 of FIG. 31A, that is, when the controller determines that the abnormal state occurs based on results detected by the abnormality detection sensor 146, the controller determines that subsequent separation operations of the separation claws 116 cause various kinds of problems and does not move the separation claws 116 from the standby positions to the separation positions. In addition, the controller controls the operation display panel 149 (see FIG. 21) to notify that the occurrence of the abnormal state stops the separation operations and the insertion operations of the insertion sheet PM in step S130 of FIG. 31A.

Next, a first variation in the second embodiment is described.

Figure 34A:
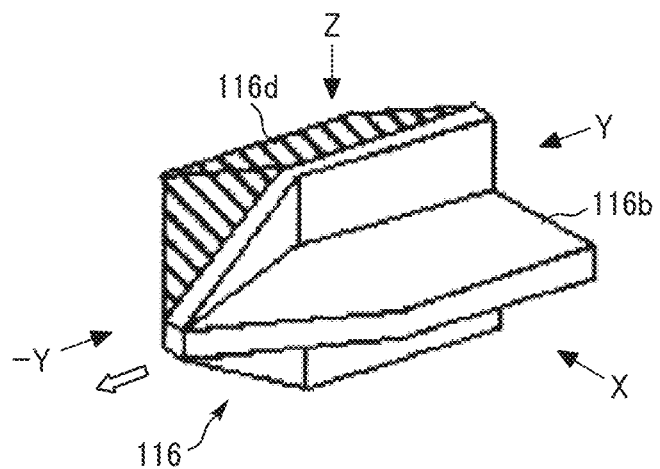
FIG. 34A is a perspective view of the separation claw according to a first variation in the second embodiment.
Figure 34B:
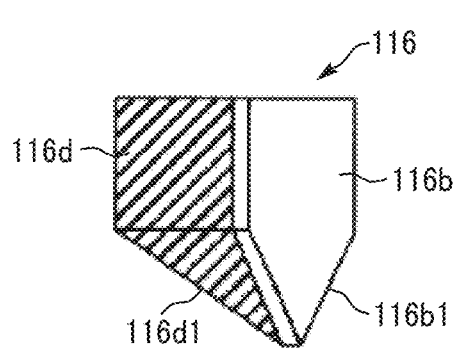
FIG. 34B is a plan view of the separation claw according to the first variation, as viewed from the Z direction in FIG. 34A.
Figure 34C:
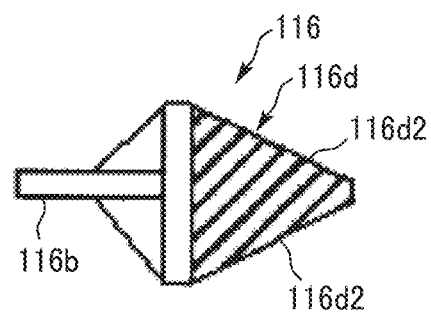
FIG. 34C is a rear view of the separation claw as viewed from the Y direction in FIG. 34A.
Figure 34D:
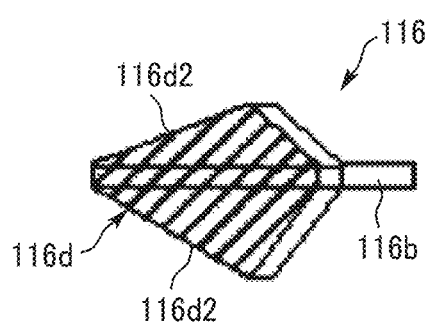
FIG. 34D is a front view of the separation claw according to the first variation as viewed from the −Y direction in FIG. 34A.
Figure 34E:
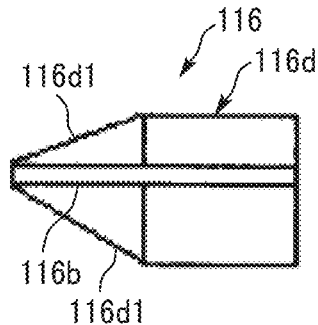
FIG. 34E is a side view of the separation claw according to the first variation as viewed from the X direction in FIG. 34A.

The sheet separation device according to the first variation includes a separation claw 116 different from the separation claw described above. As illustrated in FIGS. 34A to 34D, the separation claw 116 in the first variation includes a plate 116b and a pyramidal portion 116d that are integrally formed. FIG. 34A is a perspective view of the separation claw 116 according to the first variation. FIG. 34B is a top view of the separation claw 116 according to the first variation. FIG. 34C is a rear view of the separation claw 116 according to the first variation viewed from the −Y direction. FIG. 34D is a front view of the separation claw 116 according to the first variation viewed from the +Y direction. FIG. 34E is a side view of the separation claw 116 according to the first variation viewed from the X direction.

The thickness direction of the plate 116b is substantially the same as the thickness direction of the two-ply sheet PJ. One end of the pyramidal portion 116d extends in the thickness direction of the plate 116b and intersects an end of the plate 116b that is farther from the two branched conveyance paths K104 and K105 (that is, the end of the plate 116b on the left side in FIG. 27) than another end of the plate 116b. The thickness of the pyramidal portion 116d in the thickness direction of the plate 116b gradually decreases in the direction away from the plate 116b (toward the left side in FIG. 27).

That is, in the separation claw 116 in the first variation, the left half of the substantially cross shape of the separation claw 116 in FIG. 33C is replaced with a triangle having a top toward the left side in FIG. 33C as illustrated in FIG. 34C. The left top of the separation claw 116 faces the bonding portion A of the two-ply sheet PJ and the third conveyance roller pair 106. This part is like a wedge.

Figure 35A:
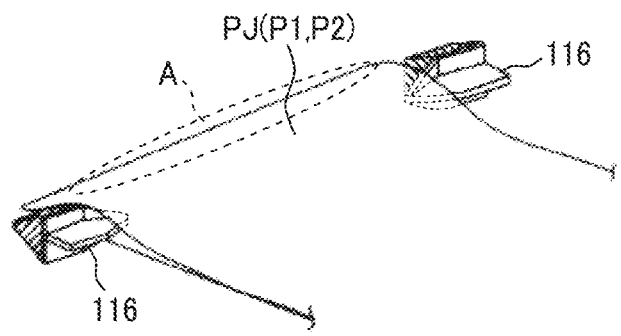
FIGS. 35A to 35C are perspective views illustrating operations of the separation claw in FIGS. 34A to 34E.
Figure 35B:
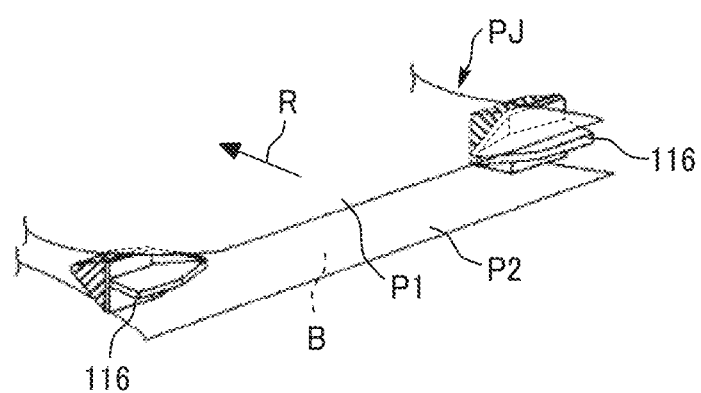
Figure 35C:
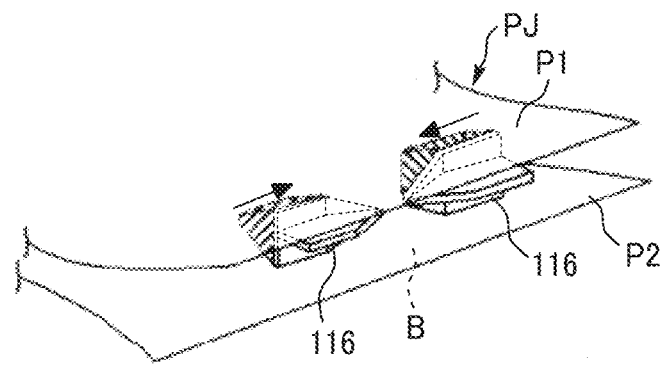

The pyramidal portion 116d having a thickness extending in the thickness direction of the two-ply sheet PJ (that is the direction in which the gap C is formed) as described above can separate back ends of the two sheets P1 and P2 by at least a vertical length of the pyramidal portion 116d when the separation claws 116 enter between the two sheets P1 and P2 as illustrated in FIG. 35C. As a result, the separation claws 116 can easily guide the two sheets P1 and P2 to the two branched conveyance paths K104 and K105, respectively. That is, the function of the separation claw 116 as the divider is easily exhibited.

In particular, the pyramidal portion 116d has slopes. A length of the slope in the vertical direction (that is the direction in which the gap C is formed) gradually decreases toward the bonding portion A of the two-ply sheet PJ. Accordingly, the two sheets P1 and P2 are guided along the slopes to the two branched conveyance paths K104 and K105, respectively.

As illustrated in FIGS. 35A to 35C, the separation claws 116 in the first variation also operate in the same manner as the separation claws described with reference to FIGS. 30A to 30E.

As illustrated in FIGS. 34C and 34D, the separation claw 116 in the first variation includes a tapered portion 116d2. A length of the tapered portion 116d2 in the thickness direction of the two-ply sheet PJ (that is the vertical direction in FIGS. 34c and 34D) gradually increases outward in the width direction of the two-ply sheet PJ. The above-described configuration prevents the disadvantage that the separation claw 116 is caught by the sheet P1 or P2 when the separation claw 116 enters the gap C in the two-ply sheet PJ from the standby position as illustrated in FIG. 35A.

As illustrated in FIGS. 34B and 34E, the separation claw 116 in the first variation includes tapered portions 116*b*1 and 116*d*1. A length of each of the tapered portions 116*b*1 and 116*d*1 in the thickness direction of the two-ply sheet PJ (that is the horizontal direction in FIGS. 34B and 34E) gradually increases outward in the conveyance direction of the two-ply sheet PJ. The above-described configuration prevents the disadvantage that the separation claw 116 is caught by the bonding portion of the two-ply sheet PJ when the separation claw 116 enters into the gap C in the two-ply sheet PJ from the standby position as illustrated in FIG. 35B.

Next, a second variation in the second embodiment is described.

Figure 36:
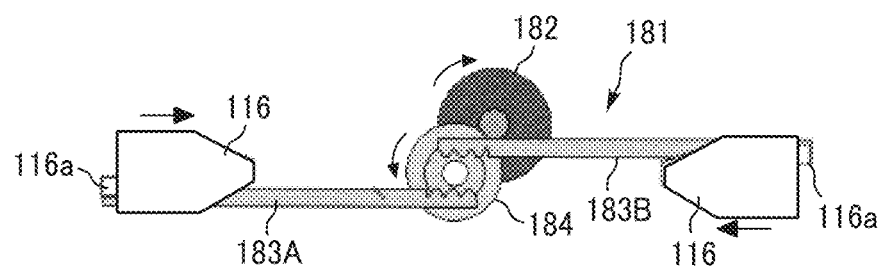
FIG. 36 is a schematic view illustrating a configuration of a driving device for the separation claws in a second variation in the second embodiment.

The sheet separation device according to the second variation includes a driving device 181 that moves the separation claw 116 in the width direction of the two-ply sheet PJ. As illustrated in FIG. 36, the driving device 181 in the second variation uses a pinion rack type mechanism that is different from the belt type driving device 176 in FIG. 32.

Specifically, the driving device 181 in the second variation includes a motor 182, a gear pinion 184, racks 183A and 183B. The gear pinion 184 has a step-like ring shape including a gear that meshes with a motor gear disposed on a motor shaft of the motor 182 and a pinion gear that meshes with each of rack gears of a pair of racks 183A and 183B. One separation claw 116 of the pair of separation claws 116 includes the fixed portion 116*a* fixed to the rack 183A, and the other separation claw 116 includes the fixed portion 116*a* fixed to the rack 183B.

In the driving device 181 as configured described above, the motor 182 drives to rotate the motor shaft in a direction indicated by arrow in FIG. 36 (i.e. clockwise), the gear pinion 184 rotates counterclockwise, and the pair of separation claws 116 moves from the outside portions in the width direction to the center portion in the width direction (that is, the pair of separation claws 116 approaches each other). In contrast, when the motor 182 drives to rotate the motor shaft in the direction opposite to the arrow direction in FIG. 36, the pair of separation claws 116 moves from the center portion in the width direction toward the outside portions in the width direction (that is, the pair of the separation claws 116 moves in a direction away from each other).

A third variation in the second embodiment is described.

Figure 37:
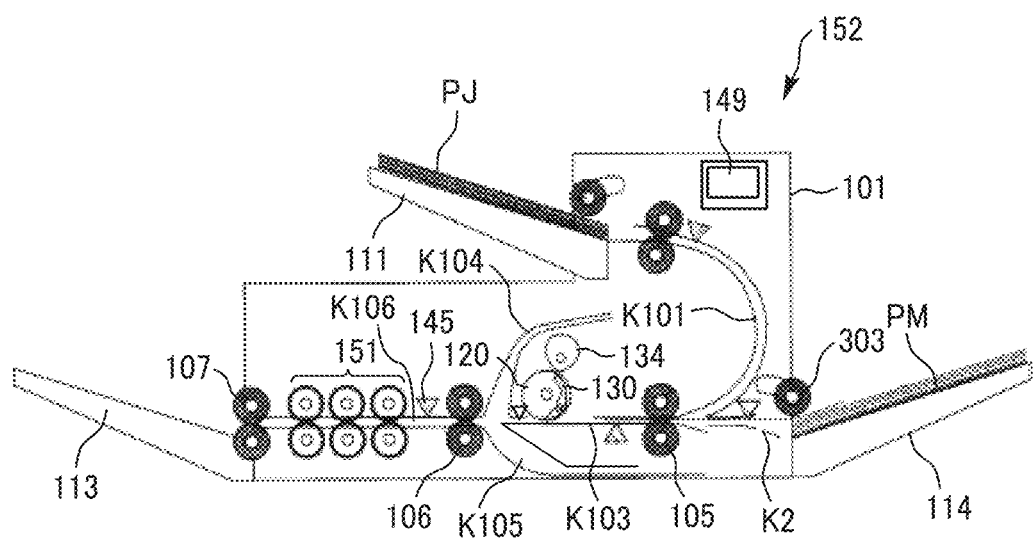
FIG. 37 is a schematic view illustrating a laminator according to a third variation in the second embodiment.

As illustrated in FIG. 37, a laminator 152 as the third variation includes the sheet separation device 101 illustrated in FIG. 21.

The laminator 152 includes a lamination processor 151 downstream from the third conveyance roller pair 106 in the sheet separation device 101 in the forward direction. The lamination processor 151 performs a laminating process on the two-ply sheet PJ in which the insertion sheet PM is inserted between the two sheets P1 and P2 separated by the sheet separation device 101 (that is, the normally processed two-ply sheet PJ).

The lamination processor 151 includes a plurality of heat and pressure roller pairs that apply heat and pressure to the two-ply sheet PJ while conveying, in the forward direction, the two-ply sheet PJ into which the insertion sheet PM is inserted. The fourth conveyance path K106 is disposed between the third conveyance roller pair 106 and the lamination processor 151.

As described above with reference to FIGS. 24A to 28C, the two-ply sheet PJ (into which the insertion sheet PM has been inserted after the separation operations) passes through the fourth conveyance path K106 and is conveyed to the lamination processor 151. The two-ply sheet PJ into which the insertion sheet PM is inserted inside passes through the lamination processor 151, and the entire region of the two-ply sheet PJ is joined. The two-ply sheet PJ subjected to the laminating process described above is ejected to the outside of the lamination processor 151 by an ejection roller pair 107 and is placed on the ejection tray 113.

As described above, the laminator 152 according to the third variation performs a process to feed the sheets PJ and PM, a process to separate the two sheets P1 and P2 in the two-ply sheet PJ, a process to insert the insertion sheet PM into the space between the two separated sheets P1 and P2, and a process to perform the laminating process on the two-ply sheet PJ in which the insertion sheet PM is inserted, as a sequence of processes, thus enhancing the convenience for a user.

The laminator 152 includes the operation display panel 149. When the controller determines that the abnormal state occurs based on the results detected by the abnormality detection sensor 146, the controller controls the operation display panel 149 to display that the occurrence of the abnormal state stops the separation operations and the insertion operations of the insertion sheet PM.

A fourth variation in the second embodiment is described.

Figure 38:
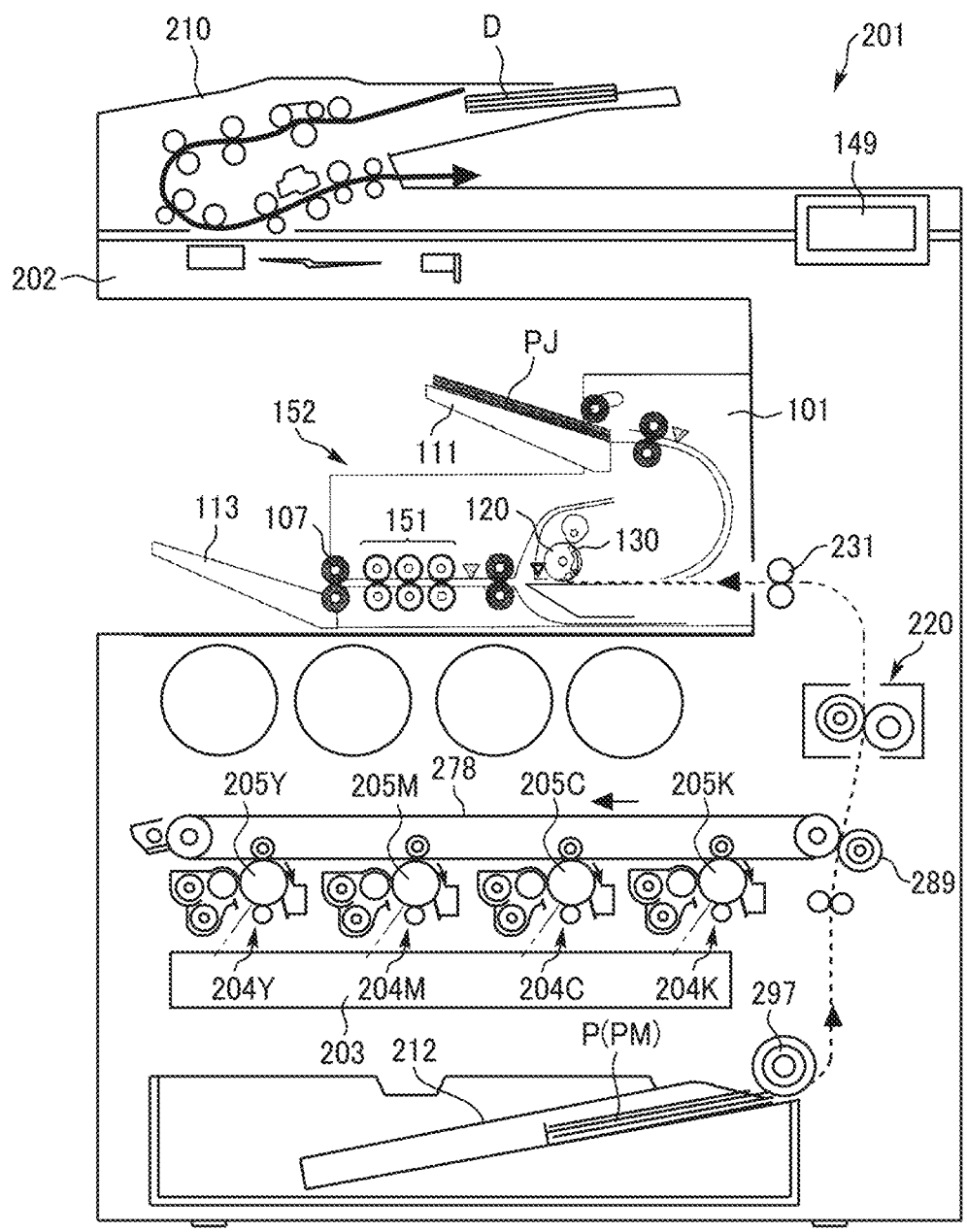
FIG. 38 is a schematic view illustrating an image forming apparatus according to a fourth variation in the second embodiment.

As illustrated in FIG. 38, an image forming apparatus 201 as the fourth variation includes the laminator 152 illustrated in FIG. 37 and an image forming apparatus main body that forms an image on a sheet P.

With reference to FIG. 38, in the image forming apparatus 201, multiple pairs of sheet conveying rollers disposed in the document feeder 210 feed the original document D from a document loading table and conveys the original document D in a direction indicated by arrow in FIG. 38, and the original document D passes over the document reading device 202. The document reading device 202 optically reads image data of the original document D passing over the document reading device 202.

The image data optically read by the document reading device 202 is converted into electric signals and transmitted to a writing device 203. The writing device 203 emits laser beams onto the photoconductor drums 205Y, 205M, 205C, and 205K based on the electric signals of the image data in each of colors, respectively, performing an exposure process.

On the photoconductor drums 205Y, 205M, 205C, and 205K of the image forming units 204Y, 204M, 204C, and 204K, a charging process, the exposure process, and a developing process are performed to form desired images on the photoconductor drums 205Y, 205M, 205C, and 205K, respectively.

The images formed on the photoconductor drums 205Y, 205M, 205C, and 205K are transferred and superimposed onto the intermediate transfer belt 278 to form a color image. The color image formed on the intermediate transfer belt 278 is transferred to the surface of a sheet P (which is a sheet to be the insertion sheet PM) fed and conveyed by a feed roller 297 from a feeding device 212 at a position at which the intermediate transfer belt 278 faces the secondary transfer roller 289.

After the color image is transferred onto the surface of the sheet P (that is the insertion sheet PM), the sheet P is conveyed to the position of a fixing device 220. The fixing device 220 fixes the transferred color image on the sheet P.

Thereafter, the sheet P is ejected from the image forming apparatus main body of the image forming apparatus 201 by an ejection roller pair 231 and is fed into the laminator 152 as the insertion sheet PM. When the laminator 152 including the sheet separation device 101 receives the insertion sheet PM, the laminator 152 has completed the process described with reference to FIGS. 24A to 27C (that is, the process to separate the two-ply sheet PJ) and performs the process described with reference to FIGS. 28A to 28C (that is, the process to insert the insertion sheet PM into the two-ply sheet PJ) after the laminator 152 (the sheet separation device 101) receives the insertion sheet PM. After the lamination processor 151 performs the laminating process on the two-ply sheet PJ into which the insertion sheet PM is inserted, the ejection roller pair 107 ejects the two-ply sheet PJ to the outside of the lamination processor 151 to place the two-ply sheet PJ on the ejection tray 113.

As described above, a series of image formation processes (i.e. printing operations) in the image forming apparatus 201 and a series of sheet separation processes and the laminating process using the insertion sheet PM on which the image is formed are completed.

In the fourth variation, the image forming apparatus 201 includes the laminator 152, but may include the sheet separation device 101 illustrated in FIG. 21.

The image forming apparatus 201 includes the operation display panel 149. When the controller determines that the abnormal state occurs based on the results detected by the abnormality detection sensor 146, the controller controls the operation display panel 149 to display that the occurrence of the abnormal state stops the separation operations and the insertion operations of the insertion sheet PM.

The image forming apparatus 201 according to the fourth variation of the second embodiment is a color image forming apparatus but may be a monochrome image forming apparatus. The image forming apparatus 201 according to the fourth variation of the second embodiment employs electrophotography, but the present disclosure is not limited to this. The present disclosure may be applied to other types of image forming apparatuses such as an inkjet image forming apparatus and a stencil printing machine.

A fifth variation in the second embodiment is described.

Figure 39:
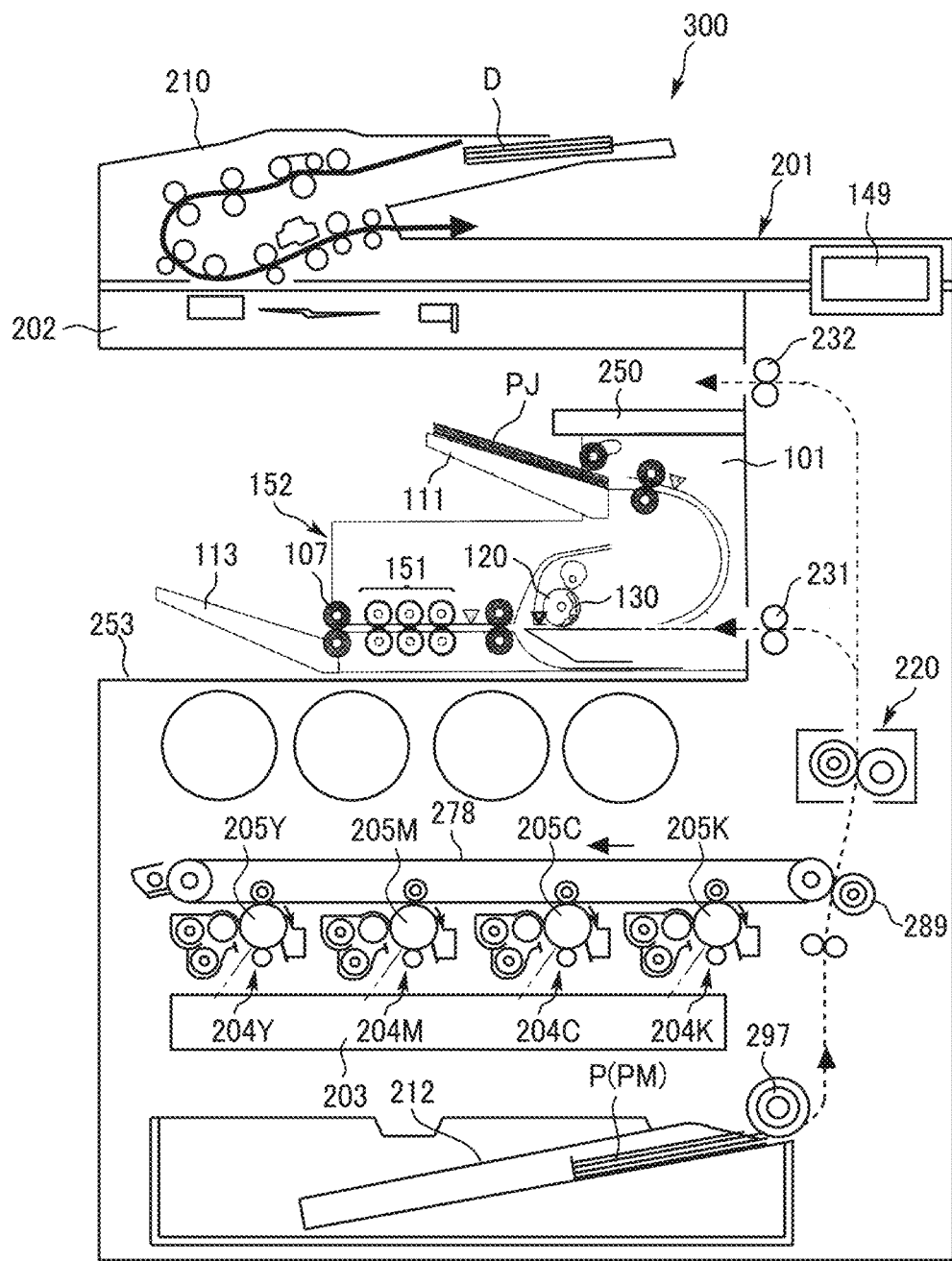
FIG. 39 is a schematic view illustrating an image forming system according to a fifth variation in the second embodiment.

As illustrated in FIG. 39, an image forming system 300 according to the fifth variation includes the image forming apparatus 201 illustrated in FIG. 38 that forms the image on the sheet P and the laminator 152 illustrated in FIG. 37, and the laminator 152 is detachably attached to the image forming apparatus 201.

In the image forming system 300 illustrated in FIG. 39, the image forming apparatus 201 performs the image formation described above with reference to FIG. 37 and ejects the sheet P (that is the insertion sheet formed a desired image) from the ejection roller pair 231 to the laminator 152, and the laminator 152 performs the laminating process on the two-ply sheet PJ into which the insertion sheet PM has been inserted, and the ejection roller pair 107 ejects the two-ply sheet PJ to the outside of the laminator 152 to place the two-ply sheet PJ on the ejection tray 113.

When such a laminating process is not performed, the image forming apparatus 201 in the image forming system 300 ejects the sheet P formed the image by the image formation process from a second ejection roller pair 232 to the outside of the image forming apparatus 201 to place the sheet P on a second ejection tray 250.

The laminator 152 is detachably attached to the image forming apparatus 201 and can be detached from the image forming apparatus 201 when the laminator 152 is not necessary. The image forming apparatus 201 from which the laminator 152 is detached uses a placement surface 253 to place the laminator 152 as an ejection tray to place the sheet P formed the image by the image formation process and ejected from the ejection roller pair 231 to the outside of the image forming apparatus 201.

In the fifth variation, the image forming system 300 includes the detachable laminator 152. However, the image forming system 300 may include the sheet separation device 101 illustrated in FIG. 21 detachable.

The image forming system 300 includes the operation display panel 149. When the controller determines that the abnormal state occurs based on the results detected by the abnormality detection sensor 146, the controller controls the operation display panel 149 to display that the occurrence of the abnormal state stops the separation operations and the insertion operations of the insertion sheet PM.

As described above, the sheet separation device 101 according to the second embodiment separates the non-bonding portion of the two-ply sheet PJ in which the two sheets P1 and P2 are overlapped and bonded at one end as the bonding portion A and includes the separation claws 116 as the separator that are inserted into the gap C formed between the two sheets P1 and P2 of the two-ply sheet PJ at a predetermined positions. The separation claws 116 guide the two sheets P1 and P2 separated by the separation claws 116 to the two branched conveyance paths K104 and K105 that branch off in different directions, respectively.

Thus, without increasing the size of the sheet separation device 101, the above-described mechanism can satisfactorily and efficiently separate the two sheets P1 and P2 constituting the two-ply sheet PJ.

In the second embodiment of the present disclosure, the two branched conveyance paths K104 and K105 branch off in different directions from the third conveyance path K103 between the separation claws 116 as the separator and the winding roller 120. In other words, the third conveyance path K103 is interposed by the two branched conveyance paths K104 and K105. Alternatively, the two branched conveyance paths K104 and K105 may branch off at the position of the separation claws 116 as the separator in different directions from the third conveyance path K103 that is interposed by the two branched conveyance paths K104 and K105. The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. The number, position, and shape of the components described above are not limited to those embodiments described above. Desirable number, position, and shape can be determined to perform the present disclosure.

In the present disclosure, the "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right. The present disclosure is not limited to the above-described embodiment and variations, and the configuration of the present embodiment can be appropriately modified other than suggested in the above embodiment and variations within a scope of the technological concept of the present disclosure. The number, position, and shape of each of the components described above are not limited to the embodiment and variations described above. Desirable number, position, and shape can be determined to perform the present disclosure.

What is claimed is:

1. A sheet separation device configured to separate a non-bonding portion of a two-ply sheet in which two sheets are overlapped and bonded together at one end as a bonding portion of the two-ply sheet, the sheet separation device comprising:
a separator configured to be inserted into a gap formed between the two sheets of the two-ply sheet in a direction orthogonal to a conveyance direction of the two-ply sheet and relatively move from the one end of the two-ply sheet to another end of the two-ply sheet.

2. The sheet separation device according to claim 1, wherein
the separator is one of a pair of separators,
the pair of separators is configured to be inserted into both ends of the gap in a width direction of the two-ply sheet and relatively move toward said another end to reach said another end, and
the pair of separators is configured to, after the pair of separators reaches said another end, move from both ends of the two-ply sheet in the width direction to a center of the two-ply sheet in the width direction between the two sheets at said another end of the two-ply sheet.

3. The sheet separation device according to claim 1, wherein
the separator is one of a pair of separators, the pair of separators is configured to be inserted into a center portion of the gap in the width direction of the two-ply sheet and relatively move toward said another end to reach said another end, and
the pair of separators is configured to, after the pair of separators reaches said another end, move from the center portion of the two-ply sheet in the width direction to both ends of the two-ply sheet in the width direction between the two sheets at said another end of the two-ply sheet.

4. The sheet separation device according to claim 1, further comprising:
a winding roller configured to rotate and wind the two-ply sheet; and
a conveyance roller pair configured to convey the two-ply sheet toward the winding roller with said another end of the two-ply sheet as a front end in a conveyance path between the winding roller and the conveyance roller pair, wherein the gap is formed between the two sheets of the two-ply sheet between the winding roller and the conveyance roller pair, and the two-ply sheet has said another end wound around the winding roller and the one end nipped by the conveyance roller pair.

5. The sheet separation device according to claim 4, further comprising:
two branched conveyance paths branched in different directions from the conveyance path between the separator and the winding roller; and
a divider configured to guide the two sheets separated by the separator to the two branched conveyance paths, respectively.

6. The sheet separation device according to claim 5, further comprising
another conveyance roller pair configured to convey an insertion sheet toward the one end of the two-ply sheet in the conveyance path and insert the insertion sheet between the two sheets that are separated and guided to the two branched conveyance paths, respectively, by the divider.

7. The sheet separation device according to claim 4, further comprising:
a receiving portion of the winding roller;
a gripper configured to grip said another end of the two-ply sheet with the receiving portion; and
a moving mechanism configured to move the gripper between a gripping position at which the gripper grips the two-ply sheet and a releasing position at which the gripper is released from the gripping position.

8. A laminator comprising:
the sheet separation device according to claim 1, and
a lamination processor configured to perform a laminating process on the two-ply sheet including an insertion sheet inserted between the two sheets separated by the sheet separation device.

9. An image forming apparatus comprising:
the sheet separation device according to claim 1; and
an image forming apparatus main body configured to form an image on a sheet.

10. An image forming system comprising:
an image forming apparatus configured to form an image on a sheet, and
the sheet separation device according to claim 1 detachably attached to the image forming apparatus.

11. A sheet separation device configured to separate a non-bonding portion of a two-ply sheet in which two sheets are overlapped and bonded together at one end as a bonding portion of the two-ply sheet, the sheet separation device, comprising:
a separator configured to be inserted into a gap formed between the two sheets of the two-ply sheet in a direction orthogonal to a conveyance direction of the two-ply sheet, separate the two sheets, and guide the two sheets to different directions, respectively.

12. The sheet separation device according to claim 11, further comprising
two branched conveyance paths branched in the different directions, wherein the separator is configured to guide the two sheets to the two branched conveyance paths, respectively.

13. The sheet separation device according to claim 12, further comprising:
a winding roller configured to rotate and wind the two-ply sheet; and
a conveyance roller pair configured to convey the two-ply sheet toward the winding roller with another end of the two-ply sheet as a front end, said another end opposite the one end, in a conveyance path between the winding roller and the conveyance roller pair, wherein
the gap is formed between the two sheets of the two-ply sheet between the winding roller and the conveyance roller pair, and the two-ply sheet has said another end wound around the winding roller and the one end nipped by the conveyance roller pair, and
the two branched conveyance paths branch off at a position of the separator or a position between the separator and the winding roller in different directions from the conveyance path interposed between the two branched conveyance paths.

14. The sheet separation device according to claim 13, further comprising:
another conveyance roller pair configured to convey and insert an insertion sheet into a space between the two sheets separated by the separator, wherein
the conveyance roller pair is configured to convey the two-ply sheet, after the separator is inserted into the gap, to release said another end of the two-ply sheet wound around the winding roller from the winding roller and subsequently convey the two-ply sheet toward the winding roller, the separator is configured to guide the two sheets separated by the separator to the two branched conveyance paths, respectively, and said another conveyance roller pair is configured to convey the insertion sheet toward the one end of the two-ply sheet in the conveyance path and insert the insertion sheet between the two sheets separated.

15. The sheet separation device according to claim 14, further comprising:

a receiving portion of the winding roller;

a gripper configured to grip said another end of the two-ply sheet with the receiving portion; and a moving mechanism configured to move the gripper between a gripping position at which the gripper grips the two-ply sheet and a releasing position at which the gripper is released from the gripping position.

16. The sheet separation device according to claim 11, wherein the separator includes a tapered portion having a length in a thickness direction of the two-ply sheet, the length gradually increasing outward in a width direction of the two-ply sheet.

17. The sheet separation device according to claim 11, wherein the separator includes a tapered portion having a length in a conveyance direction of the two-ply sheet, the length gradually increasing outward in a width direction of the two-ply sheet.

18. The sheet separation device according to claim 11, wherein the separator includes a first plate having a thickness direction that is same as a thickness direction of the two-ply sheet and a second plate intersecting the first plate in the thickness direction.

19. The sheet separation device according to claim 12, wherein the separator includes a plate having a thickness direction that is same as a thickness direction of the two-ply sheet and a pyramidal portion intersecting an end of the plate that is farther from the two branched conveyance paths than another end of the plate, wherein a thickness of the pyramidal portion in the thickness direction of the plate gradually decreases in a direction away from the plate.

20. The sheet separation device according to claim 11, wherein the separator is configured to move in a width direction of the two-ply sheet between the two sheets at another end of the two-ply sheet opposite the one end, after the separator is inserted into the gap in the two-ply sheet, and relatively move from the one end of the two-ply sheet to said another end of the two-ply sheet.

21. A laminator comprising:

the sheet separation device according to claim 11, and a lamination processor configured to perform a laminating process on the two-ply sheet including an insertion sheet inserted between the two sheets separated by the sheet separation device.

22. An image forming system comprising:

an image forming apparatus configured to form an image on a sheet, and the sheet separation device according to claim 11 attached to the image forming apparatus.

* * * * *